US 012321965B2

(12) United States Patent
Forutanpour et al.

(10) Patent No.: US 12,321,965 B2
(45) Date of Patent: Jun. 3, 2025

(54) EVALUATING AND RECYCLING ELECTRONIC DEVICES

(71) Applicant: ecoATM, LLC, San Diego, CA (US)

(72) Inventors: Babak Forutanpour, San Diego, CA (US); Ted Ray Gooding, San Diego, CA (US)

(73) Assignee: ecoATM, LLC, San Diego, CA (US)

( * ) Notice: Subject to any disclaimer, the term of this patent is extended or adjusted under 35 U.S.C. 154(b) by 507 days.

(21) Appl. No.: 17/445,799

(22) Filed: Aug. 24, 2021

(65) Prior Publication Data
US 2022/0067798 A1 Mar. 3, 2022

Related U.S. Application Data

(60) Provisional application No. 63/070,207, filed on Aug. 25, 2020.

(51) Int. Cl.
*G06V 10/98* (2022.01)
*G06F 3/0482* (2013.01)
(Continued)

(52) U.S. Cl.
CPC ....... *G06Q 30/0278* (2013.01); *G06F 3/0482* (2013.01); *G06F 18/217* (2023.01);
(Continued)

(58) Field of Classification Search
CPC ............... G06Q 30/0278; G06Q 10/30; G06Q 30/0283; G06Q 20/18; G06Q 30/0185;
(Continued)

(56) References Cited

U.S. PATENT DOCUMENTS 1,327,315 A 1/1920 Davies
1,730,015 A 10/1929 Rooke
(Continued)

FOREIGN PATENT DOCUMENTS

CA 2760863 11/2010
CA 2818533 A1 5/2012
(Continued)

OTHER PUBLICATIONS

"Yunwon Park et al., Ambiguous Surface Defect Image Classification of AMOLED Displays in Smartphones, Jan. 2016, IEEE Transactions on Industrial Informatics, vol. 12, Issue 2" (Year: 2016).*

(Continued)

*Primary Examiner* — Andrae S Allison
*Assistant Examiner* — Phuong Hau Cai
(74) *Attorney, Agent, or Firm* — Perkins Coie LLP

(57) ABSTRACT

Methods, apparatus, and systems for generating a price of a target device. An evaluator device obtains technical properties associated with the target device. The technical properties include a make and a model of the target device. Physical properties associated with the target device are obtained. The physical properties include information related to wear and tear of the target device. Obtaining the physical properties includes indicating to a user that the user should position the target device in multiple predetermined positions and that the evaluator device records an image of the target device in each of the multiple predetermined positions. A video of the target device is recorded while the target device is positioned in the multiple predetermined positions. The obtained physical properties are evaluated to generate a condition metric value of the target device. Based on the generated condition metric value, the price of the target device is determined.

20 Claims, 17 Drawing Sheets

(51) Int. Cl.

| | | |
|---|---|---|
| *G06F 18/21* | (2023.01) | |
| *G06N 20/00* | (2019.01) | |
| *G06Q 10/30* | (2023.01) | |
| *G06Q 20/18* | (2012.01) | |
| *G06Q 30/018* | (2023.01) | |
| *G06Q 30/02* | (2023.01) | |
| *G06Q 30/0283* | (2023.01) | |
| *G06V 10/44* | (2022.01) | |
| *G06V 20/40* | (2022.01) | |

(52) U.S. Cl.
CPC ......... *G06Q 10/30* (2013.01); *G06Q 30/0283* (2013.01); *G06V 10/44* (2022.01); *G06V 10/987* (2022.01); *G06V 20/40* (2022.01); *G06N 20/00* (2019.01); *G06Q 20/18* (2013.01); *G06Q 30/0185* (2013.01)

(58) Field of Classification Search
CPC .. G06Q 20/085; G06Q 20/322; G06Q 20/409; G06Q 30/0237; G06Q 30/0601; G06F 3/0482; G06F 18/217; G06V 10/44; G06V 10/987; G06V 20/40; G06N 20/00; H04M 1/72409; H04M 1/24; Y02W 90/00; G07F 7/06
See application file for complete search history.

(56) References Cited

U.S. PATENT DOCUMENTS

| | | |
|---|---|---|
| 3,808,439 A | 4/1974 | Renius |
| 4,248,334 A | 2/1981 | Hanley et al. |
| 4,519,522 A | 5/1985 | McElwee |
| 4,593,820 A | 6/1986 | Antonie |
| 4,715,709 A | 12/1987 | Sekine et al. |
| 4,821,118 A | 4/1989 | Lafreniere |
| 4,845,636 A | 7/1989 | Walker |
| 4,870,357 A | 9/1989 | Young et al. |
| 4,878,736 A | 11/1989 | Hekker et al. |
| 4,893,789 A | 1/1990 | Novorsky |
| 4,927,051 A | 5/1990 | Falk et al. |
| 4,951,308 A | 8/1990 | Bishop et al. |
| 5,025,344 A | 6/1991 | Maly et al. |
| 5,027,074 A | 6/1991 | Haferstat |
| 5,077,462 A | 12/1991 | Newell et al. |
| 5,091,773 A | 2/1992 | Fouche et al. |
| 5,105,149 A | 4/1992 | Tokura |
| 5,159,560 A | 10/1992 | Newell et al. |
| 5,216,502 A | 6/1993 | Katz |
| 5,280,170 A | 1/1994 | Baldwin |
| 5,319,459 A | 6/1994 | Mochizuki et al. |
| 5,339,096 A | 8/1994 | Beaufort et al. |
| 5,413,454 A | 5/1995 | Movesian |
| 5,419,438 A | 5/1995 | Squyres et al. |
| 5,436,554 A | 7/1995 | Decker |
| 5,482,140 A | 1/1996 | Moore |
| 5,570,920 A | 11/1996 | Crisman et al. |
| 5,572,444 A | 11/1996 | Lentz et al. |
| 5,610,710 A | 3/1997 | Canfield et al. |
| 5,717,780 A | 2/1998 | Mitsumune et al. |
| 5,747,784 A | 5/1998 | Walter et al. |
| 5,748,084 A | 5/1998 | Isikoff |
| 5,775,806 A | 7/1998 | Allred |
| 5,839,058 A | 11/1998 | Phillips et al. |
| 5,871,371 A | 2/1999 | Rothenberger et al. |
| 5,920,338 A | 7/1999 | Katz |
| 5,937,396 A | 8/1999 | Konya |
| 5,949,901 A | 9/1999 | Nichani et al. |
| 5,965,858 A | 10/1999 | Suzuki et al. |
| 5,966,654 A | 10/1999 | Croughwell et al. |
| 5,987,159 A | 11/1999 | Nichani |
| 5,988,431 A | 11/1999 | Roe |
| 6,029,851 A | 2/2000 | Jenkins et al. |
| 6,041,229 A | 3/2000 | Turner |
| 6,055,512 A | 4/2000 | Dean et al. |
| 6,100,986 A | 8/2000 | Rydningen |
| 6,170,702 B1 | 1/2001 | Zettler et al. |
| 6,181,805 B1 | 1/2001 | Koike et al. |
| 6,228,008 B1 | 5/2001 | Pollington et al. |
| 6,234,812 B1 | 5/2001 | Ivers et al. |
| 6,259,827 B1 | 7/2001 | Nichani |
| 6,264,104 B1 | 7/2001 | Jenkins et al. |
| 6,323,782 B1 | 11/2001 | Stephens et al. |
| 6,330,354 B1 | 12/2001 | Companion et al. |
| 6,330,958 B1 | 12/2001 | Ruskin et al. |
| 6,393,095 B1 | 5/2002 | Robinson |
| 6,462,644 B1 | 10/2002 | Howell et al. |
| 6,529,837 B1 | 3/2003 | Kang |
| 6,535,637 B1 | 3/2003 | Wootton et al. |
| 6,573,886 B1 | 6/2003 | Lehtinen et al. |
| 6,587,581 B1 | 7/2003 | Matsuyama et al. |
| 6,595,684 B1 | 7/2003 | Casagrande et al. |
| 6,597,552 B1 | 7/2003 | Griepentrog et al. |
| 6,633,377 B1 | 10/2003 | Weiss et al. |
| 6,667,800 B1 | 12/2003 | Larsson et al. |
| 6,687,679 B1 | 2/2004 | Van Luchene |
| 6,748,296 B2 | 6/2004 | Banerjee et al. |
| 6,754,637 B1 | 6/2004 | Stenz |
| 6,758,370 B2 | 7/2004 | Cooke et al. |
| 6,798,528 B1 | 9/2004 | Hartman |
| 6,822,422 B2 | 11/2004 | Sagawa |
| 6,842,596 B2 | 1/2005 | Morii et al. |
| 6,854,656 B2 | 2/2005 | Matsumori |
| 6,947,941 B1 | 9/2005 | Koon |
| D512,964 S | 12/2005 | Kissinger et al. |
| 7,062,454 B1 | 6/2006 | Giannini et al. |
| 7,066,767 B2 | 6/2006 | Liao |
| 7,069,236 B1 | 6/2006 | Tsunenari |
| 7,076,449 B2 | 7/2006 | Tsunenari et al. |
| 7,086,592 B2 | 8/2006 | Wagner et al. |
| 7,178,720 B1 | 2/2007 | Strubbe et al. |
| 7,234,609 B2 | 6/2007 | DeLazzer et al. |
| 7,251,458 B2 | 7/2007 | O'Connell |
| 7,268,345 B2 | 9/2007 | Schultz |
| 7,334,729 B2 | 2/2008 | Brewington |
| 7,343,319 B1 | 3/2008 | Jen |
| 7,407,392 B1 | 8/2008 | Cooke et al. |
| 7,408,674 B2 | 8/2008 | Moro et al. |
| 7,431,158 B2 | 10/2008 | Yamada et al. |
| 7,455,226 B1 | 11/2008 | Hammond et al. |
| 7,520,666 B2 | 4/2009 | Pevzner et al. |
| 7,529,687 B1 | 5/2009 | Phan |
| 7,567,344 B2 | 7/2009 | LeBlanc et al. |
| 7,642,687 B2 | 1/2010 | Kageyama et al. |
| 7,646,193 B2 | 1/2010 | Suzuki et al. |
| 7,649,450 B2 | 1/2010 | Campion et al. |
| 7,702,108 B2 | 4/2010 | Amon et al. |
| 7,735,125 B1 | 6/2010 | Alvarez et al. |
| 7,761,331 B2 | 7/2010 | Low et al. |
| 7,783,379 B2 | 8/2010 | Beane et al. |
| 7,848,833 B2 | 12/2010 | Li |
| 7,881,965 B2 | 2/2011 | Bowles et al. |
| 7,890,373 B2 | 2/2011 | Junger |
| D640,199 S | 6/2011 | Wilson |
| 8,010,402 B1 | 8/2011 | Sharma et al. |
| 8,019,588 B1 | 9/2011 | Wohlberg et al. |
| 8,025,229 B2 | 9/2011 | Hammond et al. |
| 8,031,930 B2 | 10/2011 | Wang et al. |
| 8,107,243 B2 | 1/2012 | Guccione et al. |
| 8,112,325 B2 | 2/2012 | Foy et al. |
| 8,142,199 B1 | 3/2012 | Almouli |
| 8,156,008 B2 | 4/2012 | Bae et al. |
| 8,195,511 B2 | 6/2012 | Bowles et al. |
| 8,200,533 B2 | 6/2012 | Librizzi et al. |
| 8,200,736 B2 | 6/2012 | Shi |
| 8,215,546 B2 | 7/2012 | Lin et al. |
| 8,239,262 B2 | 8/2012 | Bowles et al. |
| 8,254,883 B2 | 8/2012 | Uchida |
| 8,266,008 B1 | 9/2012 | Siegel et al. |
| 8,340,815 B2 | 12/2012 | Peters et al. |
| 8,369,987 B2 | 2/2013 | Claessen |
| 8,401,914 B1 | 3/2013 | Kim |
| 8,417,234 B2 | 4/2013 | Sanding et al. |

(56) References Cited

U.S. PATENT DOCUMENTS

| | | |
|---|---|---|
| 8,423,404 B2 | 4/2013 | Bowles et al. |
| 8,429,021 B2 | 4/2013 | Kraft et al. |
| 8,463,646 B2 | 6/2013 | Bowles |
| 8,536,472 B2 | 9/2013 | Wu et al. |
| 8,543,358 B2 | 9/2013 | Trabona |
| 8,566,183 B1 | 10/2013 | Bonar et al. |
| 8,606,633 B2 | 12/2013 | Tarbert et al. |
| 8,718,717 B2 | 5/2014 | Vaknin et al. |
| 8,755,783 B2 | 6/2014 | Brahami et al. |
| 8,806,280 B2 | 8/2014 | Stephenson |
| 8,823,794 B2 | 9/2014 | Suzuki et al. |
| 8,824,136 B1 | 9/2014 | Interian et al. |
| 8,743,215 B1 | 11/2014 | Lee |
| 8,922,643 B2 | 12/2014 | Ji et al. |
| 9,010,627 B1 | 4/2015 | Prasad et al. |
| 9,043,026 B2 | 5/2015 | Lien et al. |
| 9,075,781 B2 | 7/2015 | Matthews |
| 9,124,056 B1 | 9/2015 | Lewis, Jr. |
| 9,189,911 B2 | 11/2015 | Kavli et al. |
| 9,195,979 B2 | 11/2015 | Geller |
| 9,256,863 B2 | 2/2016 | Chayon et al. |
| 9,283,672 B1 | 3/2016 | Matthews |
| 9,317,989 B2 | 4/2016 | Grow et al. |
| 9,355,515 B2 | 5/2016 | Brahami et al. |
| 9,367,436 B2 | 6/2016 | Matthews |
| 9,367,982 B2 | 6/2016 | Chayun et al. |
| 9,378,606 B2 | 6/2016 | Chayun et al. |
| 9,390,442 B2 | 7/2016 | Lyle |
| 9,469,037 B2 | 10/2016 | Matthews |
| 9,497,563 B2 | 11/2016 | Hornung et al. |
| 9,578,133 B2 | 2/2017 | Matthews |
| 9,582,101 B2 | 2/2017 | Chang et al. |
| 9,595,238 B2 | 3/2017 | Won |
| 9,621,947 B1 | 4/2017 | Oztaskent |
| 9,641,997 B2 | 5/2017 | Vratskides |
| 9,668,298 B1 | 5/2017 | Pearl et al. |
| 9,697,548 B1 | 7/2017 | Jaff et al. |
| 9,704,142 B2 | 7/2017 | Ahn |
| 9,718,196 B2 | 8/2017 | Matthews |
| 9,792,597 B1 | 10/2017 | Abbott |
| 9,818,160 B2 | 11/2017 | Bowles et al. |
| 9,858,178 B2 | 1/2018 | Matthews |
| 9,866,664 B2 | 1/2018 | Sinha et al. |
| 9,881,284 B2 | 1/2018 | Bowles et al. |
| 9,885,672 B2 | 2/2018 | Forutanpour et al. |
| 9,904,911 B2 | 2/2018 | Bowles et al. |
| 9,911,102 B2 | 3/2018 | Bowles |
| 9,934,644 B2 | 4/2018 | Chayun et al. |
| 9,936,331 B2 | 4/2018 | Matthews |
| 9,972,046 B2 | 5/2018 | Ackerman |
| 10,032,140 B2 | 7/2018 | Bowles et al. |
| 10,043,339 B2 | 8/2018 | Walker et al. |
| 10,044,843 B2 | 8/2018 | Sinha et al. |
| 10,055,798 B2 | 8/2018 | Bowles et al. |
| 10,127,647 B2 | 11/2018 | Forutanpour et al. |
| 10,157,379 B2 | 12/2018 | Singh |
| 10,157,427 B2 | 12/2018 | Bowles et al. |
| 10,261,611 B2 | 4/2019 | Matthews |
| 10,264,426 B2 | 4/2019 | Matthews |
| 10,269,110 B2 | 4/2019 | Forutanpour et al. |
| 10,275,813 B2 | 4/2019 | Fu |
| 10,325,440 B2 | 6/2019 | Abdelmalak et al. |
| 10,339,509 B2 | 7/2019 | Bordeleau et al. |
| 10,401,411 B2 | 9/2019 | Snook et al. |
| 10,417,615 B2 | 9/2019 | Bowles et al. |
| 10,438,174 B2 | 10/2019 | Bowles et al. |
| 10,445,708 B2 | 10/2019 | Hunt et al. |
| 10,452,527 B2 | 10/2019 | Matthews |
| 10,475,002 B2 | 11/2019 | Silva et al. |
| 10,496,963 B2 | 12/2019 | Silva et al. |
| 10,528,992 B2 | 1/2020 | Yost |
| 10,529,008 B1 | 1/2020 | Pritchard |
| 10,565,629 B2 | 2/2020 | Hartman |
| 10,572,946 B2 | 2/2020 | Bowles et al. |
| 10,671,367 B2 | 6/2020 | Matthews |
| 10,679,279 B2 | 6/2020 | Ward |
| 10,740,891 B1 | 8/2020 | Chen et al. |
| 10,803,527 B1 | 10/2020 | Zankat et al. |
| 10,810,732 B2 | 10/2020 | Dwivedi et al. |
| 10,824,942 B1 | 11/2020 | Bhotika et al. |
| 10,825,082 B2 | 11/2020 | Librizzi et al. |
| 10,834,555 B2 | 11/2020 | Matthews |
| 10,846,672 B2 | 11/2020 | Dion et al. |
| 10,853,873 B2 | 12/2020 | Bowles et al. |
| 10,860,122 B2 | 12/2020 | Matthews |
| 10,860,990 B2 | 12/2020 | Bowles et al. |
| 10,909,673 B2 | 2/2021 | Forutanpour et al. |
| 10,970,786 B1 | 4/2021 | Matheson et al. |
| 10,977,700 B2 | 4/2021 | Bordeleau et al. |
| 11,010,841 B2 | 5/2021 | Bowles et al. |
| 11,024,111 B2 | 6/2021 | Abdelmalak et al. |
| 11,080,662 B2 | 8/2021 | Bowles et al. |
| 11,080,672 B2 | 8/2021 | Bowles |
| 11,107,046 B2 | 8/2021 | Bowles |
| 11,122,034 B2 | 9/2021 | Cicchitto |
| 11,126,973 B2 | 9/2021 | Silva et al. |
| 11,164,000 B2 | 11/2021 | Lee et al. |
| 11,232,412 B2 | 1/2022 | Hunt et al. |
| 11,288,789 B1 | 3/2022 | Chen et al. |
| 11,302,038 B2 | 4/2022 | Muendel et al. |
| 11,315,093 B2 | 4/2022 | Bowles |
| 11,321,768 B2 | 5/2022 | Beauchamp |
| 11,341,471 B2 | 5/2022 | Dion et al. |
| 11,379,886 B1 | 7/2022 | Fields et al. |
| 11,386,740 B2 | 7/2022 | Shah |
| 11,417,068 B1 | 8/2022 | Burris et al. |
| 11,436,570 B2 | 9/2022 | Bowles et al. |
| 11,443,289 B2 | 9/2022 | Bowles et al. |
| 11,462,868 B2 | 10/2022 | Forutanpour et al. |
| 11,482,067 B2 | 10/2022 | Forutanpour et al. |
| 11,526,932 B2 | 12/2022 | Bowles et al. |
| 11,631,096 B2 | 4/2023 | Schubert et al. |
| 11,657,631 B2 | 5/2023 | Sagnoas |
| 11,843,206 B2 | 12/2023 | Forutanpour et al. |
| 11,907,915 B2 | 2/2024 | Bowles et al. |
| 12,033,454 B2 | 7/2024 | Forutanpour et al. |
| 12,045,973 B2 | 7/2024 | Johnson et al. |
| 2001/0025883 A1 | 10/2001 | Ichihara et al. |
| 2001/0035425 A1 | 11/2001 | Rocco et al. |
| 2001/0039531 A1 | 11/2001 | Aoki |
| 2002/0014577 A1 | 2/2002 | Ulrich et al. |
| 2002/0035515 A1 | 3/2002 | Moreno |
| 2002/0067184 A1 | 6/2002 | Smith et al. |
| 2002/0087413 A1 | 7/2002 | Mahaffy et al. |
| 2002/0112177 A1 | 8/2002 | Voltmer |
| 2002/0129170 A1 | 9/2002 | Moore et al. |
| 2002/0147656 A1 | 10/2002 | Tam |
| 2002/0157033 A1 | 10/2002 | Cox |
| 2002/0162966 A1 | 11/2002 | Yoder |
| 2002/0186878 A1 | 12/2002 | Hoon et al. |
| 2003/0006277 A1 | 1/2003 | Maskatiya et al. |
| 2003/0018897 A1 | 1/2003 | Bellis, Jr. et al. |
| 2003/0025476 A1 | 2/2003 | Trela |
| 2003/0036866 A1 | 2/2003 | Nair et al. |
| 2003/0061150 A1 | 3/2003 | Kocher et al. |
| 2003/0100707 A1 | 5/2003 | Hwang et al. |
| 2003/0146898 A1 | 8/2003 | Kawasaki et al. |
| 2003/0158789 A1 | 8/2003 | Miura et al. |
| 2003/0170529 A1 | 9/2003 | Sagawa |
| 2003/0179371 A1 | 9/2003 | Rangarajan et al. |
| 2003/0191675 A1 | 10/2003 | Murashita |
| 2003/0197782 A1 | 10/2003 | Ashe |
| 2003/0204289 A1 | 10/2003 | Banerjee et al. |
| 2004/0012825 A1 | 1/2004 | Tesavis |
| 2004/0039639 A1 | 2/2004 | Walker |
| 2004/0088231 A1 | 5/2004 | Davis |
| 2004/0114153 A1 | 6/2004 | Andersen et al. |
| 2004/0141320 A1 | 7/2004 | Bock et al. |
| 2004/0150815 A1 | 8/2004 | Sones et al. |
| 2004/0156557 A1 | 8/2004 | Van Der Weij |
| 2004/0156667 A1 | 8/2004 | Van Der Weij et al. |
| 2004/0184651 A1 | 9/2004 | Nordbryhn |
| 2004/0186744 A1 | 9/2004 | Lux |
| 2004/0189812 A1 | 9/2004 | Gustavsson |

(56) References Cited

U.S. PATENT DOCUMENTS

| | | |
|---|---|---|
| 2004/0200902 A1 | 10/2004 | Ishioroshi |
| 2004/0205015 A1 | 10/2004 | DeLaCruz |
| 2004/0235513 A1 | 11/2004 | O'Connell |
| 2004/0242216 A1 | 12/2004 | Boutsikakis |
| 2004/0243478 A1 | 12/2004 | Walker et al. |
| 2004/0262521 A1 | 12/2004 | Devitt et al. |
| 2005/0027622 A1 | 2/2005 | Walker et al. |
| 2005/0043897 A1 | 2/2005 | Meyer |
| 2005/0109841 A1 | 5/2005 | Ryan et al. |
| 2005/0128551 A1 | 6/2005 | Yang |
| 2005/0135917 A1 | 6/2005 | Kauppila et al. |
| 2005/0137942 A1 | 6/2005 | LaFluer |
| 2005/0139661 A1 | 6/2005 | Eglen et al. |
| 2005/0143149 A1 | 6/2005 | Becker et al. |
| 2005/0167620 A1 | 8/2005 | Cho et al. |
| 2005/0187657 A1 | 8/2005 | Hashimoto et al. |
| 2005/0216120 A1 | 9/2005 | Rosenberg et al. |
| 2005/0222690 A1 | 10/2005 | Wang et al. |
| 2005/0231595 A1 | 10/2005 | Wang et al. |
| 2005/0240958 A1 | 10/2005 | Nguyen et al. |
| 2006/0167580 A1 | 1/2006 | Whittier |
| 2006/0022827 A1 | 2/2006 | Highham |
| 2006/0038114 A9 | 2/2006 | Cofer et al. |
| 2006/0047573 A1 | 3/2006 | Mitchell et al. |
| 2006/0074756 A1 | 4/2006 | Boykin |
| 2006/0085158 A1 | 4/2006 | Cakiner |
| 2006/0184379 A1 | 8/2006 | Tan et al. |
| 2006/0195384 A1 | 8/2006 | Bauer et al. |
| 2006/0219776 A1 | 10/2006 | Finn |
| 2006/0229108 A1 | 10/2006 | Cehelnik |
| 2006/0235747 A1 | 10/2006 | Hammond et al. |
| 2006/0217152 A1 | 11/2006 | Fok et al. |
| 2006/0258008 A1 | 11/2006 | Holler et al. |
| 2006/0261931 A1 | 11/2006 | Cheng et al. |
| 2006/0271431 A1 | 11/2006 | Wehr et al. |
| 2006/0279307 A1 | 12/2006 | Wang et al. |
| 2006/0280356 A1 | 12/2006 | Yamagashi |
| 2006/0287929 A1 | 12/2006 | Bae et al. |
| 2007/0012665 A1 | 1/2007 | Nelson |
| 2007/0013124 A1 | 1/2007 | Graef et al. |
| 2007/0013139 A1 | 1/2007 | Kumagai |
| 2007/0032098 A1 | 2/2007 | Bowles et al. |
| 2007/0050083 A1 | 3/2007 | Signorelli |
| 2007/0057815 A1 | 3/2007 | Foy et al. |
| 2007/0129906 A1 | 6/2007 | Stoecker et al. |
| 2007/0133844 A1 | 6/2007 | Waehner et al. |
| 2007/0150403 A1 | 6/2007 | Mock et al. |
| 2007/0140310 A1 | 7/2007 | Rolton et al. |
| 2007/0205751 A1 | 9/2007 | Suzuki et al. |
| 2007/0258085 A1 | 11/2007 | Robbins |
| 2007/0263099 A1 | 11/2007 | Motta et al. |
| 2007/0269099 A1 | 11/2007 | Nishino et al. |
| 2007/0276911 A1 | 11/2007 | Bhumkar |
| 2007/0281734 A1 | 12/2007 | Mizrachi |
| 2007/0282999 A1 | 12/2007 | Tu et al. |
| 2008/0004828 A1 | 1/2008 | Mizrachi |
| 2008/0027581 A1 | 1/2008 | Saether et al. |
| 2008/0033596 A1 | 2/2008 | Fausak et al. |
| 2008/0109746 A1 | 5/2008 | Mayer |
| 2008/0111989 A1 | 5/2008 | Dufour et al. |
| 2008/0133432 A1 | 6/2008 | Ramseyer |
| 2008/0149720 A1 | 6/2008 | Colville |
| 2008/0167578 A1 | 7/2008 | Bryer et al. |
| 2008/0177598 A1 | 7/2008 | Davie |
| 2008/0207198 A1 | 8/2008 | Juric |
| 2008/0228582 A1 | 9/2008 | Fordyce |
| 2008/0231113 A1 | 9/2008 | Guccione et al. |
| 2008/0255901 A1 | 10/2008 | Carroll et al. |
| 2008/0256008 A1 | 10/2008 | Kwok |
| 2008/0260235 A1 | 10/2008 | Cai et al. |
| 2008/0277467 A1 | 11/2008 | Carlson |
| 2008/0281691 A1 | 11/2008 | Pearson et al. |
| 2008/0296374 A1 | 12/2008 | Gonen et al. |
| 2008/0303915 A1 | 12/2008 | Omi |
| 2008/0306701 A1 | 12/2008 | Zhong et al. |
| 2009/0051907 A1 | 2/2009 | Li et al. |
| 2009/0079388 A1 | 2/2009 | Reddy |
| 2009/0078775 A1 | 3/2009 | Giebel et al. |
| 2009/0095047 A1 | 4/2009 | Patel et al. |
| 2009/0114716 A1 | 5/2009 | Ramachandran |
| 2009/0132813 A1 | 5/2009 | Schibuk |
| 2009/0145727 A1 | 6/2009 | Johns |
| 2009/0156199 A1 | 6/2009 | Steenstra et al. |
| 2009/0160668 A1 | 6/2009 | Crowley et al. |
| 2009/0177319 A1 | 7/2009 | Garibaldi et al. |
| 2009/0184865 A1 | 7/2009 | Valo et al. |
| 2009/0187491 A1 | 7/2009 | Bull et al. |
| 2009/0190142 A1 | 7/2009 | Taylor et al. |
| 2009/0207743 A1 | 8/2009 | Huq et al. |
| 2009/0244285 A1 | 10/2009 | Chathukutty |
| 2009/0247133 A1 | 10/2009 | Holmen et al. |
| 2009/0248883 A1 | 10/2009 | Suryanarayana et al. |
| 2009/0251815 A1 | 10/2009 | Wang et al. |
| 2009/0262341 A1 | 10/2009 | Konopa et al. |
| 2009/0265035 A1 | 10/2009 | Jenkinson et al. |
| 2009/0299543 A1 | 12/2009 | Cox et al. |
| 2009/0312009 A1 | 12/2009 | Fishel |
| 2009/0321511 A1 | 12/2009 | Browne |
| 2009/0322706 A1 | 12/2009 | Austin |
| 2010/0005004 A1 | 1/2010 | Hudak et al. |
| 2010/0051695 A1 | 3/2010 | Yepez et al. |
| 2010/0063894 A1 | 3/2010 | Lundy |
| 2010/0110174 A1 | 5/2010 | Leconte |
| 2010/0115887 A1 | 5/2010 | Schroeder et al. |
| 2010/0147953 A1 | 6/2010 | Barkan |
| 2010/0157280 A1 | 6/2010 | Kusevic et al. |
| 2010/0161397 A1 | 6/2010 | Gauthier et al. |
| 2010/0162359 A1 | 6/2010 | Casey et al. |
| 2010/0174596 A1 | 7/2010 | Gilman |
| 2010/0185506 A1 | 7/2010 | Wolff |
| 2010/0219234 A1 | 9/2010 | Forbes |
| 2010/0235198 A1 | 9/2010 | Fini et al. |
| 2010/0237854 A1 | 9/2010 | Kumhyr et al. |
| 2010/0260271 A1 | 10/2010 | Kapoor |
| 2010/0262481 A1 | 10/2010 | Baker et al. |
| 2010/0312639 A1 | 12/2010 | Mastronardi |
| 2011/0035322 A1 | 2/2011 | Lively |
| 2011/0043628 A1 | 2/2011 | Yun |
| 2011/0047022 A1 | 2/2011 | Walker |
| 2011/0055322 A1 | 3/2011 | Gregersen |
| 2011/0060641 A1 | 3/2011 | Grossman et al. |
| 2011/0066514 A1 | 3/2011 | Maraz |
| 2011/0067520 A1 | 3/2011 | Ihrke et al. |
| 2011/0082734 A1 | 4/2011 | Zhang et al. |
| 2011/0113479 A1 | 5/2011 | Ganem |
| 2011/0173576 A1 | 7/2011 | Murphy et al. |
| 2011/0191861 A1 | 8/2011 | Spears |
| 2011/0296339 A1 | 12/2011 | Kang |
| 2011/0296508 A1 | 12/2011 | Os et al. |
| 2011/0313840 A1 | 12/2011 | Mason et al. |
| 2012/0004761 A1 | 1/2012 | Madruga |
| 2012/0016518 A1 | 1/2012 | Saario et al. |
| 2012/0022965 A1 | 1/2012 | Seergy |
| 2012/0026582 A1 | 2/2012 | Okabe et al. |
| 2012/0029985 A1 | 2/2012 | Wilson et al. |
| 2012/0030097 A1 | 2/2012 | Hagan et al. |
| 2012/0030399 A1 | 2/2012 | Ben-Harosh |
| 2012/0054113 A1 | 3/2012 | Jayaraman et al. |
| 2012/0063501 A1 | 3/2012 | Aguren |
| 2012/0078413 A1 | 3/2012 | Baker |
| 2012/0095875 A1 | 4/2012 | Guthrie |
| 2012/0116928 A1 | 5/2012 | Gventer |
| 2012/0116929 A1 | 5/2012 | Gventer |
| 2012/0117001 A1 | 5/2012 | Gventer et al. |
| 2012/0127307 A1 | 5/2012 | Hassenzahl |
| 2012/0146956 A1 | 6/2012 | Jenkinson |
| 2012/0209783 A1 | 8/2012 | Smith et al. |
| 2012/0235812 A1 | 9/2012 | De Mello et al. |
| 2012/0254046 A1 | 10/2012 | Librizzi et al. |
| 2012/0280934 A1 | 11/2012 | Ha |
| 2012/0301009 A1 | 11/2012 | Dabic |
| 2012/0303431 A1 | 11/2012 | Phillips et al. |
| 2013/0006713 A1 | 1/2013 | Haake |
| 2013/0034305 A1 | 2/2013 | Jahanshahi et al. |

(56) References Cited

U.S. PATENT DOCUMENTS

| | | |
|---|---|---|
| 2013/0041508 A1 | 2/2013 | Hu et al. |
| 2013/0046611 A1 | 2/2013 | Bowles et al. |
| 2013/0046699 A1 | 2/2013 | Bowles et al. |
| 2013/0112440 A1 | 5/2013 | Alsaif et al. |
| 2013/0124426 A1 | 5/2013 | Bowles et al. |
| 2013/0126741 A1 | 5/2013 | Srivastava et al. |
| 2013/0137376 A1 | 5/2013 | Fitzgerald et al. |
| 2013/0144797 A1 | 6/2013 | Bowles et al. |
| 2013/0155061 A1 | 6/2013 | Jahanshahi et al. |
| 2013/0159119 A1 | 6/2013 | Henderson et al. |
| 2013/0169413 A1 | 7/2013 | Schuessler |
| 2013/0173430 A1 | 7/2013 | Benjamin |
| 2013/0173434 A1 | 7/2013 | Hartman |
| 2013/0181935 A1 | 7/2013 | McKenzie et al. |
| 2013/0198089 A1 | 8/2013 | Bowles |
| 2013/0198144 A1 | 8/2013 | Bowles |
| 2013/0200912 A1 | 8/2013 | Panagas |
| 2013/0246211 A1 | 9/2013 | Sullivan |
| 2013/0246212 A1 | 9/2013 | Sullivan |
| 2013/0253700 A1 | 9/2013 | Carson et al. |
| 2013/0284805 A1 | 10/2013 | Kraft et al. |
| 2013/0290146 A1 | 10/2013 | West et al. |
| 2013/0297388 A1 | 11/2013 | Kyle, Jr. et al. |
| 2014/0006451 A1 | 1/2014 | Mullis et al. |
| 2014/0012643 A1 | 1/2014 | Behrisch |
| 2014/0028449 A1 | 1/2014 | Sigal et al. |
| 2014/0038556 A1 | 2/2014 | DeSousa |
| 2014/0046748 A1 | 2/2014 | Nagarajan |
| 2014/0046845 A1 | 2/2014 | Dogin et al. |
| 2014/0052329 A1 | 2/2014 | Amirpour |
| 2014/0067710 A1 | 3/2014 | Gventer et al. |
| 2014/0080550 A1 | 3/2014 | Ino et al. |
| 2014/0143161 A1 | 5/2014 | Ahn |
| 2014/0147004 A1 | 5/2014 | Uchida |
| 2014/0149201 A1 | 5/2014 | Abbott |
| 2014/0150100 A1 | 5/2014 | Gupta et al. |
| 2014/0156883 A1 | 6/2014 | Bowles |
| 2014/0178029 A1 | 6/2014 | Raheman et al. |
| 2014/0214505 A1 | 7/2014 | Shuster-Arechiga et al. |
| 2014/0235258 A1 | 8/2014 | Wang et al. |
| 2014/0244315 A1* | 8/2014 | Cahill et al. |
| 2014/0267691 A1 | 9/2014 | Humphrey |
| 2014/0278244 A1 | 9/2014 | Humphrey et al. |
| 2014/0297368 A1 | 10/2014 | Ferder |
| 2014/0330685 A1 | 11/2014 | Nazzari |
| 2014/0347473 A1 | 11/2014 | Wolff et al. |
| 2015/0006281 A1 | 1/2015 | Takahashi |
| 2015/0046343 A1 | 2/2015 | Martini |
| 2015/0066677 A1 | 3/2015 | Bowles et al. |
| 2015/0088698 A1 | 3/2015 | Ackerman |
| 2015/0088731 A1 | 3/2015 | Ackerman |
| 2015/0120485 A1 | 4/2015 | Nash |
| 2015/0161714 A1 | 6/2015 | Fainshtein |
| 2015/0170237 A1 | 6/2015 | Powell |
| 2015/0177330 A1 | 6/2015 | Morris |
| 2015/0193797 A1 | 7/2015 | Gerrity |
| 2015/0206200 A1 | 7/2015 | Edmondson et al. |
| 2015/0278529 A1 | 10/2015 | Cho et al. |
| 2015/0293860 A9 | 10/2015 | Bowles |
| 2015/0294278 A1 | 10/2015 | Nguyen |
| 2015/0309912 A1 | 10/2015 | Nguyen et al. |
| 2015/0317619 A1 | 11/2015 | Curtis |
| 2015/0324761 A1 | 11/2015 | Nguyen et al. |
| 2015/0324870 A1 | 11/2015 | Nguyen et al. |
| 2015/0332206 A1 | 11/2015 | Trew et al. |
| 2015/0356637 A1 | 12/2015 | Graffia et al. |
| 2016/0019607 A1 | 1/2016 | Burmester et al. |
| 2016/0019685 A1 | 1/2016 | Nguyen et al. |
| 2016/0055392 A1 | 2/2016 | Nakano |
| 2016/0078434 A1 | 3/2016 | Huxham et al. |
| 2016/0087381 A1 | 3/2016 | Wong et al. |
| 2016/0092849 A1 | 3/2016 | Cirannek et al. |
| 2016/0098689 A1* | 4/2016 | Bowles ............... G06Q 20/18 705/23 |
| 2016/0125612 A1 | 5/2016 | Seki et al. |
| 2016/0171544 A1 | 6/2016 | Heminger et al. |
| 2016/0171575 A1 | 6/2016 | Bowles et al. |
| 2016/0184990 A1 | 6/2016 | Song et al. |
| 2016/0210648 A1 | 7/2016 | Cirannek et al. |
| 2016/0269401 A1 | 9/2016 | Saito et al. |
| 2016/0269895 A1 | 9/2016 | Soini et al. |
| 2016/0275460 A1 | 9/2016 | Ploetner et al. |
| 2016/0275518 A1 | 9/2016 | Bowles et al. |
| 2016/0292710 A1 | 10/2016 | Casselle |
| 2016/0301786 A1 | 10/2016 | Koltsov et al. |
| 2016/0328684 A1 | 11/2016 | Bowles et al. |
| 2016/0379287 A1 | 12/2016 | Dabiri |
| 2017/0083886 A1 | 3/2017 | Silva et al. |
| 2017/0091823 A1 | 3/2017 | Adinarayan et al. |
| 2017/0110902 A1 | 4/2017 | Miller |
| 2017/0115235 A1 | 4/2017 | Ohlsson et al. |
| 2017/0169401 A1 | 6/2017 | Beane et al. |
| 2017/0221110 A1 | 8/2017 | Sullivan et al. |
| 2017/0256051 A1 | 9/2017 | Dwivedi et al. |
| 2017/0278191 A1 | 9/2017 | Tassone et al. |
| 2017/0301010 A1 | 10/2017 | Bowles et al. |
| 2017/0323279 A1 | 11/2017 | Dion et al. |
| 2017/0343481 A1 | 11/2017 | Jahanshahi et al. |
| 2018/0084094 A1 | 3/2018 | Sinha et al. |
| 2018/0101810 A1 | 4/2018 | Feng et al. |
| 2018/0157246 A1 | 6/2018 | Huang et al. |
| 2018/0157820 A1 | 6/2018 | Adams et al. |
| 2018/0160269 A1 | 6/2018 | Baarman et al. |
| 2018/0165655 A1 | 6/2018 | Marcelle et al. |
| 2018/0240144 A1 | 8/2018 | Curtis |
| 2018/0255047 A1 | 9/2018 | Cicchitto |
| 2018/0293566 A1 | 10/2018 | Engles et al. |
| 2018/0293664 A1 | 10/2018 | Zhang et al. |
| 2018/0300776 A1 | 10/2018 | Yost |
| 2018/0321163 A1 | 11/2018 | Casadio |
| 2018/0322623 A1 | 11/2018 | Memo et al. |
| 2018/0342050 A1 | 11/2018 | Fitzgerald et al. |
| 2018/0350163 A1 | 12/2018 | Pofale et al. |
| 2019/0017863 A1 | 1/2019 | Saltzman |
| 2019/0019147 A1 | 1/2019 | McCarty et al. |
| 2019/0051090 A1 | 2/2019 | Goldberg et al. |
| 2019/0066075 A1 | 2/2019 | Lobo et al. |
| 2019/0066439 A1 | 2/2019 | Pinkus |
| 2019/0073566 A1 | 3/2019 | Brauer |
| 2019/0073568 A1 | 3/2019 | He et al. |
| 2019/0102874 A1 | 4/2019 | Goja |
| 2019/0156611 A1 | 5/2019 | Redhead |
| 2019/0166278 A1 | 5/2019 | Hiyama et al. |
| 2019/0222748 A1 | 7/2019 | Weir et al. |
| 2019/0272628 A1 | 9/2019 | Tsou |
| 2019/0279431 A1 | 9/2019 | Wurmfeld et al. |
| 2019/0318465 A1 | 10/2019 | Nguyen |
| 2019/0372827 A1 | 12/2019 | Vasseur et al. |
| 2020/0020097 A1 | 1/2020 | Do et al. |
| 2020/0042795 A1 | 2/2020 | Lee et al. |
| 2020/0042969 A1 | 2/2020 | Ray |
| 2020/0066067 A1 | 2/2020 | Herman et al. |
| 2020/0090137 A1 | 3/2020 | Bowles et al. |
| 2020/0104720 A1 | 4/2020 | Boa et al. |
| 2020/0104868 A1 | 4/2020 | Schubert et al. |
| 2020/0175481 A1 | 6/2020 | Pham |
| 2020/0175669 A1 | 6/2020 | Bian et al. |
| 2020/0202319 A1 | 6/2020 | Forutanpour et al. |
| 2020/0202405 A1 | 6/2020 | Glickman et al. |
| 2020/0202419 A1 | 6/2020 | Beauchamp |
| 2020/0241891 A1 | 7/2020 | Li et al. |
| 2020/0265487 A1 | 8/2020 | Forutanpour et al. |
| 2020/0342442 A1 | 10/2020 | Curtis |
| 2020/0393742 A1 | 12/2020 | Dion et al. |
| 2020/0410793 A1 | 12/2020 | Folco |
| 2021/0012315 A1 | 1/2021 | Priebatsch |
| 2021/0081698 A1 | 3/2021 | Lindeman et al. |
| 2021/0081914 A1 | 3/2021 | Nelms et al. |
| 2021/0110366 A1 | 4/2021 | Dion et al. |
| 2021/0110440 A1 | 4/2021 | Dion et al. |
| 2021/0150773 A1 | 5/2021 | Muendel et al. |
| 2021/0174312 A1 | 6/2021 | Bowles et al. |
| 2021/0192484 A1 | 6/2021 | Forutanpour et al. |
| 2021/0209512 A1 | 7/2021 | Gaddam et al. |

(56) References Cited

U.S. PATENT DOCUMENTS

| | | |
|---|---|---|
| 2021/0209746 A1 | 7/2021 | Johnson et al. |
| 2021/0217076 A1 | 7/2021 | Kruper et al. |
| 2021/0224867 A1 | 7/2021 | Bordeleau et al. |
| 2021/0254966 A1 | 8/2021 | Hur et al. |
| 2021/0255240 A1 | 8/2021 | McGrath |
| 2021/0264483 A1 | 8/2021 | Hirata |
| 2021/0272208 A1 | 9/2021 | Leise et al. |
| 2021/0278338 A1 | 9/2021 | Jung |
| 2021/0295494 A1 | 9/2021 | Forutanpour et al. |
| 2021/0327203 A1 | 10/2021 | Shah |
| 2021/0343030 A1 | 11/2021 | Sagnoas |
| 2021/0357545 A1 | 11/2021 | Sugawara et al. |
| 2022/0027879 A1 | 1/2022 | Bowles et al. |
| 2022/0050897 A1 | 2/2022 | Gaddam et al. |
| 2022/0051212 A1 | 2/2022 | Forutanpour et al. |
| 2022/0051300 A1 | 2/2022 | Forutanpour et al. |
| 2022/0051301 A1 | 2/2022 | Forutanpour et al. |
| 2022/0051507 A1 | 2/2022 | Forutanpour et al. |
| 2022/0068076 A1 | 3/2022 | Forutanpour et al. |
| 2022/0114854 A1 | 4/2022 | Forutanpour et al. |
| 2022/0164833 A1 | 5/2022 | Dion et al. |
| 2022/0172178 A1 | 6/2022 | Forutanpour et al. |
| 2022/0187802 A1 | 6/2022 | Wittenberg et al. |
| 2022/0198407 A1 | 6/2022 | Beane et al. |
| 2022/0262189 A1* | 8/2022 | Dion .................. G06Q 50/10 |
| 2022/0277281 A1 | 9/2022 | Dion et al. |
| 2022/0284406 A1 | 9/2022 | Hunt et al. |
| 2022/0292464 A1 | 9/2022 | Silva et al. |
| 2022/0318774 A1 | 10/2022 | Bowles |
| 2023/0007937 A1 | 1/2023 | Forutanpour et al. |
| 2023/0077844 A1 | 3/2023 | Bowles et al. |
| 2023/0100849 A1 | 3/2023 | Bowles et al. |
| 2023/0188998 A1 | 6/2023 | Zellner et al. |
| 2023/0196865 A1 | 6/2023 | Forutanpour et al. |
| 2023/0238751 A1 | 7/2023 | Forutanpour et al. |
| 2023/0264871 A1 | 8/2023 | Williams et al. |
| 2023/0274346 A1 | 8/2023 | Bowles et al. |
| 2023/0297973 A1 | 9/2023 | Bowles et al. |
| 2023/0297974 A1 | 9/2023 | Bowles et al. |
| 2023/0306384 A1 | 9/2023 | Bowles et al. |
| 2023/0371729 A1 | 11/2023 | Williams et al. |
| 2024/0005289 A1 | 1/2024 | Silva et al. |
| 2024/0087276 A1 | 3/2024 | Silva et al. |
| 2024/0144461 A1 | 5/2024 | Forutanpour et al. |
| 2024/0185317 A1 | 6/2024 | Forutanpour et al. |
| 2024/0249251 A1 | 7/2024 | Bowles |
| 2024/0249321 A1 | 7/2024 | Forutanpour et al. |
| 2024/0265364 A1 | 8/2024 | Forutanpour et al. |
| 2024/0265470 A1 | 8/2024 | Bowles et al. |
| 2024/0289753 A1 | 8/2024 | Bowles |
| 2024/0321033 A1 | 9/2024 | Forutanpour et al. |
| 2024/0346463 A1 | 10/2024 | Hunt et al. |

FOREIGN PATENT DOCUMENTS

| | | |
|---|---|---|
| CA | 2866147 | 9/2013 |
| CA | 3069888 | 1/2019 |
| CA | 3069890 | 1/2019 |
| CN | 1365479 | 8/2002 |
| CN | 1574437 | 2/2005 |
| CN | 2708415 | 7/2005 |
| CN | 1864088 | 11/2006 |
| CN | 1957320 | 5/2007 |
| CN | 2912132 | 6/2007 |
| CN | 200965706 | 10/2007 |
| CN | 101176124 | 5/2008 |
| CN | 101379488 A | 3/2009 |
| CN | 201956656 U | 8/2011 |
| CN | 102315630 A | 1/2012 |
| CN | 102467728 A | 5/2012 |
| CN | 202351953 | 7/2012 |
| CN | 202353475 U | 7/2012 |
| CN | 102654927 | 8/2012 |
| CN | 202394296 | 8/2012 |
| CN | 102682597 A | 9/2012 |
| CN | 202564711 U | 11/2012 |
| CN | 202585951 U | 12/2012 |
| CN | 202702438 U | 1/2013 |
| CN | 202711369 U | 1/2013 |
| CN | 102930642 | 2/2013 |
| CN | 102976004 | 3/2013 |
| CN | 103198562 | 7/2013 |
| CN | 103226870 | 7/2013 |
| CN | 203242065 | 10/2013 |
| CN | 103440607 | 12/2013 |
| CN | 103514641 | 1/2014 |
| CN | 103544772 | 1/2014 |
| CN | 203408902 | 1/2014 |
| CN | 103662541 | 3/2014 |
| CN | 103679147 A | 3/2014 |
| CN | 203520502 | 4/2014 |
| CN | 103824387 A | 5/2014 |
| CN | 203588366 U | 5/2014 |
| CN | 103843040 | 6/2014 |
| CN | 103954626 | 7/2014 |
| CN | 302944037 S | 9/2014 |
| CN | 302944252 S | 9/2014 |
| CN | 302944253 S | 9/2014 |
| CN | 303042750 S | 12/2014 |
| CN | 205129815 U | 4/2016 |
| CN | 205132514 U | 4/2016 |
| CN | 205140067 U | 4/2016 |
| CN | 106022379 A | 10/2016 |
| CN | 303896361 S | 10/2016 |
| CN | 106203643 A | 12/2016 |
| CN | 106293734 A | 1/2017 |
| CN | 106372638 A | 2/2017 |
| CN | 304051346 S | 2/2017 |
| CN | 304139831 S | 5/2017 |
| CN | 304169301 S | 6/2017 |
| CN | 206440635 U | 8/2017 |
| CN | 107220640 A | 9/2017 |
| CN | 206466691 U | 9/2017 |
| CN | 107514978 A | 12/2017 |
| CN | 206861374 U | 1/2018 |
| CN | 207037788 U | 2/2018 |
| CN | 105444678 B | 3/2018 |
| CN | 304702339 S | 6/2018 |
| CN | 304702340 S | 6/2018 |
| CN | 304747709 S | 7/2018 |
| CN | 304795309 S | 8/2018 |
| CN | 108596658 A | 9/2018 |
| CN | 207854959 U | 9/2018 |
| CN | 108647588 A | 10/2018 |
| CN | 207993120 U | 10/2018 |
| CN | 207993121 U | 10/2018 |
| CN | 207995226 U | 10/2018 |
| CN | 304842785 S | 10/2018 |
| CN | 108764236 A | 11/2018 |
| CN | 208086545 U | 11/2018 |
| CN | 208172834 U | 11/2018 |
| CN | 208176564 U | 12/2018 |
| CN | 304958348 S | 12/2018 |
| CN | 305014434 S | 1/2019 |
| CN | 305014435 S | 1/2019 |
| CN | 109831575 A | 5/2019 |
| CN | 208819255 U | 5/2019 |
| CN | 208819289 U | 5/2019 |
| CN | 208819290 U | 5/2019 |
| CN | 208969761 U | 6/2019 |
| CN | 305275610 S | 7/2019 |
| CN | 110333876 A | 10/2019 |
| CN | 110347341 A | 10/2019 |
| CN | 110595361 A | 12/2019 |
| CN | 110653162 A | 1/2020 |
| CN | 110675399 A | 1/2020 |
| CN | 110751002 A | 2/2020 |
| CN | 110788015 A | 2/2020 |
| CN | 110796646 A | 2/2020 |
| CN | 110796647 A | 2/2020 |
| CN | 110796669 A | 2/2020 |
| CN | 110827244 A | 2/2020 |
| CN | 110827245 A | 2/2020 |
| CN | 110827246 A | 2/2020 |

(56) References Cited

FOREIGN PATENT DOCUMENTS

| | | | |
|---|---|---|---|
| CN | 110827247 A | 2/2020 |
| CN | 110827248 A | 2/2020 |
| CN | 110827249 A | 2/2020 |
| CN | 110880028 A | 3/2020 |
| CN | 110928730 A | 3/2020 |
| CN | 305638504 S | 3/2020 |
| CN | 110976302 A | 4/2020 |
| CN | 111009073 A | 4/2020 |
| CN | 111080184 A | 4/2020 |
| CN | 210348162 U | 4/2020 |
| CN | 111175318 A | 5/2020 |
| CN | 111210473 A | 5/2020 |
| CN | 305767220 S | 5/2020 |
| CN | 111238430 A | 6/2020 |
| CN | 111262987 A | 6/2020 |
| CN | 111272067 A | 6/2020 |
| CN | 111272388 A | 6/2020 |
| CN | 111272393 A | 6/2020 |
| CN | 111273704 A | 6/2020 |
| CN | 111277466 A | 6/2020 |
| CN | 111277659 A | 6/2020 |
| CN | 111277695 A | 6/2020 |
| CN | 111277696 A | 6/2020 |
| CN | 111290660 A | 6/2020 |
| CN | 111290949 A | 6/2020 |
| CN | 111291661 A | 6/2020 |
| CN | 111292302 A | 6/2020 |
| CN | 111294454 A | 6/2020 |
| CN | 111294459 A | 6/2020 |
| CN | 111307429 A | 6/2020 |
| CN | 111311556 A | 6/2020 |
| CN | 111311687 A | 6/2020 |
| CN | 111311749 A | 6/2020 |
| CN | 111314445 A | 6/2020 |
| CN | 111314535 A | 6/2020 |
| CN | 111325715 A | 6/2020 |
| CN | 111325716 A | 6/2020 |
| CN | 111325717 A | 6/2020 |
| CN | 111325901 A | 6/2020 |
| CN | 210666955 U | 6/2020 |
| CN | 305818424 S | 6/2020 |
| CN | 111439560 A | 7/2020 |
| CN | 211149556 U | 7/2020 |
| CN | 305955503 S | 7/2020 |
| CN | 211291337 U | 8/2020 |
| CN | 211296771 U | 8/2020 |
| CN | 211402187 U | 9/2020 |
| CN | 211515235 U | 9/2020 |
| CN | 211538600 U | 9/2020 |
| CN | 111830293 A | 10/2020 |
| CN | 111830354 A | 10/2020 |
| CN | 111860890 A | 10/2020 |
| CN | 111860891 A | 10/2020 |
| CN | 211630227 U | 10/2020 |
| CN | 306113050 S | 10/2020 |
| CN | 306113051 S | 10/2020 |
| CN | 306113052 S | 10/2020 |
| CN | 212023984 U | 11/2020 |
| CN | 212031269 U | 11/2020 |
| CN | 306164092 S | 11/2020 |
| CN | 306164093 S | 11/2020 |
| CN | 306164094 S | 11/2020 |
| CN | 306164095 S | 11/2020 |
| CN | 112098443 A | 12/2020 |
| CN | 212084259 U | 12/2020 |
| CN | 212268703 U | 1/2021 |
| CN | 212314534 U | 1/2021 |
| CN | 212322247 U | 1/2021 |
| CN | 212364464 U | 1/2021 |
| CN | 306272538 S | 1/2021 |
| CN | 306283626 S | 1/2021 |
| CN | 112348761 A | 2/2021 |
| CN | 112348808 A | 2/2021 |
| CN | 112393880 A | 2/2021 |
| CN | 112395118 A | 2/2021 |
| CN | 212586854 U | 2/2021 |
| CN | 212597202 U | 2/2021 |
| CN | 306323627 S | 2/2021 |
| CN | 112433902 A | 3/2021 |
| CN | 112452935 A | 3/2021 |
| CN | 112455988 A | 3/2021 |
| CN | 112456100 A | 3/2021 |
| CN | 112565505 A | 3/2021 |
| CN | 212677296 U | 3/2021 |
| CN | 212681731 U | 3/2021 |
| CN | 111314537 B | 4/2021 |
| CN | 112613622 A | 4/2021 |
| CN | 112613914 A | 4/2021 |
| CN | 112614117 A | 4/2021 |
| CN | 112614269 A | 4/2021 |
| CN | 112633194 A | 4/2021 |
| CN | 112634245 A | 4/2021 |
| CN | 112634288 A | 4/2021 |
| CN | 112634301 A | 4/2021 |
| CN | 112672145 A | 4/2021 |
| CN | 112735081 A | 4/2021 |
| CN | 213001252 U | 4/2021 |
| CN | 213004872 U | 4/2021 |
| CN | 112777290 A | 5/2021 |
| CN | 112783702 A | 5/2021 |
| CN | 112816490 A | 5/2021 |
| CN | 112822740 A | 5/2021 |
| CN | 112828842 A | 5/2021 |
| CN | 112837076 A | 5/2021 |
| CN | 112837102 A | 5/2021 |
| CN | 213149008 U | 5/2021 |
| CN | 213301455 U | 5/2021 |
| CN | 213301535 U | 5/2021 |
| CN | 213305483 U | 5/2021 |
| CN | 112907182 A | 6/2021 |
| CN | 112991614 A | 6/2021 |
| CN | 113032198 A | 6/2021 |
| CN | 113034481 A | 6/2021 |
| CN | 113034493 A | 6/2021 |
| CN | 113034529 A | 6/2021 |
| CN | 113034530 A | 6/2021 |
| CN | 113034531 A | 6/2021 |
| CN | 113038012 A | 6/2021 |
| CN | 113052798 A | 6/2021 |
| CN | 113110806 A | 7/2021 |
| CN | 113114794 A | 7/2021 |
| CN | 113132523 A | 7/2021 |
| CN | 113160494 A | 7/2021 |
| CN | 113190215 A | 7/2021 |
| CN | 113191789 A | 7/2021 |
| CN | 213765490 U | 7/2021 |
| CN | 213796595 U | 7/2021 |
| CN | 213807304 U | 7/2021 |
| CN | 306700330 S | 7/2021 |
| CN | 113220647 A | 8/2021 |
| CN | 113220648 A | 8/2021 |
| CN | 113237473 A | 8/2021 |
| CN | 113238680 A | 8/2021 |
| CN | 113238905 A | 8/2021 |
| CN | 113252678 A | 8/2021 |
| CN | 113254292 A | 8/2021 |
| CN | 113254293 A | 8/2021 |
| CN | 113254294 A | 8/2021 |
| CN | 113268162 A | 8/2021 |
| CN | 113298078 A | 8/2021 |
| CN | 113301202 A | 8/2021 |
| CN | 113329222 A | 8/2021 |
| CN | 213917879 U | 8/2021 |
| CN | 213933659 U | 8/2021 |
| CN | 306744667 S | 8/2021 |
| CN | 306744668 S | 8/2021 |
| CN | 306786433 S | 8/2021 |
| CN | 306786434 S | 8/2021 |
| CN | 113422860 A | 9/2021 |
| CN | 214160736 U | 9/2021 |
| CN | 214162705 U | 9/2021 |
| CN | 214427985 U | 10/2021 |
| CN | 113591066 A | 11/2021 |
| CN | 113591963 A | 11/2021 |

(56) References Cited

FOREIGN PATENT DOCUMENTS

| | | |
|---|---|---|
| CN | 215246545 U | 12/2021 |
| CN | 215247165 U | 12/2021 |
| CN | 215247245 U | 12/2021 |
| CN | 215247426 U | 12/2021 |
| CN | 215262785 U | 12/2021 |
| CN | 215262787 U | 12/2021 |
| CN | 215266884 U | 12/2021 |
| CN | 215266954 U | 12/2021 |
| CN | 215325354 U | 12/2021 |
| CN | 215555043 U | 1/2022 |
| CN | 215556081 U | 1/2022 |
| CN | 215575427 U | 1/2022 |
| CN | 215576764 U | 1/2022 |
| CN | 215576765 U | 1/2022 |
| CN | 215703219 U | 2/2022 |
| CN | 215708961 U | 2/2022 |
| CN | 216612155 U | 5/2022 |
| CN | 112672145 B | 2/2023 |
| DE | 10031532 | 10/2001 |
| EP | 0116970 | 12/1991 |
| EP | 0654003 | 5/1995 |
| EP | 1168253 | 1/2002 |
| EP | 1270905 | 1/2003 |
| EP | 1703436 | 9/2006 |
| EP | 3206194 A1 | 8/2017 |
| EP | 2428072 | 1/2018 |
| FR | 3047833 B1 | 3/2018 |
| GB | 2167553 | 5/1986 |
| GB | 202209941 | 7/2022 |
| GR | 20210100761 | 7/2022 |
| HK | 30014296 A | 8/2020 |
| JP | H07112801 | 5/1995 |
| JP | H7334583 | 12/1995 |
| JP | H11242005 | 9/1999 |
| JP | H11334851 | 12/1999 |
| JP | 2000121564 | 4/2000 |
| JP | 2000171409 A | 6/2000 |
| JP | 2000180371 | 6/2000 |
| JP | 3123095 | 1/2001 |
| JP | 2001312766 | 11/2001 |
| JP | 2002019147 | 1/2002 |
| JP | 2002183286 | 6/2002 |
| JP | 2002259528 | 9/2002 |
| JP | 2002302252 | 10/2002 |
| JP | 2002324264 | 11/2002 |
| JP | 2002358354 | 12/2002 |
| JP | 2003139516 | 5/2003 |
| JP | 2003230229 | 8/2003 |
| JP | 2003242243 | 8/2003 |
| JP | 2003264007 | 9/2003 |
| JP | 2003267509 | 9/2003 |
| JP | 2004021569 | 1/2004 |
| JP | 2004191496 | 7/2004 |
| JP | 2004226129 | 8/2004 |
| JP | 2004239850 | 8/2004 |
| JP | 2004288143 | 10/2004 |
| JP | 2004303102 | 10/2004 |
| JP | 2004341681 | 12/2004 |
| JP | 2005063203 | 3/2005 |
| JP | 2005122059 | 5/2005 |
| JP | 2005308476 | 11/2005 |
| JP | 2006127308 | 5/2006 |
| JP | 2006195814 | 7/2006 |
| JP | 2006203451 | 8/2006 |
| JP | 2006227764 | 8/2006 |
| JP | 2006260246 | 9/2006 |
| JP | 2007141266 | 6/2007 |
| JP | 2007155455 | 6/2007 |
| JP | 2007179516 | 7/2007 |
| JP | 2007265340 | 10/2007 |
| JP | 2008045959 | 2/2008 |
| JP | 2008059403 A | 3/2008 |
| JP | 2008522299 | 6/2008 |
| JP | 2008293391 | 12/2008 |
| JP | 2007086725 | 4/2009 |
| JP | 2009175035 | 8/2009 |
| JP | 2009245058 | 10/2009 |
| JP | 2009250971 | 10/2009 |
| JP | 2009290852 | 12/2009 |
| JP | 2010177720 | 8/2010 |
| JP | 2010276896 | 12/2010 |
| JP | 2011518387 | 6/2011 |
| JP | 2012504832 | 2/2012 |
| JP | 2012058932 | 3/2012 |
| JP | 2013033361 | 2/2013 |
| JP | 2013037441 | 2/2013 |
| JP | 6050922 B2 | 12/2016 |
| JP | 2017040957 A | 2/2017 |
| JP | 2017093938 | 6/2017 |
| JP | 2017142781 A | 8/2017 |
| JP | 2017173902 A | 9/2017 |
| JP | 2017201559 A | 11/2017 |
| JP | 6266065 B1 | 3/2018 |
| JP | 2019012474 | 1/2019 |
| JP | 3223233 U | 9/2019 |
| JP | 2022539909 A | 9/2022 |
| JP | 2022539910 A | 9/2022 |
| JP | 2022539912 A | 9/2022 |
| JP | 2022545336 A | 9/2022 |
| KR | 20000064168 | 11/2000 |
| KR | 20010074614 | 8/2001 |
| KR | 20010097567 | 11/2001 |
| KR | 100766860 | 10/2007 |
| KR | 20130085255 | 7/2013 |
| KR | 101326680 | 11/2013 |
| KR | 101329949 | 11/2013 |
| KR | 20140037543 | 3/2014 |
| KR | 101599251 | 3/2016 |
| KR | 20180088062 | 8/2018 |
| KR | 20180088063 | 8/2018 |
| KR | 1020180086617 | 8/2018 |
| KR | 20180117278 | 10/2018 |
| KR | 20190026131 | 3/2019 |
| KR | 20190107593 | 9/2019 |
| KR | 20190107595 | 9/2019 |
| KR | 20190107596 | 9/2019 |
| KR | 1020190107594 | 9/2019 |
| KR | 1020200115308 | 10/2020 |
| KR | 20210020717 | 2/2021 |
| KR | 1020210059148 | 5/2021 |
| KR | 1020210107515 | 9/2021 |
| WO | WO8503790 | 8/1985 |
| WO | WO2001015096 | 3/2001 |
| WO | WO2002005176 | 1/2002 |
| WO | WO0221090 | 3/2002 |
| WO | WO2002025613 | 3/2002 |
| WO | WO2002039357 | 5/2002 |
| WO | WO2003012717 | 2/2003 |
| WO | WO2003014994 | 2/2003 |
| WO | WO2004021114 | 3/2004 |
| WO | WO2004114490 | 12/2004 |
| WO | WO2005008566 | 1/2005 |
| WO | 2005054877 | 6/2005 |
| WO | WO2005101346 | 10/2005 |
| WO | WO2006021825 | 3/2006 |
| WO | WO2006058601 | 6/2006 |
| WO | WO2006080851 | 8/2006 |
| WO | WO2007066166 | 6/2007 |
| WO | WO2009089607 | 7/2009 |
| WO | WO2009128173 | 10/2009 |
| WO | WO2009128176 | 10/2009 |
| WO | WO2009129526 | 10/2009 |
| WO | WO2010040116 | 4/2010 |
| WO | WO2010128267 | 11/2010 |
| WO | WO2010128315 | 11/2010 |
| WO | WO2011131016 | 10/2011 |
| WO | WO2012073126 | 6/2012 |
| WO | WO2013002748 | 1/2013 |
| WO | WO2013074819 | 5/2013 |
| WO | WO2014075055 | 5/2014 |
| WO | WO2014141180 | 9/2014 |
| WO | WO2015022409 | 2/2015 |
| WO | WO2015093676 | 6/2015 |
| WO | WO2015108864 | 7/2015 |

(56) References Cited

FOREIGN PATENT DOCUMENTS

| | | |
|---|---|---|
| WO | WO2016181224 | 11/2016 |
| WO | WO2015196175 | 12/2016 |
| WO | WO2017034441 | 3/2017 |
| WO | WO2017081527 | 5/2017 |
| WO | WO2017156046 | 9/2017 |
| WO | WO2018124669 | 7/2018 |
| WO | WO2018133068 | 7/2018 |
| WO | WO2018146374 | 8/2018 |
| WO | WO2019012305 | 1/2019 |
| WO | WO2019012505 | 1/2019 |
| WO | WO2019012506 | 1/2019 |
| WO | WO2019212513 | 11/2019 |
| WO | WO2019212515 | 11/2019 |
| WO | 2019008943 A1 | 4/2020 |
| WO | WO2020082991 | 4/2020 |
| WO | WO2020204503 | 10/2020 |
| WO | WO2021019286 | 2/2021 |
| WO | WO2021082918 A1 | 5/2021 |
| WO | WO2021082919 A1 | 5/2021 |
| WO | WO2021082920 A1 | 5/2021 |
| WO | WO2021082921 A1 | 5/2021 |
| WO | WO2021082922 A1 | 5/2021 |
| WO | WO2021082923 | 5/2021 |
| WO | WO2021142009 | 7/2021 |
| WO | WO2021147385 | 7/2021 |
| WO | WO2021147386 | 7/2021 |
| WO | WO2021147387 | 7/2021 |
| WO | WO2021147388 A1 | 7/2021 |
| WO | WO2021172803 | 9/2021 |
| WO | WO2022034298 | 2/2022 |
| WO | WO2022090999 | 5/2022 |
| WO | WO2022091000 | 5/2022 |
| WO | 2023073248 | 5/2023 |

OTHER PUBLICATIONS

"Md Rafiul Hassan et. al., A Novel Cascaded Deep Neural Network for Analyzing Smart Phone Data for Indoor Localization, Dec. 2019, Future Generation Computer Systems, vol. 101, pp. 760-769" (Year: 2019).*
2006 Florida Statutes Title XXXIII, Chapter 538, Sections 538.03 and 538.04, 7 pages.
3GPP Organizational Partners, "3rd Generation Partnership Project; Technical Specification Group Terminals; AT command set for GSM Mobile Equipment (ME)," Global System for Mobile Communications, 1998, 124 pages.
Aftermarket Cellular Accessories, "Cellular Phone Model Identification," retrieved from http://web/archive.org/web/20060328064957/http://aftermarketcellular.com/ic/identification.html on Mar. 16, 2014, published Mar. 28, 2006, 3 pages.
Altec Lansing User's Guide 2007, 8 pages.
Bhule et al., "Environmental and economic trade-offs in consumer electronic products recycling: a case study of cell phones and computers," IEEE International Symposium on Electronics and the Environment, Conference Record, 2004.
Bournique, D.: "Mobile Karma Shuts Down As iCloud and Blacklists Challenge Used Phone Buyers", Prepaid Phone News, Jul. 23, 2014 (Jul. 23, 2014), XP055229747, Retrieved from the Internet URL:http://www.prepaidphonenews.com/2014/07/mobile-karma-shuts-down-as-icloud-and.html; accessed Nov. 27, 2017; 2 pages.
Business Wire, "The World's First Office Photography Machine" at CES 2008 Launched by Ortery Technologies, Jan. 7, 2008, 3 pages.
CNET, "Tackling LCD "burn ins", and dead/stick Pixels", published Sep. 2, 2009, retrieved from http://www.cnet.com/news/tackling-lcd-burn-ins-and-deadstuck-pixels/.
Cybercom Group Europe AB, "OMSI Forum," Downloads, 2005, 2 pages.
Cybercom Group Europe AB, "OMSI Provides Easy Service and Maintenance for Mobile Phones," Press Release, 2005, 1 page.
Cybercom Group Europe AB, "The OMSI 2.0 Interface Supports," OMSI 2.0 Description, available at least before Oct. 2008, 1 page.
Cybercom Group, "Leading Telecom Organisations Address Device Management Issues," Press Release, 2007, 1 page.
Evgenii Masunov, Mar. 25, 2010, http://www.appleinsider.ru/news/ipone-obladaet-luchshim-tachskrinom-provereno_robotom.html, 4 pages.
Foster et al., "Automated Visual Inspection: A Tutorial" 1990 Computers Ind. Engng. vol. 18(4): 493-504.
Geekanoids, You Tube Video, "Apple iphone 3GS Unboxing and Review", uploaded on Jun. 19, 2009, retrieved from http://www.youtube.com/watch?v=GCEI9QAeDok on Sep. 2, 2009.
Geyer et al. "The economics of cell phone reuse and recylcing," The International Journal of Advanced Manufacturing Technology, 47(5): 515-525, 2010.
Graffia et al., "Retail Station for E-Device Identification, Assessment, and Trade-In", Jun. 6, 2014 (Drawings and Specification) (Year: 2014).
Watson; "Review: SanDisk iXpand Wireless Charger" Sep. 15, 2019, 4 pages retrieved at https://www.whatmobile.net/Reviews/article/review-sandisk-ixpand-wireless-charger.
GSM Arena Glossary, "LCD (Liquid Crystal Display", retrieved from http://www.gsmarena.com/glossary.php3?term=LCD on Apr. 28, 2016, 1 page.
Hazelwood, et al.; "Life Extension of Electronic Products: A Case Study of Smartphones", Sep. 20, 2021, IEEE Access, vol. 9, pp. 144726-144739, DOI: 10.1109/ACCESS.2021.3121733.
International Numbering Plan. Retrieved on Apr. 5, 2013 at http://web.archive.org/web/20070322214125/http://www.numberingplans.com/?page+analysis&sub+imeinr, 2 pages.
Investopedia: What's the difference between weighted average accounting and FIFO/LILO accounting methods? Aug. 19, 2010. Accessed via archive.org [https://web.archive.org/web/20100819200402/http://www.investopedia.com/ask/answers/09/weighted-average-fifo-lilo-accounting.asp].
Kanter, James Max, "Color Crack:Identifying Cracks in Glass," dated Dec. 9, 2014; retrieved from the internet http://www.jmaxkanter.com/static/papers/color_crack.pdf on Sep. 22, 2017.
Lambert, Emily, "Use It Up, Wear It Out", Forbes 175.5 (2005): 77-78. Business Source Complete. Web. Jan. 6, 2015, 3 pages.
Littleton Partners with Donations Ink (Jan. 19, 2006) US Fed News Service, Including US State News. Web. Jan. 6, 2015, 1 page.
MobileGazette.com, "2006 in Review: The Good, The Bad and The Ugly", published Dec. 2006, retrieved from http://www.mobilegazette.com/2006-review-06x12x22.htm on Nov. 11, 2015.
Kuriyan, et al.: "Review of Research on Rural PC Kiosks," Apr. 14, 2007, 22 pages, retrieved at http://research.microsoft.com/research/tem/kiosks.
Oliveira, et al., "Automatic crack detection on road imagery using anisotropic diffusion and region linkage," 18th European Signal Processing Conference (EUSIPCO-2010), Aug. 23, 2010, pp. 274-278.
Novotny, et al.; "Smart City Concept, Applications and Services," Aug. 26, 2014, Journal of Telecommunications System & Management, vol. 3, Issue 2, pp. 1-8, DOI: 10.4172/2167-0919.1000117.
PC World, "Wipe Your Cell Phone's Memory Before Giving it Away", published Jan. 2006, retrieved from http://www.washingtonpost.com/wp-dyn/content/article/2006/01/30/AR2006013001144.html on Nov. 10, 2015.
Perng et al., "A Novel Vision System for CRT Panel Auto-Inspection", Proceedings of the 2005 IEEE International Conference on Mechatronics, Jul. 10-12, 2005, pp. 4.
Perng et al., "A Novel Vision System for CRT Panel Auto-Inspection", Journal of the Chinese Institute of Industrial Engineers, vol. 24, No. 5, pp. 341-350 (2007).
Phifer, "How to Use your 3G Phone as a Wireless Broad Band Modem," Computer Weekly News, 2007, 6 pages.
Rawson, Chris, "TUAW: 25 Ways to Check the Hardware on Your iphone 4", published Aug. 12, 2010, retrieved at http://www.tuaw.com/2010/08/13/hardware-test-your-iphone-4/ on Feb. 28, 2014.
Rehg et al. "Vision for a Smart Kiosk", Jun. 1997, Computer Vision and Pattern Recognition, pp. 690-696.

(56) References Cited

OTHER PUBLICATIONS

RMS Communications Group, "RMS Communications Group Inc. opens cell phone kiosk at Ocean City Mall in Toms River, N.J.", retrieved from http://www.prweb.com/releases/2004/11/prweb177351.htm, Nov. 12, 2004, 2 pages.
Rolf Steinhilper "Remanufacturing: The Ultimate Form of Recycling", Fraunhofer IRBVerlag, 1998, parts 1-3, http://www.reman.org/Publications_main.htm.
Romano "Recycling a Phone at EcoATM is an Easy Route To Feeling Green," Xconomy, Jan. 22, 2014, pp. 1-3.
Rosebrock, "How to Build a Kick-Ass Mobile Document Scanner in Just 5 Minutes" PyImage Search, Sep. 2014, 19 pages.
Shotton et al., "Efficiently Combining Contour and Texture Cues for Object Recognition", Proceedings of the British Machine Vision Conference 2008, (20080901), pp. 7.1-7.10 * abstract *.
Shue, Jiuh-Biing et al. "Extended consumer responsibility: Syncretic value-oriented pricing strategies for trade-in-for-upgrade programs" Transportation Research Part E: Logistics and Transportation Review 122 (2019) 350-367.
Simplysellular, "Get Cash for your Old Cell Phone", published Apr. 2, 2010, retrieved from http://simplysellular.com/conditions.php on Jan. 6, 2015, 2 pages.
Sony Ericsson Mobile Communications Ab, "P800/P802," White Paper, 2003, 128 pages.
Sony Ericsson Mobile Communications AB, "T68i/T68ie," White Paper, 2002, 71 pages.
Tecace Software: "Your phone appraisal-Movaluate—Android Apps on Google Play", Android Apps On Google Play, Aug. 12, 2013 (Aug. 12, 2013), XP055230264, Retrieved from the Internet URL:https://play.google.com/store/apps/details?id=com.tecace.android.app.movaluate&hl=en; accessed Nov. 27, 2017; 2 pages.
Tech Spurt; Sandisk iXpand Review, Wireless Charger & Auto Photo Backup!, Aug. 21, 2019, 1 page, retrieved at https://www.youtube.com/watch?v=zemKQ6xULww.
Trading devices for dollars, The Economist (US) 405.8813:8 (US), Economist Intelligence Unit N.A. Incorporated, Dec. 1, 2012.
Turner, "5 MP3 Players for Pumping Up Your Workouts," Mashable.com, Nov. 4, 2010, available online at https://mashable.com/2010/11/04/mp3-players-for-sports/ (Year: 2010).
Grose, Thomas; "New Life for Old Phones," ASE Prism 22.3 (2012): 18.
Waugh, "Phone recycling machine lets you drop in old mobiles—and spits out cash instantly," Daily Mail Online, Jan. 13, 2012, p. 1-2.
Wikipedia, "Machine Vision" Sep. 19, 2009, 6 pages.
Wiley Encyclopedia of Computer Science and Technology, Nov. 2008, 2362 pages, Wiley-interscience, ISBN-10: 0471383937, ISBN-13: 978-0471383932.
Wilson, Doug, "Liquid Crystal Display (LCD) Inspection System", National Instruments Case Study, available May 10, 2009, retrieved from http://sine.ni.com/cs/app/cod/p/id/cs-345 on Jan. 5, 2015, 2 pages.
Wu, "Overview of Wireless Power and Data Communication" WPC/QI Developers Forum, Oct. 29, 2016, 21 pages.
Yahoo Answers, "What is a Clean ESN?" published Jun. 23, 2009, retrieved from http://web.archive.org/web/20090623215042/http://answers.yahoo.com/question/inde,80 20US?gid= 20080318061012AANFRco on Apr. 3, 2014.
Zhang, Yiyang, "The design of glass crack detection system based on image preprocessing technology," 2014 IEEE 7th Joint International Information Technology and Artificial Intelligence Conference, IEEE, Dec. 20, 2014; pp. 39-42.
International Search Report and Written Opinion mailed Jun. 10, 2015 in International Application No. PCT/US2015/014139. 9 pages.
International Search Report and Written Opinion mailed Dec. 22, 2015 in International Application No. PCT/US2015/053591, 18 pages.
Non-Final Office Action mailed Aug. 24, 2017 in U.S. Appl. No. 15/630,539, 23 pages.
Non-Final Office Action mailed Sep. 1, 2017 in U.S. Appl. No. 15/630,460, 23 pages.
Non-Final Office Action mailed Sep. 8, 2017 in U.S. Appl. No. 15/630,508, 13 pages.
Non-Final Office Action response filed Dec. 8, 2017 in U.S. Appl. No. 15/630,508, 19 pages.
Non-Final Office Action response filed Nov. 2, 2017 in U.S. Appl. No. 15/630,539, 15 pages.
Non-Final Office Action Response filed Nov. 29, 2017 in U.S. Appl. No. 15/630,460, 16 pages.
Non-Final Office Action mailed Dec. 29, 2017 in U.S. Appl. No. 14/873,158, 14 pages.
Notice of Allowance mailed Jan. 17, 2018 in U.S. Appl. No. 15/630,539 of Bowles et al., filed Jun. 22, 2017.
Final Office Action mailed Feb. 1, 2018 in U.S. Appl. No. 15/630,460, 47 pages.
Non-Final Office Action response filed Mar. 29, 2018 in U.S. Appl. No. 14/873,158, 18 pages.
Final Office Action mailed Apr. 19, 2018 in U.S. Appl. No. 15/630,508, 15 pages.
Final Office Action Response as Appeal Brief filed Jun. 19, 2018 in U.S. Appl. No. 15/630,460, 24 pages.
Final Office Action mailed Jul. 23, 2018 in U.S. Appl. No. 14/873,158, 13 pages.
Examiner's Answer to Appeal Briefs dated Sep. 28, 2018 in U.S. Appl. No. 15/630,460, 16 pages.
Non-Final Office Action mailed Oct. 22, 2018 in U.S. Appl. No. 14/873,145, 7 pages.
Final Office Action response filed Mar. 25, 2019 in U.S. Appl. No. 14/873,158, 14 pages.
Final Office Action response filed Apr. 3, 2019 in U.S. Appl. No. 15/630,508, 13 pages.
Non-Final Office Action response filed Apr. 22, 2019 in U.S. Appl. No. 14/873,145, 13 pages.
Notice of Allowance mailed May 6, 2019 in U.S. Appl. No. 14/873,158, 7 pages.
Notice of Allowance mailed May 7, 2019 in U.S. Appl. No. 15/630,508 of Silva, J., et al., filed Jun. 22, 2017, 7 pages.
Notice of Allowance mailed Jun. 28, 2019 in U.S. Appl. No. 14/873,145, 9 pages.
Notice of Allowance mailed Sep. 5, 2019 in U.S. Appl. No. 14/873,158, 7 pages.
Notice of Allowance mailed Sep. 9, 2019 in U.S. Appl. No. 15/630,508 of Silva, J., et al., filed Jun. 22, 2017, 7 pages.
Supplemental Appeal Brief filed Apr. 9, 2020 in U.S. Appl. No. 15/630,460, 4 pages.
Written Submissions Arguments and Claims Filed Apr. 23, 2020, EP17180663.1, 6pgs.
Preliminary Opinion in Response to Written Submissions, Jul. 6, 2020, EP17180663.1, 5pgs.
Notice of Allowance mailed Jul. 6, 2020 in U.S. Appl. No. 15/630,460, 8 pages.
Declaration in Support of Written Submissions Jul. 8, 2020, EP17180663.1, 3pgs.
Decision to Refuse Application Sep. 25, 2020, EP17180663.1, 7pgs.
Non-Final Office Action mailed Oct. 16, 2020 in U.S. Appl. No. 16/575,003, 11 pages.
Non-Final Office Action response filed Mar. 16, 2021 in U.S. Appl. No. 16/575,003, 13 pages.
Notice of Allowance mailed Jun. 28, 2021 in U.S. Appl. No. 16/575,003, 15 pages.
Restriction Requirement mailed Jul. 2, 2021 in U.S. Appl. No. 16/556,018, 6 pages.
Restriction Requirement response filed Sep. 2, 2021 in U.S. Appl. No. 16/556,018, 6 pages.
Non-Final Office Action mailed Sep. 15, 2021 in U.S. Appl. No. 16/556,018, 6 pages.
Non-Final Office Action response filed Dec. 10, 2021 in U.S. Appl. No. 16/556,018, 10 pages.
International Search Report and Written Opinion mailed Dec. 20, 2021 in International Application No. PCT/US2021/071269, 14 pages.

(56) References Cited

OTHER PUBLICATIONS

Non-Final Office Action mailed Apr. 13, 2022 in U.S. Appl. No. 16/556,018, 5 pages.
Non-Final Office Action response filed Jul. 13, 2022 in U.S. Appl. No. 16/556,018, 10 pages.
Non-Final Office Action mailed Sep. 26, 2022 in U.S. Appl. No. 16/556,018, 6 pages.
Non-Final Office Action response filed Jan. 26, 2023 in U.S. Appl. No. 16/556,018, 12 pages.
Non-Final Office Action mailed Feb. 17, 2023 in U.S. Appl. No. 17/445,575, 6 pages.
Non-Final Office Action response filed Mar. 15, 2023 in U.S. Appl. No. 17/445,575, 9 pages.
Notice of Allowance mailed Apr. 4, 2023 in U.S. Appl. No. 17/445,575, 7 pages.
Notice of Allowance mailed Jul. 21, 2023 in U.S. Appl. No. 16/556,018, 8 pages.
Restriction Requirement mailed Nov. 2, 2023 in U.S. Appl. No. 18/346,618, 6 pages.
Non-Final Office Action mailed Dec. 21, 2023 in U.S. Appl. No. 18/324,903, 37 pages.
Non-Final Office Action mailed Dec. 21, 2023 in U.S. Appl. No. 18/324,921, 27 pages.
Non-Final Office Action mailed Feb. 1, 2024 in U.S. Appl. No. 18/346,618, 7 pages.
Non-Final Office Action response filed Mar. 21, 2024 in U.S. Appl. No. 18/324,903, 29 pages.
Non-Final Office Action response filed Mar. 21, 2024 in U.S. Appl. No. 18/324,921, 27 pages.
Final Office Action mailed Apr. 26, 2024 in U.S. Appl. No. 18/324,903, 36 pages.
Final Office Action mailed Apr. 26, 2024 in U.S. Appl. No. 18/324,921, 31 pages.
Non-Final Office Action response filed Apr. 30, 2024 in U.S. Appl. No. 18/346,618, 12 pages.
Final Office Action mailed Jun. 5, 2024 in U.S. Appl. No. 18/346,618, 8 pages.
Non-Final Office Action received Jul. 1, 2024 in U.S. Appl. No. 18/464,023, pp. all.
Non-Final Office Action response filed Oct. 4, 2024 in U.S. Appl. No. 18/346,618, pp. all.
Anderle, Megan, "Verizon's new app aims to make phone recycling easy and profitable", Internet Article, May 1, 2014, XP093222792, retrieved from the Internet: URL: https://www.theguardian.com/sustainable-business/verizon-mobile-phone-recycling-cell-ecoatm.
TecAce Software: "Android Smartphone Testing App—Movaluate—TecAce Software | PRLog" Internet Article, May 6, 2013, XP093222769, retrieved from the Internet: URL: https://www.prlog.org/12132313-android-smartphone-testing-app-movaluate.html.
Notice of Allowance mailed Oct. 28, 2024 in U.S. Appl. No. 18/346,618, pp. all.
Response to Non-Final Office Action filed Nov. 1, 2024 in U.S. Appl. No. 18/464,023, pp. all.

* cited by examiner

EVALUATING AND RECYCLING ELECTRONIC DEVICES

CROSS-REFERENCE TO RELATED APPLICATIONS

This application claims the benefit of U.S. Provisional Patent Application No. 63/070,207, filed Aug. 25, 2020, which is incorporated by reference in its entirety herein.

TECHNICAL FIELD

The present disclosure is directed generally to methods and systems for evaluating and recycling mobile phones and other consumer electronic devices and, more particularly, to hardware and/or software for facilitating device identification, evaluation, purchase, and/or other processes associated with electronic device recycling.

BACKGROUND

Consumer electronic devices, such as mobile phones, laptop computers, notebooks, tablets, PDAs, MP3 players, wearable smart devices, etc., are ubiquitous. Currently there are over 14.02 billion mobile devices in use in the world. In other words, there are more mobile devices in use than there are people on the planet. Part of the reason for the rapid growth in the number of consumer electronic devices is the rapid pace at which these devices evolve, and the increased usage of such devices in third world countries.

As a result of the rapid pace of development, a relatively high percentage of consumer electronic devices are replaced every year as consumers continually upgrade their mobile phones and other electronic devices to obtain the latest features or a better operating plan. According to the U.S. Environmental Protection Agency, the U.S. alone disposes of over 370 million mobile phones, PDAs, tablets, and other electronic devices every year. Millions of other outdated or broken mobile phones and other electronic devices are simply tossed into junk drawers or otherwise kept until a suitable disposal solution arises.

Although many electronic device retailers and cell carrier stores now offer mobile phone trade-in or buyback programs, many old mobile phones still end up in landfills or are improperly disassembled and disposed of in developing countries. Unfortunately, however, mobile phones and similar devices typically contain substances that can be harmful to the environment, such as arsenic, lithium, cadmium, copper, lead, mercury, and zinc. If not properly disposed of, these toxic substances can seep into groundwater from decomposing landfills and contaminate the soil with potentiality harmful consequences for humans and the environment.

As an alternative to retailer trade-in or buyback programs, consumers can now recycle and/or sell their used mobile phones using self-service kiosks located in malls, retail stores, or other publicly accessible areas. Such kiosks are operated by ecoATM, LLC, the assignee of the present application, and aspects of these kiosks are described in, for example: U.S. Pat. Nos. 7,881,965, 8,195,511, 8,200,533, 8,239,262, 8,423,404 and 8,463,646, which are incorporated herein by reference in their entireties.

There continues to be a need for improving the means available to consumers for recycling or reselling their mobile phones and other consumer electronic devices. Simplifying the recycling/reselling process, enhancing the consumer experience, and discouraging fraud can incentivize consumers to dispose of their old electronic devices in an efficient and environmentally conscientious way.

DETAILED DESCRIPTION

Figure 1:
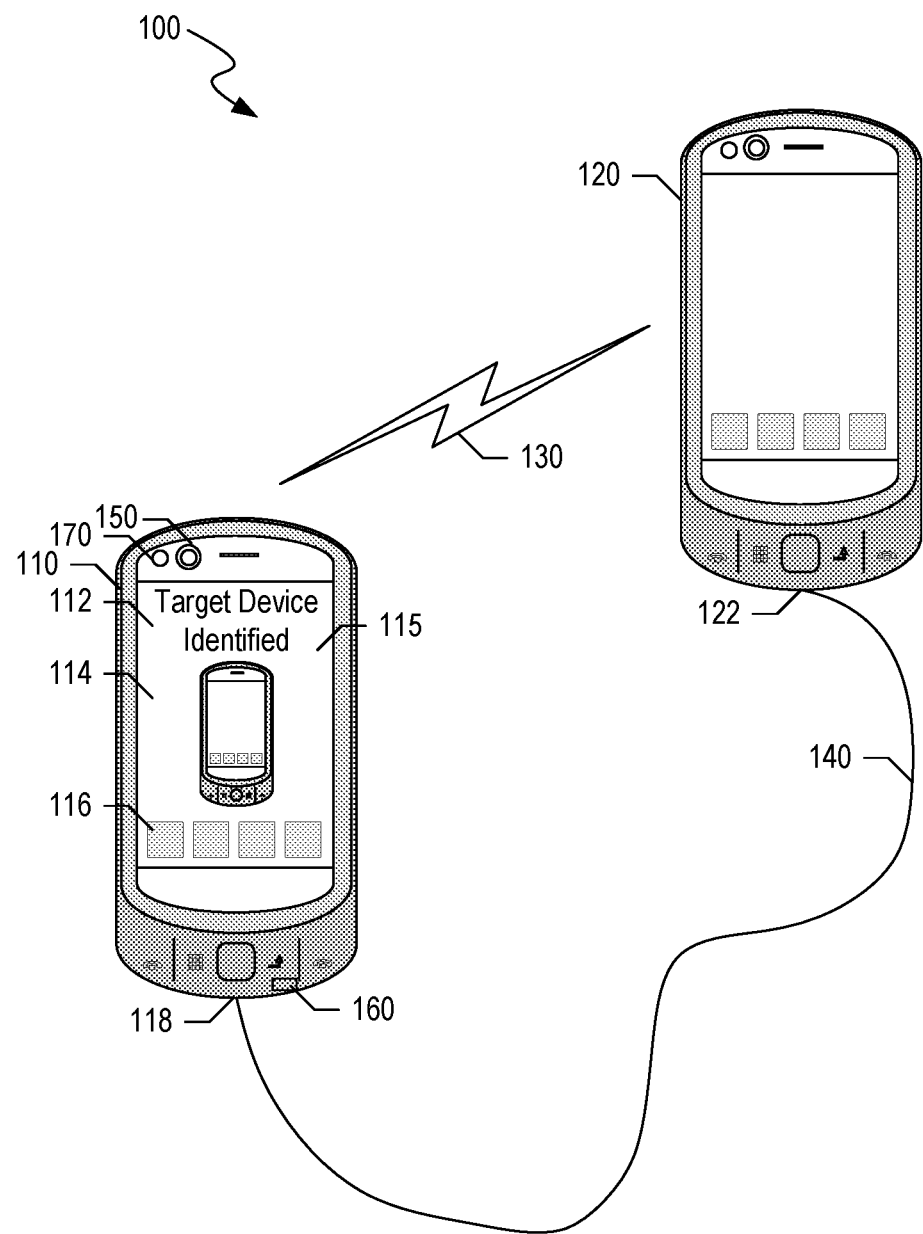
FIG. 1 illustrates an embodiment of a suitable computing environment for implementing various aspects of the present technology.

The following disclosure describes various embodiments of hardware and/or software systems and methods that facilitate the identification, evaluation, purchase, and/or other processes associated with recycling of electronic devices. In various embodiments, for example, the systems and methods described in detail herein enable a user to connect a first electronic device (an "evaluator device"), such as a mobile phone, to a second electronic device (a "target device"), such as another mobile phone, computer, appliance, peripheral, and so on, to accurately assess the condition and secondhand or resale market value of the target device. For example, a user could connect a first mobile phone evaluator device to a second mobile phone target device to get information about the second device, evaluate that information, and thus find out how much the second device is worth. The term "target device" is used herein for ease of reference to generally refer to an electronic device that a user may wish to evaluate for recycling. The term "evaluator device" is used herein for ease of reference to generally refer to an electronic device configured to obtain information from and/or about a target device and facilitate processing (e.g., recycling) of the target device. The evaluator device can include application software (an "app") and/or hardware for connecting to and evaluating the target device (e.g., via a wired or wireless connection). In various embodiments, the app enables device owners and/or other users to conveniently evaluate and price their target devices without having to leave their home or office. The present technology enables device owners to maintain awareness of the market value of their target devices with minimal user input, and provides certainty so that owners can have a quick and predictable experience selling their target devices (e.g., at an associated recycling kiosk, via mail-in of device, at a physical store, etc.). In some embodiments, the evaluator device can inform the user of the values of their target devices, manage a portfolio of target devices for recycling, and offer recommendations for where and when to recycle target devices.

Further, the present technology prevents users from incorrectly overestimating a phone's condition, such as claiming that the phone is in good condition when the phone screen is cracked or the phone is otherwise damaged. When a user incorrectly overestimates the phone's condition, a final price for the phone is significantly lower than an expected estimated price. In such a case, the user usually rejects the final price, which then leads to a lost transaction and a negative experience for the user which can affect goodwill of the entity facilitating the phone's return (and recycling). The present technology addresses this problem by providing the user with a "guaranteed" price that will not change if the user submits the target device for sale, and thereby avoids or at least greatly reduces the occurrence of incomplete transactions and disgruntled users. The present technology enables the user to evaluate a target device using the evaluator device at home (or any other location), thus decreasing the time and interaction required for a user selling the target device at a physical location (e.g., a kiosk).

Certain details are set forth in the following description and in FIGS. 1-14 to provide a thorough understanding of various embodiments of the present technology. In other instances, well-known structures, materials, operations and/or systems often associated with smartphones and other handheld devices, consumer electronic devices, computer hardware, software, and network systems, etc. are not shown or described in detail in the following disclosure to avoid unnecessarily obscuring the description of the various embodiments of the present technology. Those of ordinary skill in the art will recognize, however, that the present technology can be practiced without one or more of the details set forth herein, or with other structures, methods, components, and so forth.

The terminology used below is to be interpreted in its broadest reasonable manner, even though it is being used in conjunction with a detailed description of certain examples of embodiments of the present technology. Indeed, certain terms may even be emphasized below; however, any terminology intended to be interpreted in any restricted manner will be specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the embodiments disclosed herein.

In the Figures, identical reference numbers identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

FIG. 1 illustrates an embodiment of a suitable computing environment 100 for implementing various aspects of the present technology. The environment 100 includes a first electronic device (e.g., an evaluator device 110) and a second electronic device (e.g., a target device 120). In the illustrated embodiment, the evaluator device 110 and the target device 120 are depicted as a handheld computing device such as a smartphone or other mobile phone. However, in other embodiments, the evaluator device 110 and/or the target device 120 can be any manner of electronic device. For example, the evaluator device 110 and the target device 120 could be, for example, a tablet, a handheld gaming device, a media player, all manner of mobile phones; smartphones; handheld devices; personal digital assistants (PDAs); MP3 or other digital music players; tablet, notebook, Ultrabook and laptop computers; e-readers; all types of cameras; GPS devices; set-top boxes and other media players; VoIP phones; universal remote controls; speakers; headphones; wearable computers; larger consumer electronic devices, such as desktop computers, televisions, projectors, DVRs, game consoles, Blu-ray Disc™ players, printers, network attached storage devices, etc.; as well as smaller electronic devices such as Google® Glass™, smartwatches (e.g., the Apple Watch™, Android Wear™ devices such as the Moto 360®, or the Pebble Steel™ watch), fitness bands, thumb drives, wireless hands-free devices; unmanned aerial vehicles; etc. Although many embodiments of the present technology are described herein in the context of mobile phones, aspects of the present technology are not limited to mobile phones and generally apply to other consumer electronic devices. Such devices include, as non-limiting examples, desktop computers, TVs, game consoles, etc.

In one embodiment, the evaluator device 110 can execute a software application to aid in the evaluation of the target device 120. For example, the evaluator device 110 can have a camera 150 and a flashlight 170, and can use the camera and the flashlight to take pictures and record videos of the target device 120. The evaluator device 110 can provide instructions to the user through speakers 160 and/or display 115 of the evaluator device 110 to direct the user how to position the target device 120 with respect to the camera 150 and/or flashlight 170, as described in more detail below. The flashlight can be a flash used in taking pictures or can include flashlight functionality of a device. In embodiments, the flashlight 170 is strobed instead of remaining on for longer periods of time.

In some embodiments, both the evaluator device 110 and the target device 120 can execute one or more applications. The one or more applications can communicate with each other, and the evaluator device 110 and the target device 120 can work in a server-client relationship to determine a price for the target device 120. For example, the application executed by the target device 120 can provide information about the target device 120 to the application executed by the evaluator device 110. Information can include, but is not limited to, make and model of the target device 120, operating system version, memory/storage capacity of the target device 120, service provider to the target device 120, IMEI number of the target device 120, network capabilities (e.g., 4G, 5G, etc.) of the target device 120, and so on.

In some embodiments, the target device 120 includes a communication interface (e.g., a connector port 122 and/or a wireless transceiver (not shown)) and the evaluator device 110 similarly includes a communication interface (e.g., a connector port 118 and/or a wireless transceiver (not shown)). In this embodiment, the evaluator device 110 can be electrically connected to the target device 120 via a wireless connection 130 between the respective device transceivers, such as a Wi-Fi or Bluetooth network or a near-field communication (NFC) link; or via a wired connection 140, such as a universal serial bus (USB), Ethernet, or Lightning cable connected between the device connector ports 118 and 122. The evaluator device 110 can run special software configured to evaluate the target device 120. The evaluator device 110 and the target device 120 can be connected via a USB cable. A display screen 115 of the evaluator device 110 can display information such as textual information 112 indicating that the evaluator device 110 has identified the target device 120, an image 114 representing the target device 120, and/or icons or buttons 116 enabling the user to select various options or actions such as confirming the correct identification of the target device 120, pricing the target device 120, saving the target device 120 in a list of devices, etc.

As described in detail below, the present technology enables the evaluator device 110 to obtain information from the target device 120 over the wireless connection 130 and/or the wired connection 140, and evaluate the obtained information to facilitate recycling and/or other processing of the target device 120. The term "processing" is used herein for ease of reference to generally refer to all manner of services and operations that may be performed on, with, or otherwise in relation to a target device. Such services and operations can include, for example, selling, reselling, recycling, upcycling, donating, exchanging, identifying, evaluating, pricing, auctioning, decommissioning, transferring data from or to, reconfiguring, refurbishing, etc. mobile phones and other target devices. The term "recycling" is used herein for ease of reference to generally refer to selling, purchasing, reselling, exchanging, donating, and/or receiving target devices. For example, owners may elect to sell their used target devices, and the target devices can be recycled for resale, reconditioning, repair, recovery of salvageable components, environmentally conscious disposal, etc.

Figure 2:
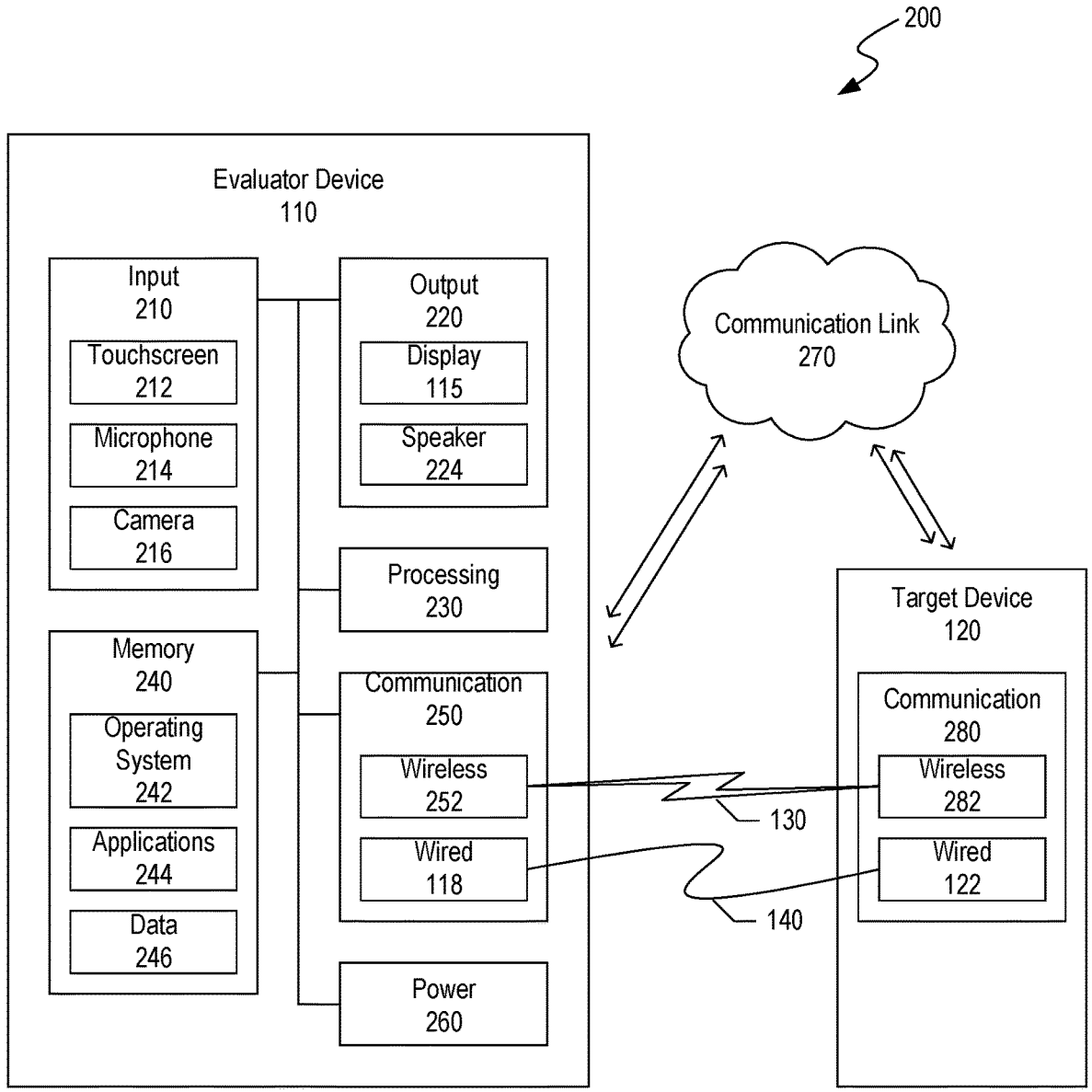
FIG. 2 is a block diagram illustrating various components typically incorporated in computing systems and other devices on which the present technology can be implemented.

FIG. 2 is a block diagram showing some of the components 200 typically incorporated in computing systems and other devices on which the present technology can be implemented. In the illustrated embodiment, the evaluator device 110 includes a processing component 230 that controls operation of the evaluator device 110 in accordance with computer-readable instructions stored in memory 240. The processing component 230 may be any logic processing unit, such as one or more central processing units (CPUs), graphics processing units (GPUs), digital signal processors (DSPs), application-specific integrated circuits (ASICs), etc.

The processing component 230 may be a single processing unit or multiple processing units in an evaluator device or distributed across multiple devices. Aspects of the present technology can be embodied in a special purpose computing device or data processor that is specifically programmed, configured, or constructed to perform one or more of the computer-executable instructions explained in detail herein. Aspects of the present technology can also be practiced in distributed computing environments in which functions or modules are performed by remote processing devices that are linked through a communications network, such as a local area network (LAN), wide area network (WAN), or the Internet. In a distributed computing environment, modules can be located in both local and remote memory storage devices.

The processing component 230 is connected to memory 240, which can include a combination of temporary and/or permanent storage, and both read-only memory (ROM) and writable memory (e.g., random-access memory or RAM), writable non-volatile memory such as flash memory or other solid-state memory, hard drives, removable media, magnetically or optically readable discs, nanotechnology memory, biological memory, and so forth. As used herein, memory does not include a transitory propagating signal per se. The memory 240 includes data storage that contains programs, software, and information, such as an operating system 242, application programs 244, and data 246. Evaluator device 110 operating systems can include, for example, Windows®, Linux®, Android™, iOS®, and/or an embedded real-time operating system. The application programs 244 and data 246 can include software and databases configured to control evaluator device 110 components, process target device 120 information and data (e.g., to evaluate device make, model, condition, pricing, etc.), communicate and exchange data and information with remote computers and other devices, etc.

The evaluator device 110 can include input components 210 that receive input from user interactions and provide input to the processor 230, typically mediated by a hardware controller that interprets the raw signals received from the input device and communicates the information to the processor 230 using a known communication protocol. Examples of an input component 210 include a keyboard (with physical or virtual keys), a pointing device (such as a mouse, joystick, dial, or eye tracking device), a touchscreen 212 that detects contact events when it is touched by a user, a microphone 214 that receives audio input, and a camera 216 for still photographs and/or video capture. The evaluator device 110 can also include various other input components 210 such as GPS or other location determination sensors, motion sensors, wearable input devices with accelerometers (e.g., wearable glove-type input devices), biometric sensors (e.g., fingerprint sensors), light sensors, card readers (e.g., magnetic stripe readers or memory card readers), and so on.

The processor 230 can also be connected to one or more various output components 220, for example, directly or via a hardware controller. The output devices can include a display 115 on which text and graphics are displayed. The display 115 can be, for example, an LCD, LED, or OLED display screen (such as a desktop computer screen, handheld device screen, or television screen), an e-ink display, a projected display (such as a heads-up display device), and/or a display integrated with a touchscreen 212 that serves as an input device as well as an output device that provides graphical and textual visual feedback to the user. The output devices can also include a speaker 224 for playing audio signals, haptic feedback devices for tactile output such as vibration, etc. In some implementations, the speaker 224 and the microphone 214 are implemented by a combined audio input-output device.

In the illustrated embodiment, the evaluator device 110 further includes one or more communication components 250. The communication components can include, for example, a wireless transceiver 252 (e.g., one or more of a Wi-Fi transceiver; Bluetooth transceiver; NFC device; wireless modem or cellular radio utilizing GSM, CDMA, 3G, and/or 4G technologies; etc.) and/or a wired network connection 118 (e.g., one or more of an Ethernet port, cable modem, FireWire cable, Lightning connector, USB port, etc.). The communication components 250 are suitable for communication between the evaluator device 110 and other local and/or remote computing devices, for example, the target device 120, directly via a wired or wireless peer-to-peer connection and/or indirectly via the communication link 270 (which can include the Internet, a public or private intranet, a local or extended Wi-Fi network, cell towers, the plain old telephone system (POTS), etc.). For example, the wireless transceiver 252 of the evaluator device 110 can connect to the wireless transceiver 282 of the target device 120 via the wireless connection 130, and/or the wired connector 140 of the evaluator device 110 can connect to the wired connector 122 of the target device 120 via the wired connection 140. The evaluator device 110 further includes power 260, which can include battery power and/or facility power for operation of the various electrical components associated with the evaluator device 110.

Unless described otherwise, the construction and operation of the various components shown in FIG. 2 are of conventional design. As a result, such components need not be described in further detail herein, as they will be readily understood by those skilled in the relevant art. In other embodiments, the evaluator device 110 and/or the target device 120 can include other features that may be different from those described above. In still further embodiments, the evaluator device 110 and/or the target device 120 can include more or fewer features similar to those described above.

Figure 3:
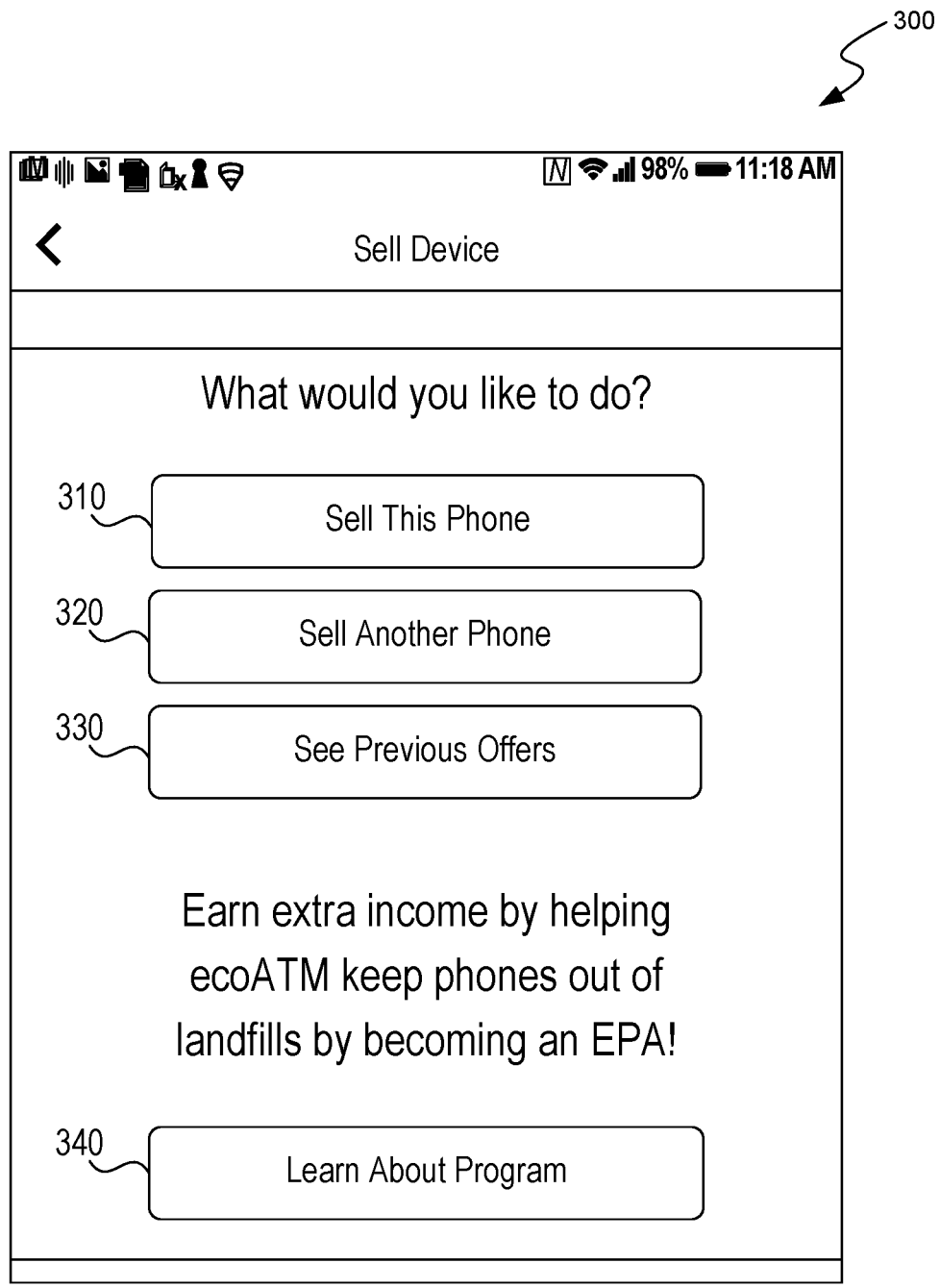
FIG. 3 shows a user interface presented by an application running on an evaluator device or a target device according to some embodiments of the present technology.

FIG. 3 shows a user interface presented by an application running on the evaluator device or the target device according to some embodiments of the present technology. The user interface 300 presents several buttons 310, 320, 330, 340 to the user.

When the user selects button 310, an application running on the device determines that the user wants to sell the device displaying the user interface 300. When the user selects the button 320, the application determines the user wants to sell another device, for example, the target device 120 in FIG. 1, and use the device displaying the user interface 300 as the evaluator device 110 in FIG. 1.

When the user selects the button 330, the application displays to the user previous offers received for various devices that the user previously offered for sale. The user can have an account with an entity (e.g., ecoATM). The user can login to that account and retrieve previous offers. When the user selects the button 340, the application provides the user additional information about trading in the user's devices (e.g. terms of service, privacy notices, recycling policies, etc.).

Figure 4:
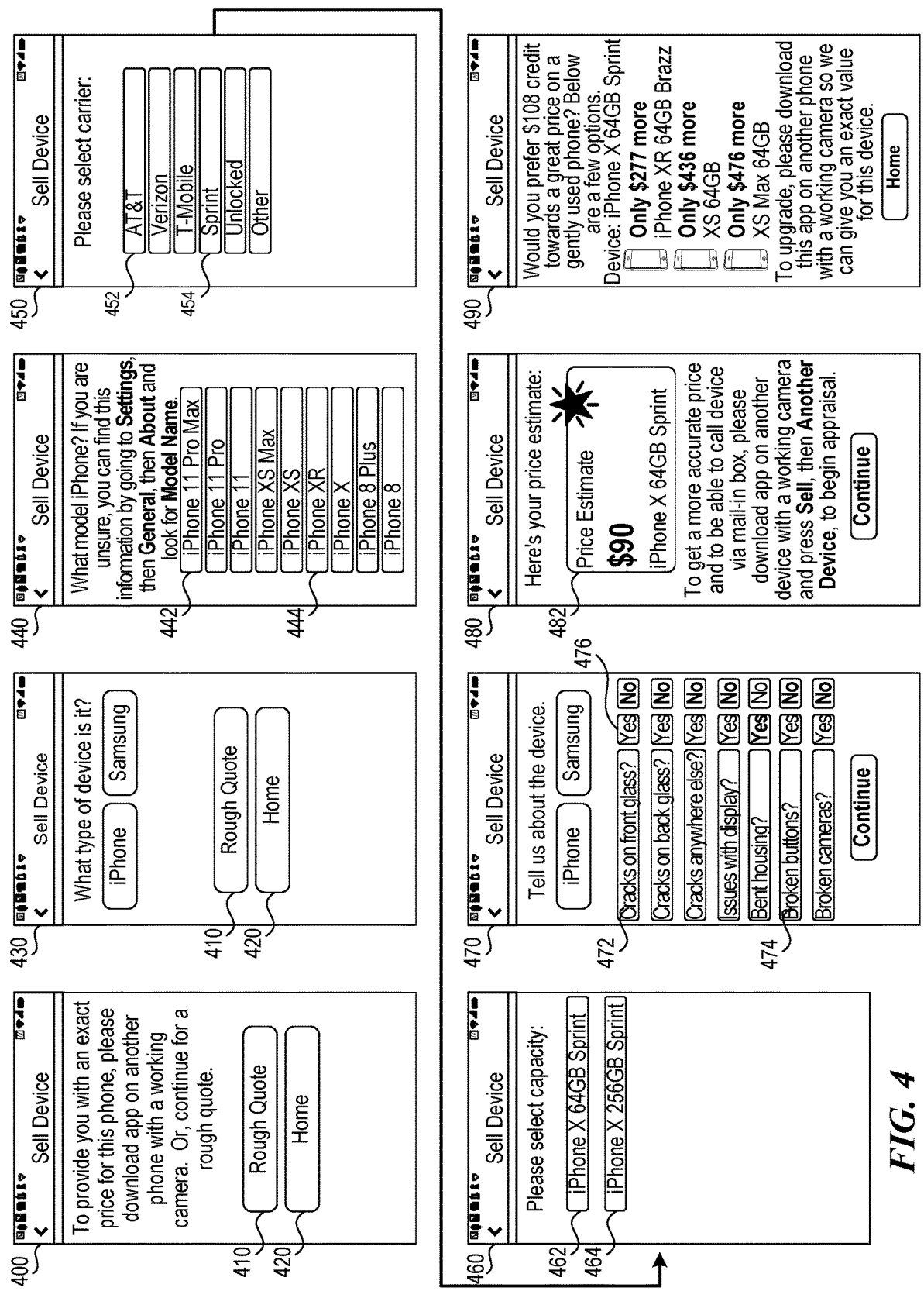
FIG. 4 shows a series of user interfaces presented to the user when the user wants to sell a target device according to some embodiments of the present technology.

FIG. 4 shows a series of user interfaces presented to the user when the user wants to sell a target device according to some embodiments of the present technology. When the user selects the button 310 in FIG. 3, the application running on the device determines that the user has a single device that the user wants to sell. In step 400, the application provides information to the user encouraging the user to obtain a second device, such as an evaluator device 110 in FIG. 1 to obtain a more precise quote. The application provides two buttons 410 and 420. If the user wants to proceed with a single device, the user can select button 410, in which case the application provides a rough quote to the user. When the user selects button 420, the user can go back to the user interface 300 in FIG. 3 and can select button 320 in FIG. 3.

If the user wants to proceed with a single device, the application can gather information about the device by querying the user or automatically. For example, in step 430, asks the user to specify a type of device, such as iPhone, Samsung, Huawei, Dell, Lenovo, etc. In step 440, the application presents options 442, 444 (only two labeled for brevity) to the user to select a make of the device. In step 450, the application presents options 452, 454 (only two labeled for brevity) to the user to select a carrier/telecommunications service provider.

In step 460, the application presents options 462, 464 (only two labeled for brevity) to the user to select the memory capacity of the device. The application can also query the user whether the target device 120 is currently under contract or is a company phone.

In step 470, the application presents multiple questions 472, 474 (only two labeled for brevity) to prompt the user to describe the condition of the device, such as whether there is a crack on the front glass, crack in the back glass, issues with the display, broken buttons, broken cameras, etc. If in step 470 the user indicates that the device is in mint condition by, for example, not selecting a "Yes" button 476 for any of the questions, the application can request the user to provide additional information about the device, as described in FIG. 5 below.

In addition, the application can automatically gather information about the target device 120, thus shortening the user-UI interaction by obtaining parameters directly from the target device 120. To determine whether the device is an Android or an Apple device, the application can determine the operating system (OS) of the target device 120. If the operating system is iOS, the application can determine that the target device 120 is an Apple device. If the operating system is Android, the application can query the manufacturer of the device for the type of the device such as Samsung, Google, HTC, etc.

To determine the make, model, memory capacity, and/or carrier information of the target device 120, the application can obtain information from the target device 120, and can present the determined make, model, memory capacity, and/or carrier information for the user to confirm.

To test the ability of the target device 120 ability to connect over a wireless network, the application can ask the user's permission to automatically dial a number or send a text message. If the call is successfully placed and/or the text is successfully sent, the application can determine that the target device 120 has network capability.

To test whether the target device 120 has logged out of user's personal accounts, such as Gmail and/or iCloud, the application can attempt to access the user's personal accounts automatically. If the login attempts are unsuccessful, the application can determine that the user has successfully logged out of the user's personal accounts.

In step 480, based on information that the user has provided to the application, the application provides a price estimate 482 of the device to the user. However, in this case, the price estimate 482 is not a guarantee of a minimum price that the user is going to receive once the user submits the device for inspection and/or sale. The price estimate 482 can be reduced once the user submits the device (e.g., the user takes the device to a physical kiosk, mails-in the device to an evaluating entity, submits the device at a physical store, etc.).

Finally, in step 490, the application can present an alternative offer to the user. For example, as shown in FIG. 4, the offer can be to trade in the device for an upgraded device and receive a discount on the upgraded device. The discount can be higher than the price estimate 482 received in step 480. The offer can include credits for unrelated services such as an Uber or a Lyft ride, various accessories that can be traded for the device, credits towards accessory, gift cards, points, mileage credits, etc. For example, employers can offer trade-in for employee devices in exchange for carbon credits for which the employer can apply. Alternatively, the employer can reimburse employees for the traded-in devices.

FIGS. 5A-5D show a series of user interfaces associated with an application running on an evaluator device to guide the user in evaluating a target device according to some embodiments of the present technology. The application running on the evaluator device 110 can vary the steps of target device 120 evaluation, as explained in FIGS. 5A-5D, depending on what type of target device 120 is being evaluated, what type of damage has been disclosed by the user, etc.

Figure 5A:
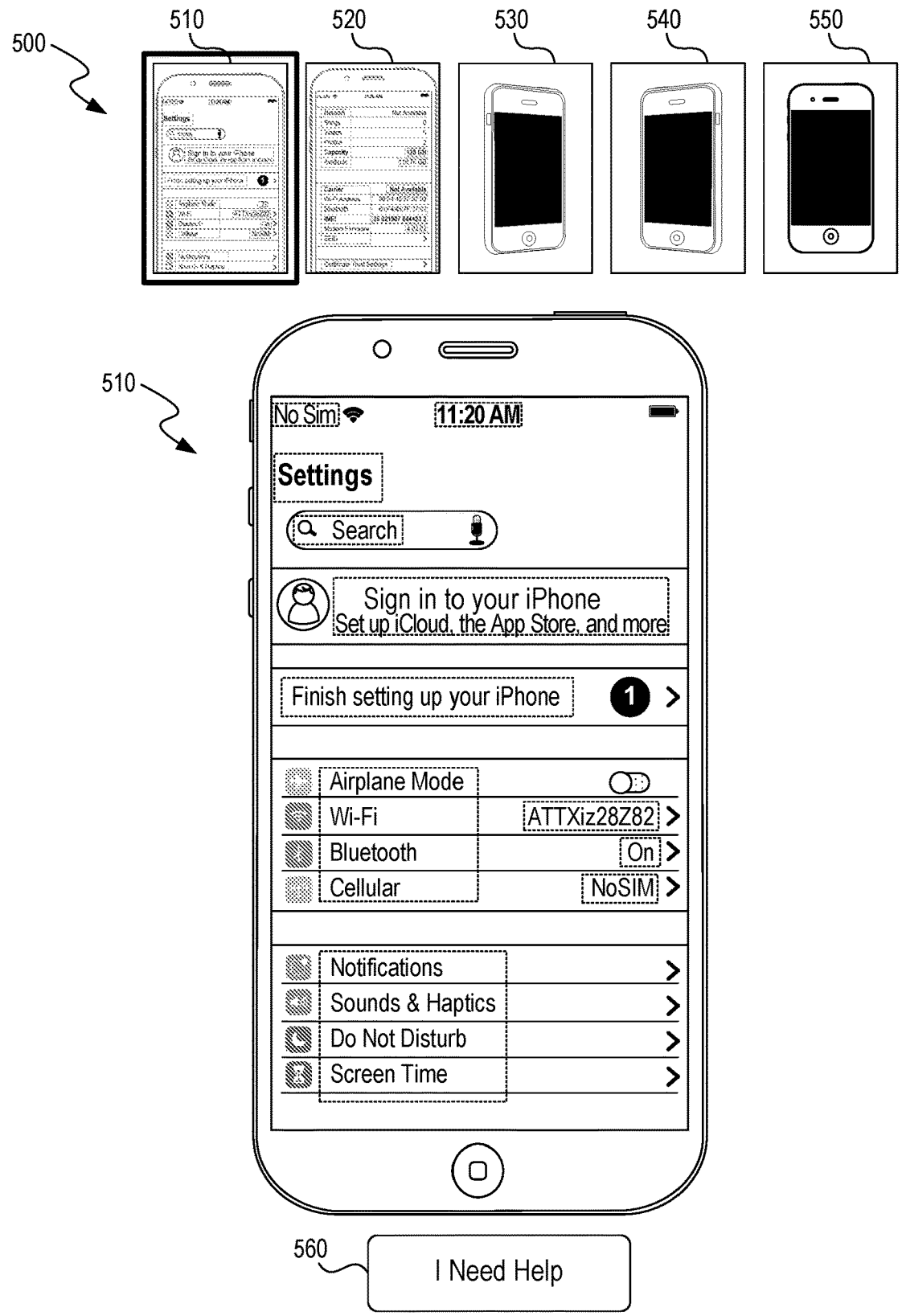
FIGS. 5A-5D show a series of user interfaces associated with an application running on an evaluator device to guide the user in evaluating a target device according to some embodiments of the present technology.

FIG. 5A shows a display of the evaluator device 110 in FIG. 1 showing an initial step in evaluating the target device 120. Display element 500 can show all the steps needed to complete the evaluation of the target device 120. An image of the current step 510 can be highlighted to attract the user's attention, while the images of the rest of the steps 520, 530, 540, 550 can presented to appear less visible, such as by darkening them.

An application running on the evaluator device 110 can direct the user via audio, text, picture, video, or other similar means to logout of the user's personal accounts stored in the target device 120, and to display on the target device 120 an application verifying that the user has been logged out from the user's personal accounts. The user's personal accounts can include iCloud, Google, Dropbox, etc. The application, such as settings, can verify that the user has been logged out from the user's personal accounts. Further, the evaluator device 110 can direct the user, via audio, text, picture, video, or other similar means, to point the camera 150 in FIG. 1 of the evaluator device 110 to the display of target device 120 to record the display created by the verifying application such as Settings.

In addition, the application running on the evaluator device 110 can request the user to factory reset the target device 120. To verify that the target device 120 has gone or is going through the process of factory reset, the camera 150 of the evaluator device 110 can record progress or completion of the factory reset being completed on the target device.

The evaluator device 110 can record a picture (and/or video) of the target device 120 and produce an indication, such as a clicking sound, that the picture has been recorded. The evaluator device 110 can perform optical character recognition (OCR) to determine from the recorded image whether the user has logged out from the user's personal accounts.

In addition, the evaluator device 110 can provide a help button 560. When the user selects the button 560, evaluator device 110 can provide more detailed instructions to the user, provide a list of frequently asked questions (FAQ), and/or provide contact information of technical support.

Figure 5B:
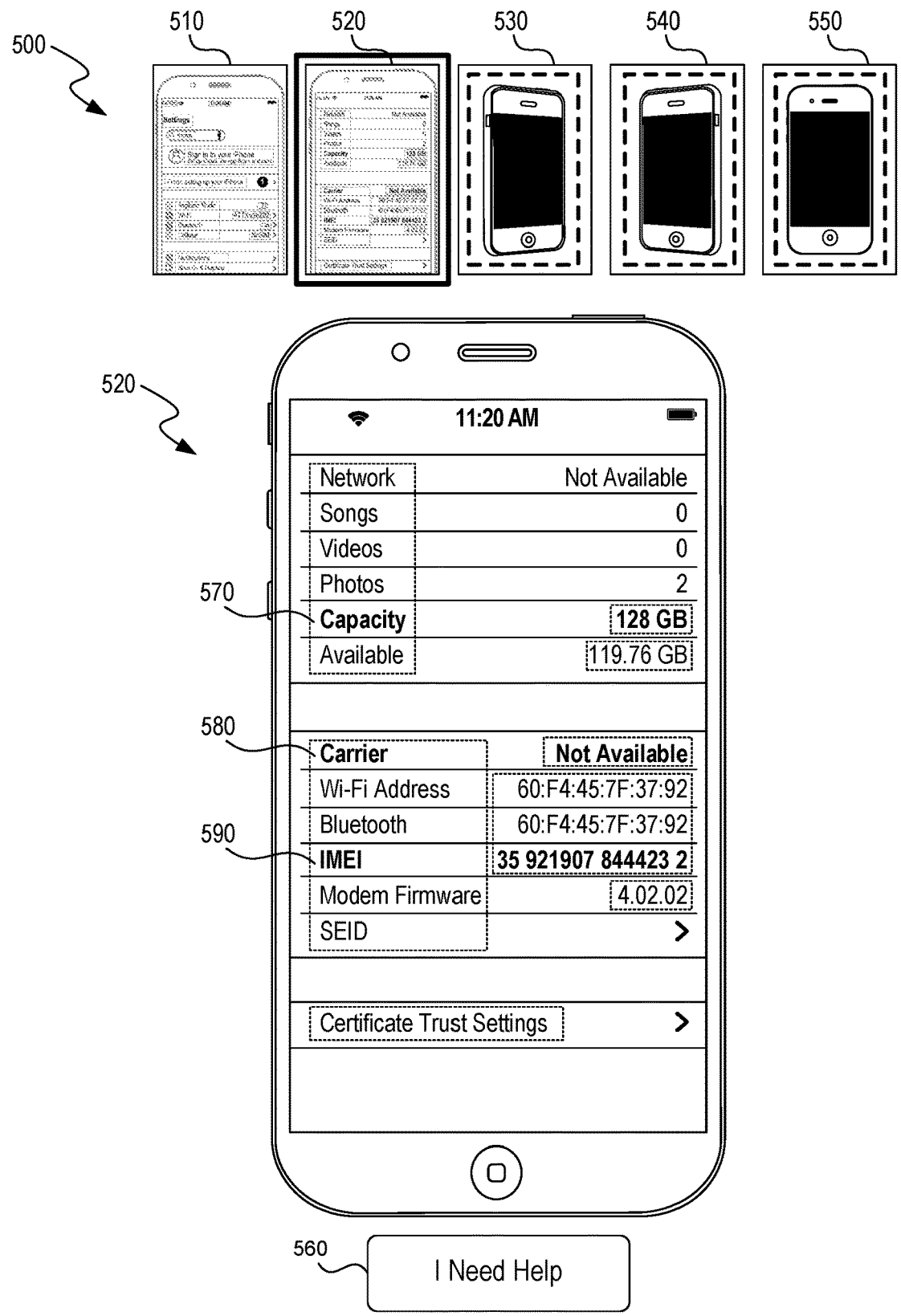

In step 520 shown in FIG. 5B, the evaluator device 110 can direct the user to display the target device 120's unique identifier 590, such as primary and secondary International Mobile Equipment Identity (IMEI) for devices with multiple subscriber identity modules (SIMs), Unique Device Identification (UDI), media access control (MAC) address, Bluetooth MAC address, WiFi MAC Address, Universally Unique Identifier (UUID), Internet protocol (IP) Address (ipvc4/6), target device's phone number, target device model and serial numbers, etc. To get the unique identifier 590, e.g. IMEI, the user can also dial *#06#on the target device 120 to bring up the unique identifier. The evaluator device 110 can perform OCR on the unique identifier 590. In some embodiments, when all three of the memory/storage capacity 570 of the target device 120, service provider 580 to the target device 120, and IMEI number of the target device 120 are available, the evaluator device 110 can grade the target device 120 more efficiently. Therefore, during the OCR phase if only two of these pieces of information can be displayed on the screen of the target device 120 at the same time, the evaluator device 110 can direct the user to "scroll down," such that the third piece of information can be read.

In addition, the evaluator device 110 can also request information about the capacity 570 and carrier 580 of the target device 120, as shown in FIG. 5B. The evaluator device 110 can get the unique identifier 590 from a previously installed application such as an application installed by a phone manufacturer. To prevent the user from photographing the IMEI of a damaged target device 120 and then taking a video of an undamaged device and attempting to sell the damaged target device 120, the application running on the evaluator device 110 can instruct the user to keep the evaluator device 110 constantly focused on the target device 120. When the app detects that the evaluator device 110 is not constantly (or substantially constantly) focused on the target device 120, it can present an error message to the user (e.g., as an audio alert (e.g. beeping sound), visual alert (e.g., a flashing/blinking light), and so on).

An application running on the evaluator device 110 can direct the user via audio, text, picture, video, or other similar means how to display the information containing the unique identifier 590, the capacity 570 and the carrier 580 on the display of the target device 120. For example, the evaluator device 110 can communicate to the user to go to settings, select the "general" button, and then select "about" to obtain the needed information.

The application running on the evaluator device 110 can direct the user to record a picture of the target device 120 showing the needed information. The evaluator device 110 can produce an indication, such as a sound, that the picture is recorded. Once the picture is recorded, the evaluator device 110 can use OCR to obtain the needed information from the picture.

As described herein, the evaluator device 110 obtains a unique identifier of the target device 120. In some embodiments, the evaluator device 110 determines whether the target device 120 has been evaluated previously based on the unique identifier 590. Upon determining that the target device 120 has been evaluated previously, the evaluator device 110 retrieves data describing the target device 120 from a database.

Once the evaluator device 110 obtains the unique identifier 590, the evaluator device 110 can determine whether the unique identifier 590 has been evaluated before, such as if the user has tried to scan the target device 120 multiple times. If the unique identifier 590 has been evaluated before, the evaluator device 110 can pre-populate the device information using the previously stored information such as IMEI number, storage capacity, etc. In addition, once the evaluator device 110 has the unique identifier 590, the evaluator device 110 can gather some info automatically. For example, the evaluator device 110 can query the wireless telecommunication provider database to get additional information about the device, such as technical specifications, age, number of resales, etc.

Figure 5C:
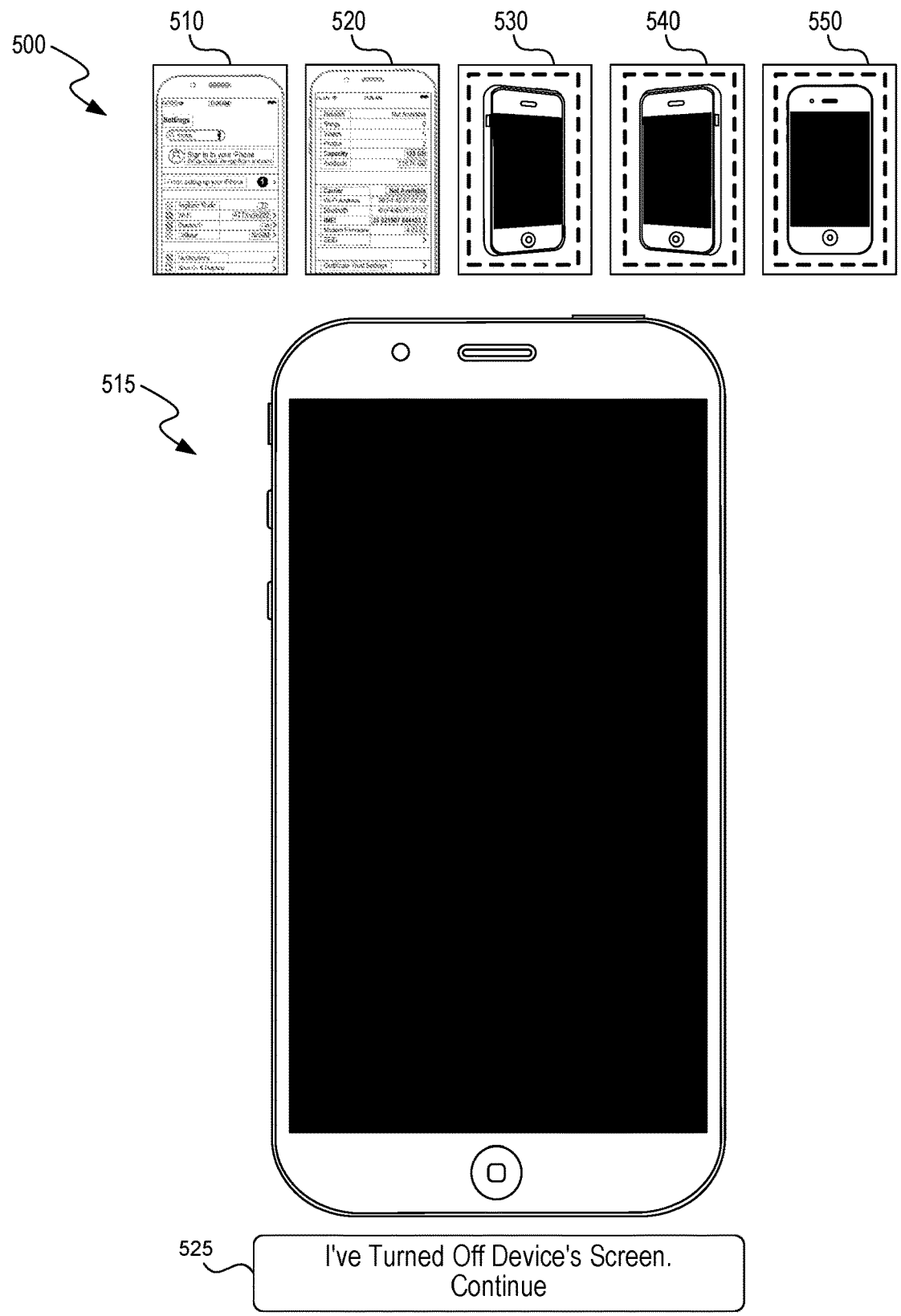

In step 515, shown in FIG. 5C, the evaluator device 110 can instruct the user to turn off the target device 120's screen prior to proceeding to the final three steps 530, 540, 550. The reason to turn off the target device 120's screen is to increase the visibility of any screen imperfections (e.g., cracks) on the target device 120 in the steps described in FIG. 5D. When the user turns off the display screen, the user can communicate to the evaluator device 110 to move to the final three steps 530, 540, 550 by selecting the button 525.

Figure 5D:
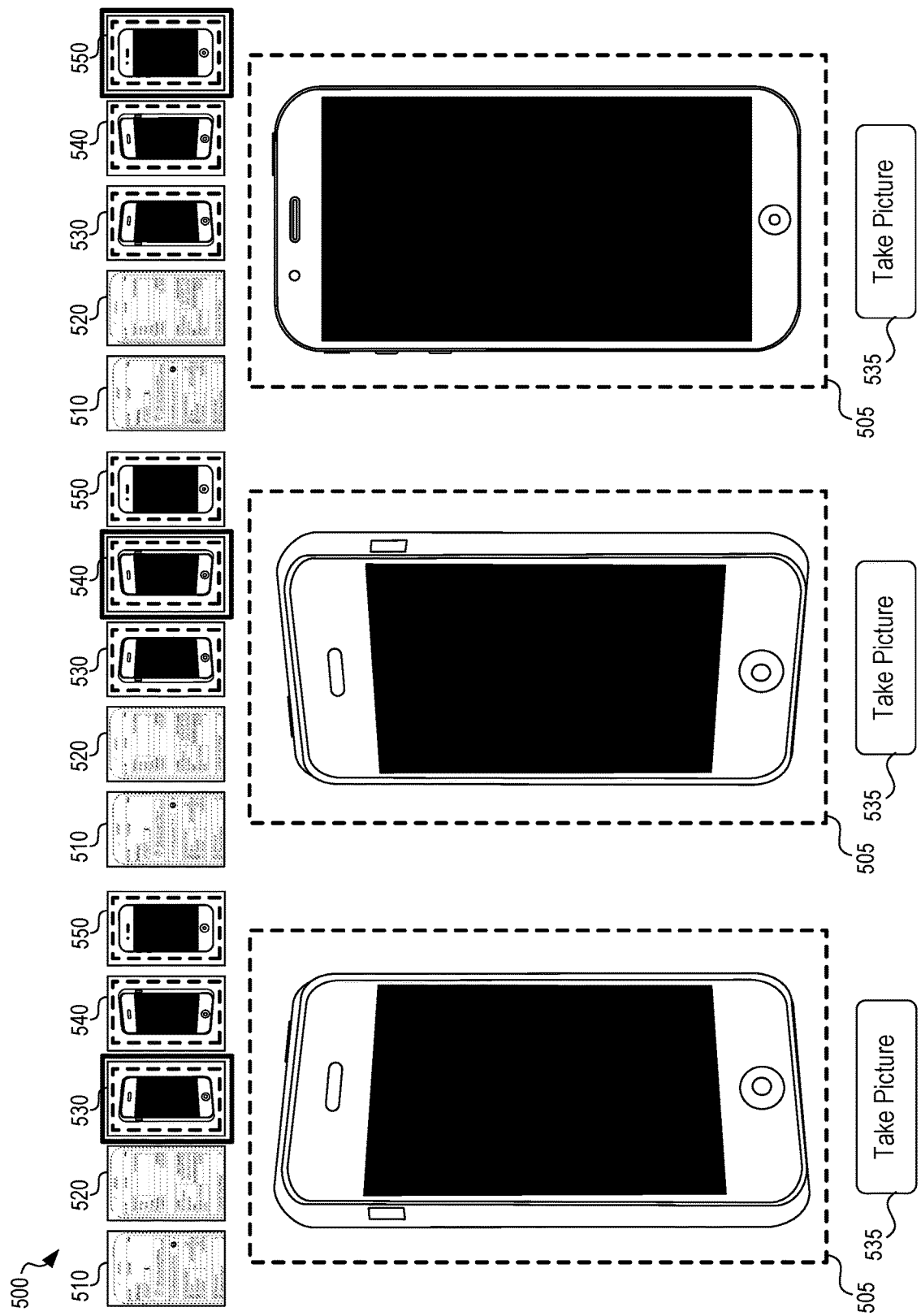

FIG. 5D shows the remaining steps needed to evaluate the target device 120. In these three steps, 530, 540, 550, the application running on the evaluator device 110 directs the user, via audio, text, picture, video, or other similar means, to take several pictures, such as three pictures, of the target device 120, as shown in FIG. 5D. The guide 505 displayed on the evaluator device 110 indicates how to position the target device 120 within the camera view of the evaluator device 110. The guide 505 can be any color and/or shape, such as a green rounded rectangle, a red rounded rectangle with broken lines, etc. In some embodiments, no guide is displayed. The pictures can be from approximately a three-quarters view to the left of the target device 120, three-quarters view to the right of the target device 120, and from the front. Additional pictures such as from the back and or the sides can also be taken. In one embodiment, steps 530, 540, 550 can be performed once for the display side of the target device 120, and once for the back side of the target device 120. For example, during evaluation, the evaluator device 110 can ask the user to position the target device 120 to take pictures of the back side of the target device 120, since most devices today have glass backs.

In some embodiments, a remote operator detects that a second device has replaced the target device 120 by analyzing the video. It is determined that the obtained physical properties are inaccurate in response to detecting that the second device has replaced the target device 120. For example, while the user is positioning the target device 120 to take the pictures, unknown to the user, the evaluator device 110 can record a video of the user's actions. The reason that the evaluator device 110 records the video unknown to the user is to prevent the user from switching out the target device 120 with another device (sometimes referred to as a "second device") that is in better condition than the target device 120. While the user is recording a video, a remote operator can receive the video in real time and can detect whether the user has switched out the target device 120 for a device that is in better condition. If the remote operator detects the switch, the remote operator can instruct the evaluator device 110 to abort the evaluation and produce a notification to the user that the evaluation has been aborted. In some embodiments, detecting that the second device has replaced the target device is performed using an artificial intelligence module. For example, the remote operator can be an artificial intelligence module trained to detect the device switch.

In some embodiments, the evaluator device 110 records the video of the target device 120 by flashing or strobing the flashlight 170 of the evaluator device 110 and moving the camera 150 of the evaluator device 110 over the target device 120. The camera 150 of the evaluator device 110 is moved over the target device 120 using sweeping movements and different angles, such that the camera 150 captures screen and/or device imperfections (e.g., cracks) that may not be otherwise visible in picture format. In some embodiments, the video is about 30 seconds long, such that at some point in that time period glints or cracks are revealed. The sweeping movements can be from left to right, top to bottom, bottom to top, etc., such that the camera 150 of the evaluator device 110 is moved through a variety of motions to enable the camera 150 to view and record different areas and perspectives of the target device 120. The artificial intelligence module can also be trained to detect screen and/or device imperfections (e.g., cracks) that may not be otherwise visible in picture format from the recorded video. In some embodiments, the artificial intelligence module processes the video in real time, i.e., while the video is being recorded. As soon as the artificial intelligence module determines an imperfection in the target device 120, the evaluator device 110 can proceed to a pricing screen of a user interface of the evaluator device 110 and instruct the user to stop photographing the target device 120. As a backup feature, if the Internet connection of the target device 120 has insufficient speed the video is processed locally in the evaluator device 110 and not uploaded to the cloud. This feature is used when the target device 120 uses 3G instead of LTE or W-Fi.

The artificial intelligence module is implemented using the components illustrated and described in more detail with reference to FIGS. 1-2. For example, the artificial intelligence module can be implemented on the evaluator device 110 using instructions programmed in the memory 240 illustrated and described in more detail with reference to FIG. 2. Likewise, embodiments of the artificial intelligence module can include different and/or additional components, or be connected in different ways. The artificial intelligence module is sometimes referred to as a machine learning module.

In some embodiments, the artificial intelligence module includes a feature extraction module implemented using the components illustrated and described in more detail with reference to FIG. 2. The feature extraction module extracts a feature vector from the recorded video. The feature extraction module reduces the redundancy in the input data, e.g., repetitive data values, to transform the input data into a reduced set of features. The feature vector contains the relevant information from the input data, such that properties of a target device under evaluation or data value thresholds of interest can be identified by the artificial intelligence module by using this reduced representation. In some example embodiments, the following dimensionality reduction techniques are used by the feature extraction module: independent component analysis, Isomap, Kernel PCA, latent semantic analysis, partial least squares, principal component analysis, multifactor dimensionality reduction, nonlinear dimensionality reduction, Multilinear Principal Component Analysis, multilinear subspace learning, semidefinite embedding, Autoencoder, and deep feature synthesis.

In alternate embodiments, the artificial intelligence module performs deep learning (also known as deep structured learning or hierarchical learning) directly on input data to learn data representations, as opposed to using task-specific algorithms. In deep learning, no explicit feature extraction is performed; features are implicitly extracted by the artificial intelligence module. For example, the artificial intelligence module can use a cascade of multiple layers of nonlinear processing units for implicit feature extraction and transformation. Each successive layer uses the output from a previous layer as input. The artificial intelligence module can thus learn in supervised (e.g., classification) and/or unsupervised (e.g., pattern analysis) modes. The artificial intelligence module can learn multiple levels of representations that correspond to different levels of abstraction, wherein the different levels form a hierarchy of concepts. In this manner, the artificial intelligence module can be configured to differentiate features of interest from background features.

In some embodiments, the artificial intelligence module, e.g., in the form of a convolutional neural network (CNN) generates output, without the need for feature extraction, directly from input data. The output is provided to the evaluator device 110. A CNN is a type of feed-forward artificial neural network in which the connectivity pattern between its neurons is inspired by the organization of a visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

In some embodiments, the artificial intelligence module is trained based on training data, to correlate the feature vector to expected outputs in training data. The training data includes a positive training set of features that have been determined to have a desired property in question, and, in some embodiments, a negative training set of features that lack the property in question. Machine learning techniques are used to train the artificial intelligence module, that when applied to a feature vector, outputs indications of whether the feature vector has an associated desired property or properties, such as a probability that the feature vector has a particular Boolean property, or an estimated value of a scalar property. The artificial intelligence module can further apply dimensionality reduction (e.g., via linear discriminant analysis (LDA), principle component analysis (PCA), or the like) to reduce the amount of data in the feature vector to a smaller, more representative set of data.

Supervised machine learning can be used to train the artificial intelligence module, with feature vectors of the positive training set and the negative training set serving as the inputs. In some embodiments, different machine learning techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set is formed of additional features, other than those in the training data that have already been determined to have or to lack the property in question. The artificial intelligence module can apply a trained machine learning model to the features of the validation set to quantify the accuracy of the machine learning model. Common metrics applied in accuracy measurement include: Precision and Recall, where Precision refers to a number of results the artificial intelligence module correctly predicted out of the total it predicted, and Recall is a number of results the artificial intelligence module correctly predicted out of the total number of features that did have the desired property in question. In some embodiments, the artificial intelligence module is iteratively re-trained until the occurrence of a stopping condition, such as the accuracy measurement indication that the artificial intelligence module is sufficiently accurate, or a number of training rounds having taken place.

Returning now to FIGS. 5A-5D, when the user positions the device according to the instructions, the user can select the button 535, and the evaluator device 110 can indicate that the picture has been taken by, for example, producing a clicking sound, even though the evaluator device 110 is recording a video. The reason to indicate that the picture has been taken is to lead the user to believe that the app is recording pictures, thus leading the user who wants to switch out the target device 120 to be less careful when switching the devices.

When recording the video in steps 530, 540, 550, the evaluator device 110 can have the flashlight 170 in FIG. 1 on, so that any fractures on the target device 120 reflect the flashlight and create highlights, which can be detected as cracks on the target device 120. In one embodiment, the application running on the evaluator device 110 can check whether the target device 120 has a white frame around the display. If the target device 120 has a white frame, the application can perform steps 530, 540, 550 twice, once with the flashlight 170 on, and once with the flashlight 170 off.

If the evaluator device 110 determines that the target device 120 has a white or gray border or back, the evaluator device 110 can choose to not turn on the flashlight because the flashlight helps with detecting highlights and/or glints of the cracked glass when the glass is over a black sub-surface, e.g. LCD. However, when the cracked glass is on top of a white or a gray surface, the evaluator device 110 can detect drop shadows on top of the white or gray surface. In that case, turning on the flashlight can deter the detection of the drop shadows by illuminating them and washing them out. Consequently, the evaluator device 110 can ask the user to take two pictures of a single side of the target device 120, such as a front side or the backside of the target device 120. The first picture can be taken with the flashlight, and the second picture can be taken without the flashlight.

Steps 510, 520, 530, 540, 550 can be repeated numerous times, independently of each other. For example, step 510 can be repeated three or four times, while steps 530, 540, 550 are repeated twice. The number of pictures taken and the number of videos taken can vary depending on the information provided by the user, and information detected in the pictures and videos recorded. For example, if the remote operator detects a potential crack in the front of the screen based on a video of the front of the screen, the remote operator can request an additional video recording of the front of the screen under different lighting conditions.

As explained in this application, the evaluator device 110 can be, for example, a laptop, or a desktop, and the user can receive a quote for the target device 120 using a web browser running on the evaluator device 110. The evaluator device 110 can ask the user's permission to turn on the evaluator device's 110 camera 150. If the user approves, the browser tells the user to move the target device 120 through the various positions so the fixed camera 150 can record the video for the remote operator such as an AI to analyze. In this scenario, the user can optionally place a flashlight (e.g., the flash of a working phone) resting on their evaluator device's 110 screen, facing the user, so that the camera 150 can better record any cracks in the target device 120.

Figure 6:
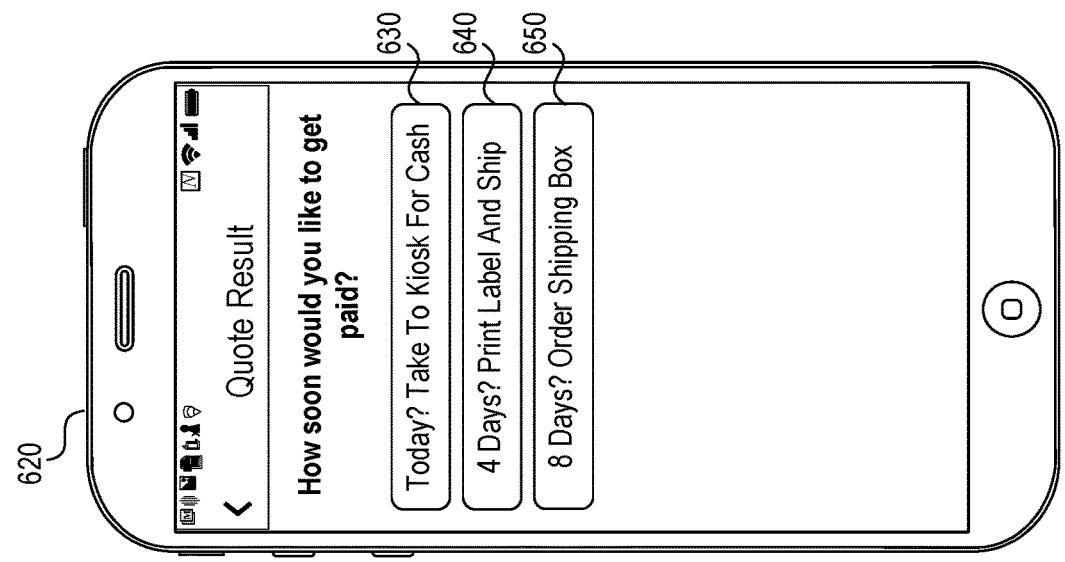
FIG. 6 shows a series of user interfaces that display a guaranteed price and various payment options according to some embodiments of the present technology.
Figure 6:
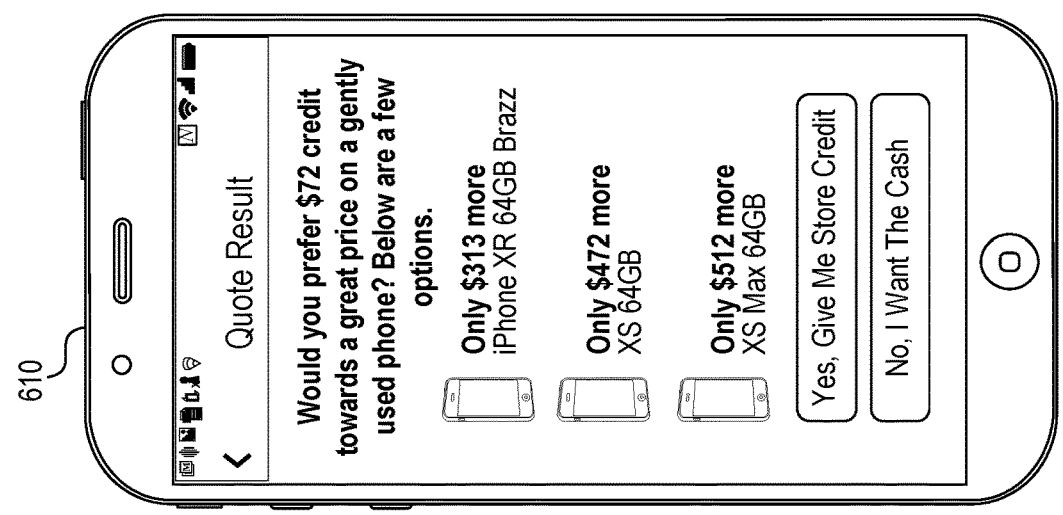
Figure 6:
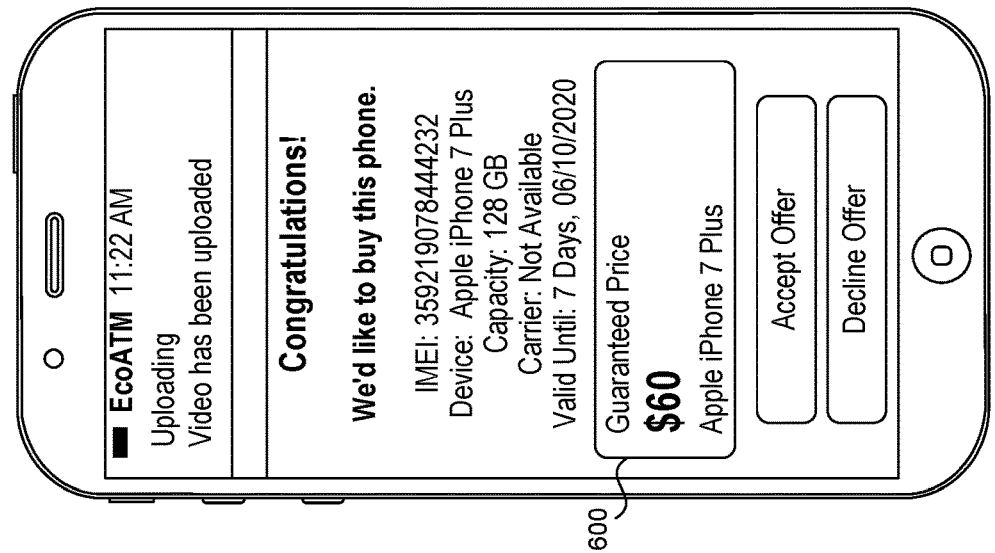

FIG. 6 shows a series of user interfaces that display a guaranteed price and various payment options according to some embodiments of the present technology. After performing the target device 120 evaluation, the application running on the evaluator device 110 can present a guaranteed price 600 to the user. If the user refuses the guaranteed price 600, the application running on the evaluator device 110 can present an option to the user to explain the reasoning behind the offer price, such as a crack in the target device 120 was detected. If the user accepts the guaranteed price 600, in step 610, the application can offer to the user store credit such as store points, a gift card, a better quality device, device accessories, credits for unrelated services such as an Uber or a Lyft ride, points, mileage credits, etc.

In step 620, the application can present to the user options 630, 640, 650 on how to receive payment. None of the options 630, 640, 650 require further investigation of the target device 120, because the guaranteed price 600 is an accurate quote.

If the user selects option 630, the user can take the target device 120 to a store or a kiosk and receive cash payment. The kiosk or a device at the store can read the target device 120's IMEI, electrically or via OCR. The kiosk or the device at the store can pay the user without needing to do any further interrogation. Consequently, kiosks or devices at the store do not have to include any grading capabilities, and can be cheap devices that confirm IMEI and identity, and pay customers.

If the user selects option 640, the user can print the label and ship the target device 120 to the store or the kiosk. The cost of the shipping can be subtracted from the guaranteed price 600. If the user selects the third option 650, the user can receive a shipping box with the shipping label. The cost of the box and the shipping label can also be subtracted from the guaranteed price 600. Alternatively, the user can receive payment for the target device 120 from a third party such as a GrubHub™, Uber™, or Lyft™ driver that comes to pick up the target device 120 and take the target device 120 to a store or a kiosk for a nominal fee.

The user can increase the evaluation of the target device 120 by testing the target device 120's touchscreen functionality, display quality, Wi-Fi, camera, microphone, GPS, etc. To test additional functionality, the application running on the evaluator device 110 can display a code, such as a QR code. The application running on the evaluator device 110 can instruct the user, via audio, video, text, picture or other similar means, to point a camera of the target device 120 toward the code.

Once the target device 120 scans the code, the target device 120 can execute instructions to test the target device 120's touchscreen functionality, display quality, network access such as data, Wi-Fi, camera, microphone, GPS, etc. The instructions can be provided to the target device 120 through an application installed on the target device 120 or can be provided to the target device 120 when the target device 120 visits a specified webpage.

Figure 7:
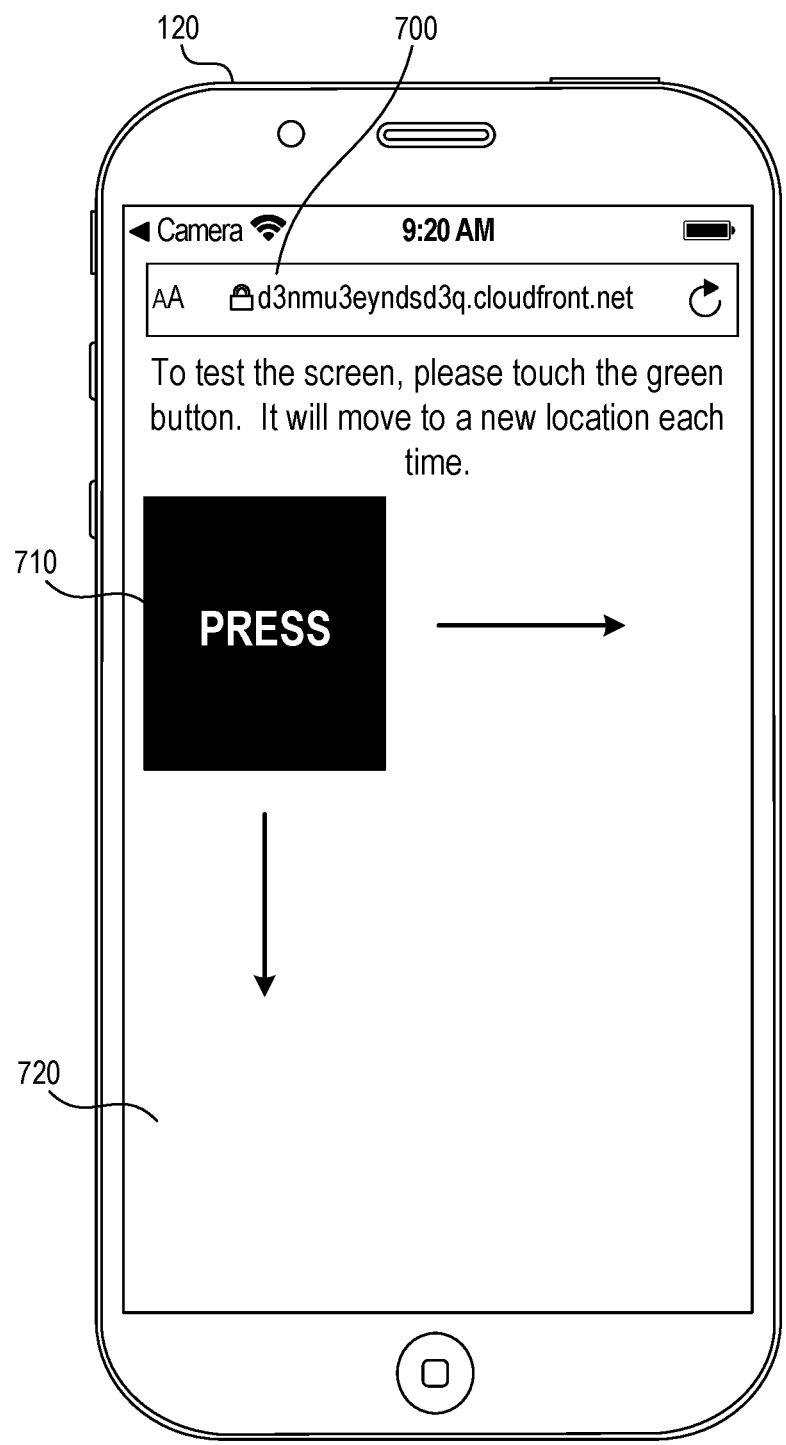
FIG. 7 shows a user interface that displays tests of the target device including touchscreen functionality according to some embodiments of the present technology.

FIG. 7 shows a user interface that displays tests of the target device 120 including touchscreen functionality according to some embodiments of the present technology. The user can run the tests if the user has selected "Sell This Phone" 310 in FIG. 3, or "Sell Another Phone" 320 in FIG. 3.

If the user selects the "Sell This Phone" and completes the self-evaluation, e.g. the evaluator device 110 in FIG. 1 determines the make and model of the target device 120 in FIG. 1, the evaluator device 110 can choose to run the tests described in FIGS. 7-10 based on the make and model of the target device 120. For example, if the target device 120 is a more expensive device, such as an iPhone™ 11 Pro Max, the evaluator device 110 can run the tests in FIGS. 7-10. If the target device 120 is a less inexpensive device, such as an iPhone™ 5, the evaluator device 110 can skip the tests in FIGS. 7-10.

If the user selects "Sell Another Phone" 320, the evaluator device 110 can run the tests in FIGS. 7-10, and the applications on the evaluator device 110 and the target device 120 can communicate with each other to determine the final price 600. The target device 120 can report its condition, and with that data, the evaluator device 110 can determine the final price.

To run the tests on the target device 120, in one embodiment, the evaluator device can ask the user to download the test application to the target device 120, where the test application is configured to run the tests. In other embodiments, to streamline the process, and not require the user to download another application, the evaluator device 120 can show a QR code on its screen and ask the target device 120 to point the target device 120's camera at the QR code. When the target device 120 detects the QR code, the target device 120 can launch a web browser and take the user to a website. The website, via HTML5 and Javascript, can run one or more of the tests in FIGS. 7-10 via the target device 120's browser.

The evaluator device 110 can run the tests in FIGS. 7-10, either before or after providing the quote 482 in FIG. 4, 600 in FIG. 6. For example, if the evaluator device 110 runs the tests in FIGS. 7-10 before providing the quote 482, the evaluator device 110 can offer the user the highest price. In another example, evaluator device 110 can run the tests in FIGS. 7-10 only after providing the quote 482, 600 and the user declines the quote. After the user declines the quote, the evaluator device 110 can try to win the user back by offering a chance for a higher quote, such as by asking "Want $10 more?" If the user indicates that they do want a higher quote, the evaluator device 110 can run the tests in FIGS. 7-10.

To test network access of the target device 120, the target device 120 can be asked to access a particular webpage 700. If the target device 120 successfully accesses the webpage 700, that is an indication that the target device 120 has functioning network access. To test the camera of the target device 120, the target device 120 scans a QR code that can initiate testing of other functionalities of the target device 120.

To test the touchscreen functionality, the target device 120 can display a square 710, that can move horizontally and vertically across the screen 720. In each position of the square 710, the target device 120 can ask the user to select the square 710. The target device 120 can determine whether the selection was detected, and whether the selection matches the location of the square 710. If the selection matches the location of the square 710 for all positions of the square 710 across the screen 720, the target device 120 can determine that the touchscreen functionality works.

Figure 8:
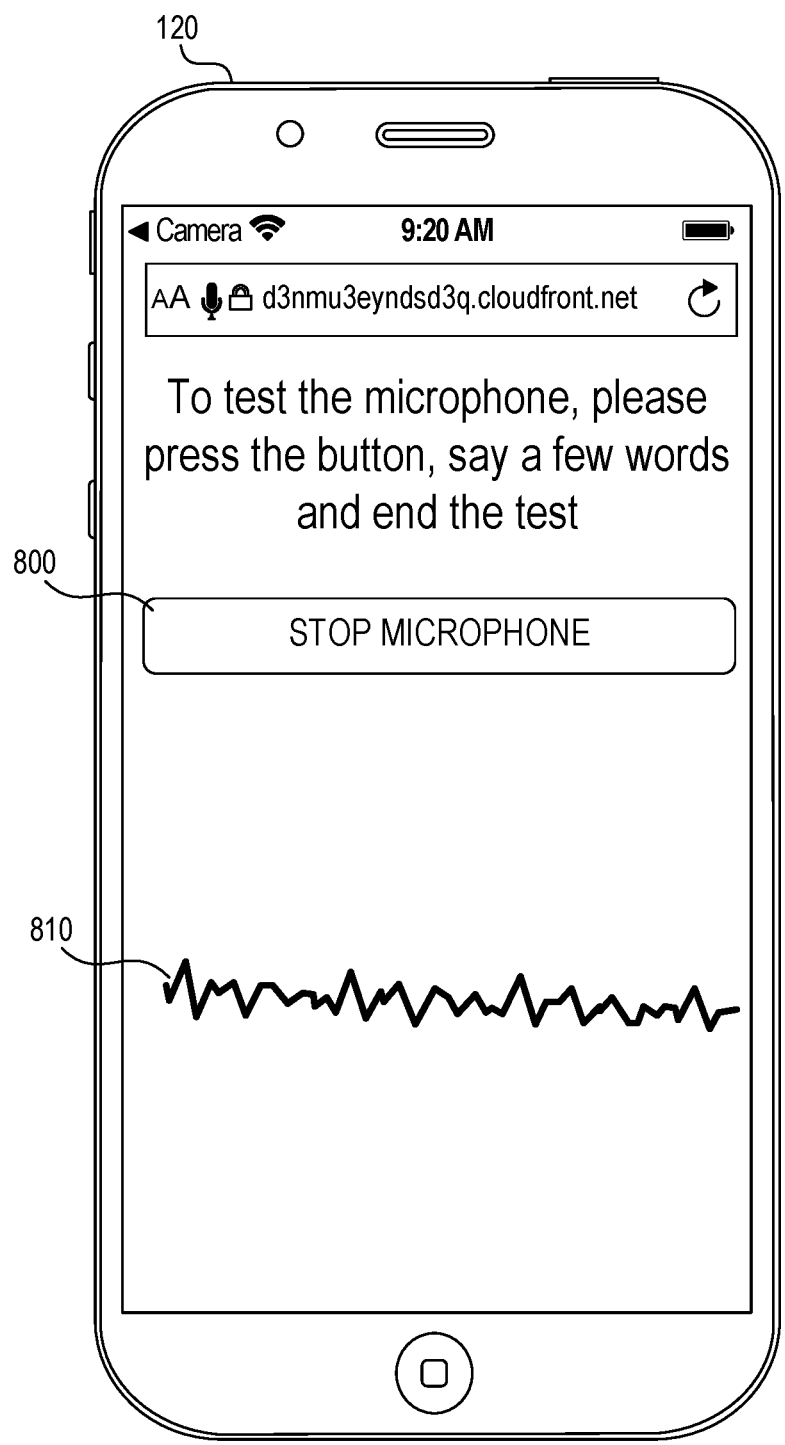
FIG. 8 shows a user interface that displays a test of the microphone of the target device according to some embodiments of the present technology.

FIG. 8 shows a user interface that displays a test of the microphone of the target device 120 according to some embodiments of the present technology. The target device 120 or the evaluator device 110 can instruct the user, via audio, video, text, picture or other similar means, how to test the microphone. For example, the target device 120 can provide a button to start the test and record the audio, and a button 800 to stop the test. The target device 120 can display a visualization 810 of the recorded audio. In some embodiments, during the microphone test, the evaluator device 110 produces audio signals at, e.g., 12,000 Hz. The microphone of the target device 120 captures the audio signals at the test frequency. The process is repeated for the different speakers and microphones available.

Figure 9:
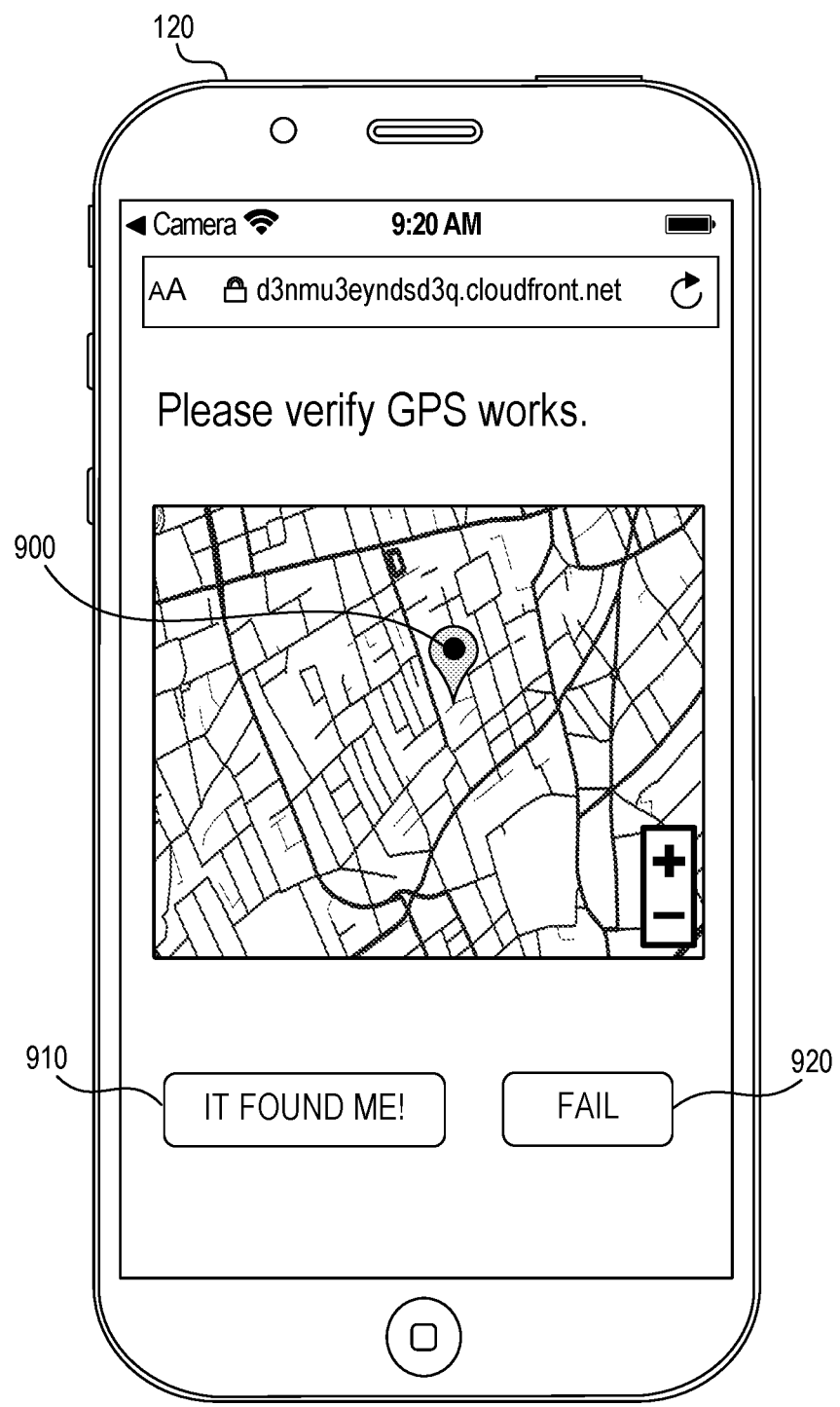
FIG. 9 shows a user interface that displays a test of the global positioning system (GPS) of the target device according to some embodiments of the present technology.

FIG. 9 shows a user interface that displays a test of the GPS of the target device 120 according to some embodiments of the present technology. The target device 120 can test the GPS by determining the location of the target device 120 using the GPS and communicating the location of the target device 120 to the user, via audio, video, text, picture or other similar means. For example, the target device 120 can display the detected location 900 of the target device 120 on a map. The target device 120 can request a confirmation from the user, such as using buttons 910, 920 or an audio communication. In embodiments, the GPS of the target device 120 is tested by using the evaluator device 110 to record a value that the target device 120 generates as its location. The evaluator device 110 records the value using the QR code procedure disclosed herein. The evaluator device 110 compares the recorded value to a location value generated by the GPS of the evaluator device 110 to perform the test.

Figure 10:
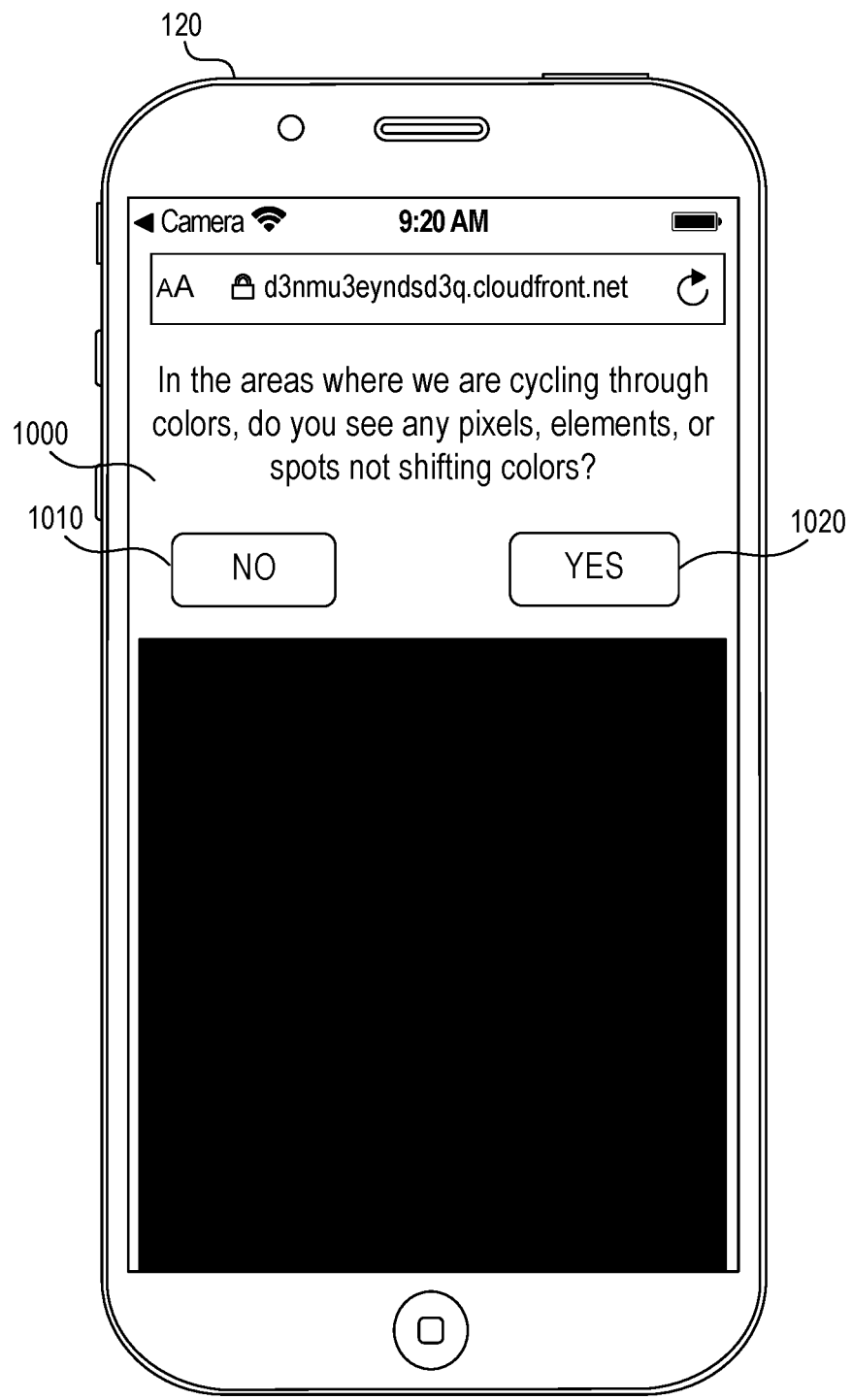
FIG. 10 shows a user interface that displays a test of the display of the target device according to some embodiments of the present technology.

FIG. 10 shows a user interface that displays a test of the display of the target device 120 according to some embodiments of the present technology. The target device 120 can display the colors, such as red, blue, and green, on the display screen 1000 of the target device 120. The target device 120 can present a query to the user, via audio, video, text, picture or other similar means, such as: "in the areas where we are cycling through colors, do you see any pixels, elements, or spots that are not shifting colors?". The user can respond to the query using buttons 1010, 1020, or by using audio communication.

Figure 11:
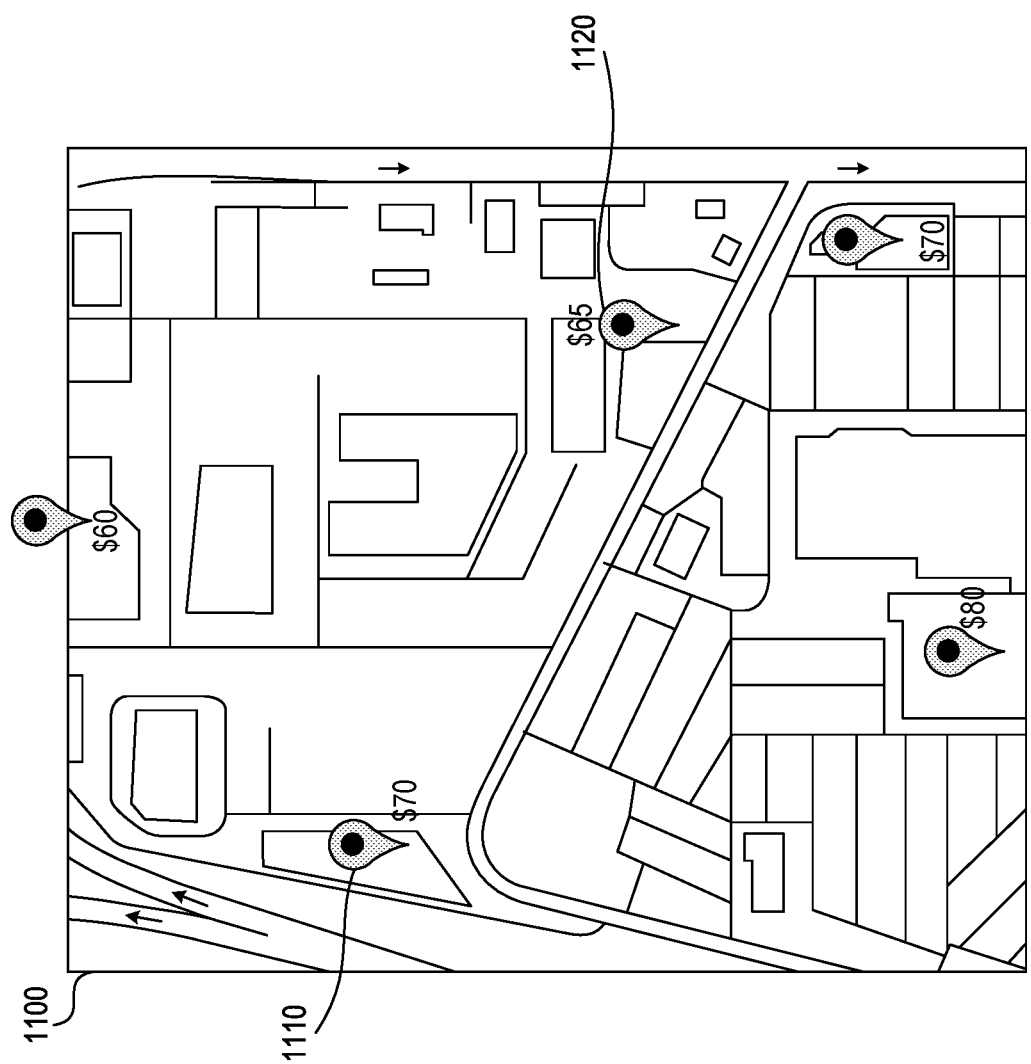
FIG. 11 shows a map displaying kiosks and associated prices.

FIG. 11 shows a map displaying kiosks and associated prices. Once the user accepts the guaranteed price 600 in FIG. 6, the evaluator device 110 can present a map 1100 of kiosks and/or stores to the user, indicating where the user can redeem the target device 120. The map 1100 can also present a price 1110, 1120 (only two labeled for brevity) that can be obtained at the various kiosks. The price 1110, 1120 can depend on the method of payment selected by the user, such as methods described in FIG. 6, and/or the distance to the kiosk.

Figure 12:
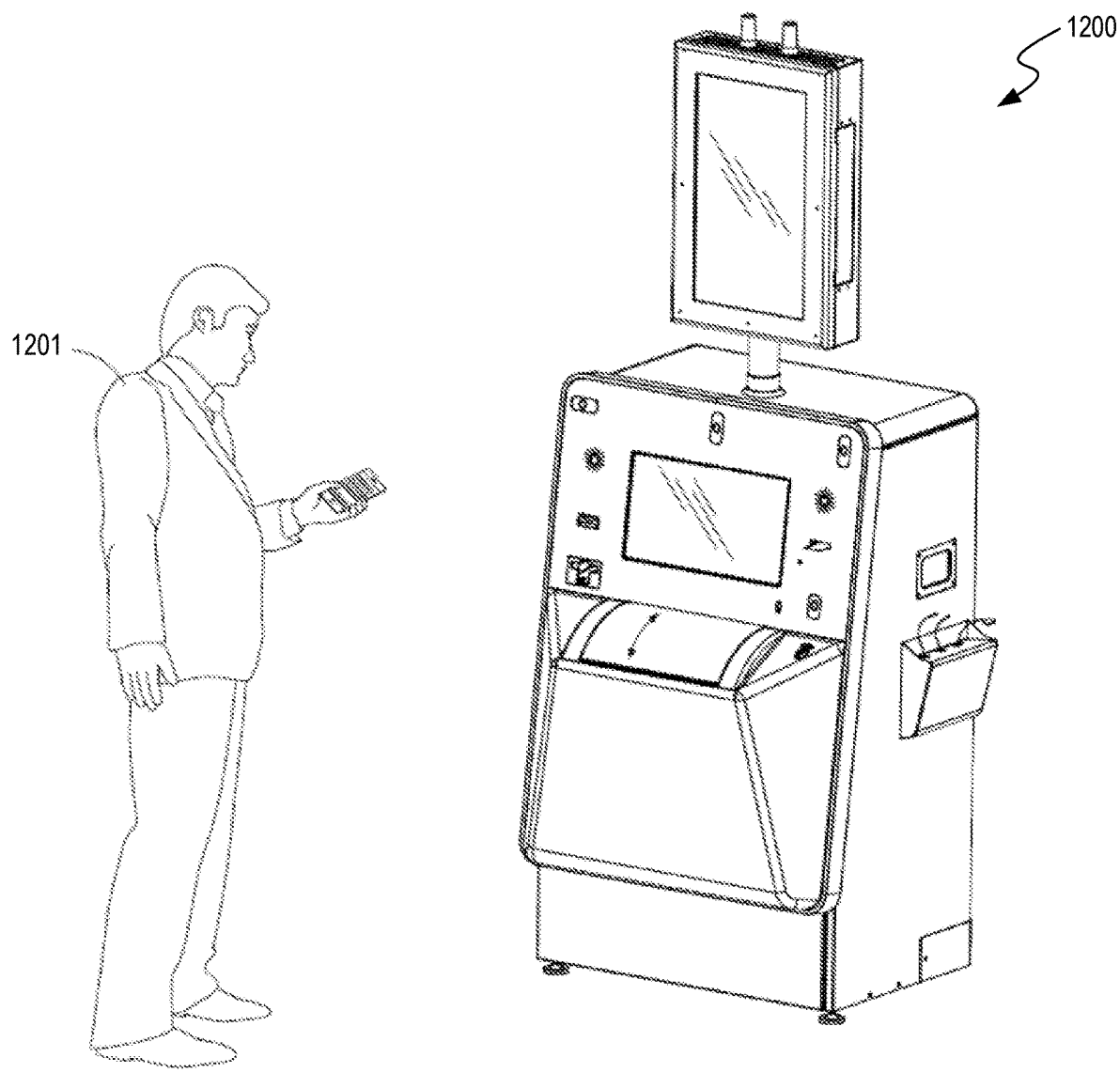
FIG. 12 is an isometric view of a kiosk for recycling and/or other processing of mobile phones and other consumer electronic devices in accordance with some embodiments of the present technology.

FIG. 12 is an isometric view of a kiosk 1200 for recycling and/or other processing of mobile phones and other consumer electronic devices in accordance with some embodiments of the present technology.

In the illustrated embodiment, the kiosk 1200 is a floor-standing, self-service kiosk configured for use by a user 1201 (e.g., a consumer, customer, etc.) to recycle, sell, and/or perform other operations with a target device 120 such as a mobile phone or other consumer electronic device. In other embodiments, the kiosk 1200 can be configured for use on a countertop or a similar raised surface. Although the kiosk 1200 is configured for use by consumers, in various embodiments, the kiosk 1200 and/or various portions thereof can also be used by other operators, such as a retail clerk or kiosk assistant, to facilitate the selling or other processing of target devices 120 such as mobile phones and other consumer electronic devices.

The kiosk 1200 can be used in a number of different ways to efficiently facilitate the recycling, selling, and/or other processing of target devices 120 such as mobile phones and other consumer electronic devices. For example, a user wishing to sell a used mobile phone or other target device 120 can bring the target device 120 to the kiosk 1200 for recycling. In some embodiments, the kiosk 1200 can perform a visual analysis and/or an electrical analysis, verify the user's identity, and pay the user 1201 for the target device 120 using one or more of the methods and/or systems described in detail in the commonly owned patents and patent applications identified herein and incorporated by reference in their entireties.

As those of ordinary skill in the art will appreciate, various embodiments of the kiosk 1200 can be used for recycling virtually any consumer electronic device, such as mobile phones, MP3 players, tablet computers, laptop computers, e-readers, PDAs, Google® Glass™, smartwatches, and other portable or wearable devices, as well as other relatively non-portable electronic devices such as desktop computers, printers, televisions, DVRs, devices for playing games, and entertainment or other digital media on CDs, DVDs, Blu-ray™, etc.

Figure 13:
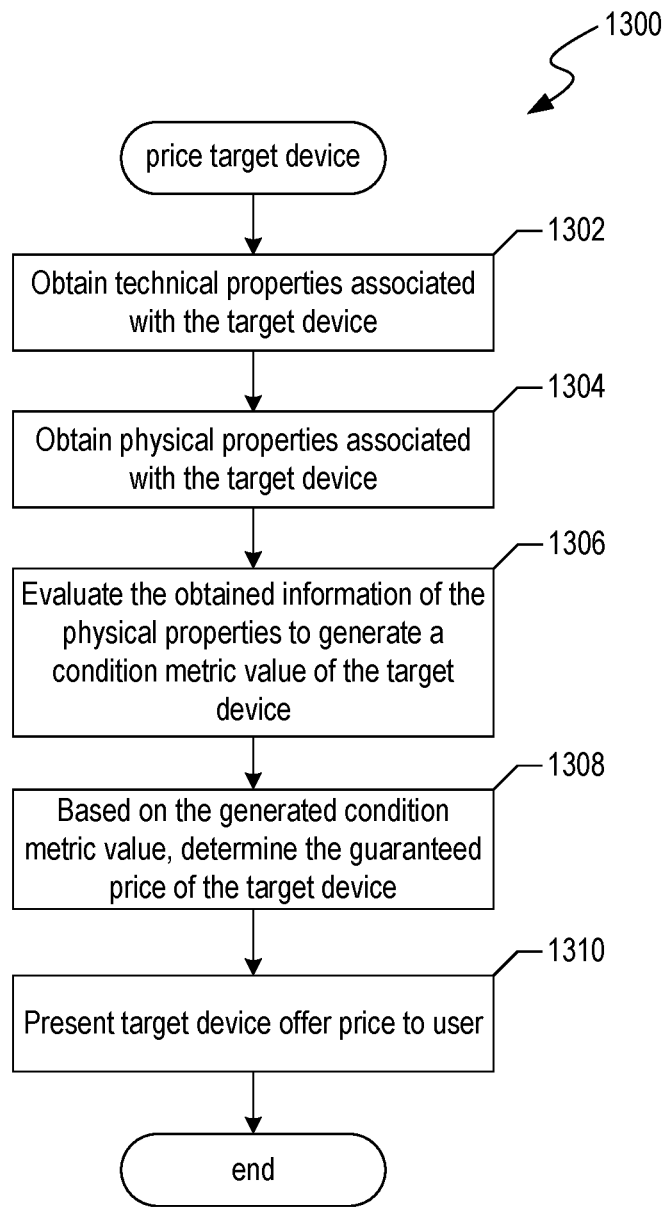
FIG. 13 is a high-level flow diagram of a routine to generate a guaranteed price of a target device (e.g., a mobile phone, tablet computer, thumb drive, television, SLR, etc.) for recycling in accordance with some embodiments of the present technology.

FIG. 13 is a high-level flow diagram of a routine 1300 to generate a guaranteed price of a target device 120 (e.g., a mobile phone, tablet computer, thumb drive, television, SLR, etc.) for recycling in accordance with some embodiments of the present technology. In various embodiments, an app running on an evaluator device (e.g., the evaluator device 110 of FIG. 1) such as a mobile phone or computer, and/or another processing device operatively connectable to the app, such as a remote computer (e.g., a server), can perform some or all of the routine 1300. In some instances, for example, a user who owns a target device 120 (e.g., a game console, laptop, etc.) may want to know how much the target device 120 is worth so that he or she can decide whether to sell it. The routine 1300 of FIG. 13 enables the user to use another electronic device (e.g., the evaluator device 110) to quickly obtain a current price for the target device 120, without requiring the user to bring the target device 120 to a recycling kiosk 1200, a retail outlet, or another location, and without requiring the user to manually provide information about the target device 120 and its configuration.

In various embodiments, the routine 1300 and the other flow routines described in detail herein can be implemented by an evaluator device 110 running an app that can obtain information about a connected target device 120. The target device 120 may be, for example, one of various consumer electronic devices, such as a used mobile telecommunication device, which includes all manner of handheld devices having wired and/or wireless communication capabilities (e.g., a smartphone, computer, television, game console, home automation device, etc.). In some embodiments, the user downloads the app to the evaluator device 110 from an app store or other software repository associated with the device manufacturer or a third party (e.g., the Apple® Appstore™, Google Play™ store, Amazon® Appstore™, and so on), from a website, from a kiosk such as the kiosk 1200 (e.g., sideloading an app over a wired or wireless data connection), from a removable memory device such as an SD flashcard or USB drive, etc. In other embodiments, the app is loaded on the evaluator device 110 before it is first acquired by the user (e.g., preinstalled by the device manufacturer, a wireless service carrier, or a device vendor).

In block 1302, the evaluator device 110 can obtain technical properties associated with the target device 120. The technical properties can include make and model of the device, computation capacity of the device, memory capacity of the device, carrier providing data, and/or cellular connectivity to the device, etc.

In block 1304, the evaluator device 110 can obtain physical properties associated with the target device 120. The physical properties can include wear and tear of the target device 120. To obtain the physical properties, the evaluator device 110 can instruct a user of the target device 120 to position the target device 120 in multiple predetermined positions, such as front, back, sides; three-quarter view from the top, bottom, and left of the front; and/or three-quarter view from the top, bottom, and left of the back of the target device 120.

While obtaining the physical properties of the target device 120, the evaluator device 110 can indicate to the user that the evaluator device 110 has recorded an image of each of the multiple predetermined positions. The indication can include a click, a voice explaining that the picture has been taken, or a visual display indicating that the picture has been taken. In addition, the evaluator device 110 can record a video of handling of the target device 120 while the target device 120 is being positioned into the multiple predetermined positions, without informing the user that the video is being recorded. By not informing the user that the video is being recorded, the user who wants to commit fraud, and for example, switch the target device 120 with a second device in a better condition, is less careful, and can switch out the devices between pictures. However, because the evaluator device 110 is recording a video, the evaluator device 110 can record the switching out of the devices.

In block 1306, the evaluator device 110 can evaluate the obtained information of the physical properties to generate a condition metric value of the target device 120 by analyzing the video. The condition metric value can indicate the wear and tear of the target device 120. The condition metric value can be a numerical value indicating the condition of the target device 120 in a predetermined scale, such as a scale from 1 to 100, where 100 indicates mint condition, and 1 indicates that a replacement needed. The condition metric value can be a vector or a matrix, indicating the condition of the device for various factors. For example, the condition metric value can be a vector (50, 10, 70 . . . ), where the first entry indicates the condition of the screen, the second entry indicates the condition of the battery, the third entry indicates the memory capacity of the device, etc. The condition metric value to generate a condition metric value of the target device 120 can also be a scalar value representing a weighted sum of the vector entries.

To determine the wear and tear of the target device 120, the evaluator device 110 can activate its flashlight to illuminate the target device 120, prior to or while the target device 120 is positioned into the multiple predetermined positions. The flashlight can create highlights, or glints, in the cracks on the surface of the target device 120. The evaluator device 110 can detect the highlights, or glints, appearing on a surface of the target device 120.

The video analysis can be performed by a remote operator such as an AI. The AI can detect an inaccurate determination of the wear and tear of the target device 120 by detecting from the video whether a second device has replaced the target device 120. If the AI detects a switch in the devices, the AI can alert the user and/or a system administrator that a switch has been detected.

In block 1308, based on the generated condition metric value, the evaluator device 110 can determine the guaranteed price of the target device 120, as explained in this application. In block 1310, the evaluator device 110 can present to the user the guaranteed price of the target device 120.

The evaluator device 110 can determine whether the target device 120 has been evaluated previously, such as by determining whether the unique device identifier has been previously evaluated by the system. Upon determining that the target device 120 has been evaluated previously, the evaluator device 110 can obtain from a database, properties of the target device 120 and can populate the technical properties and the physical properties from the data contained in the database.

FIG. 13 and the flow diagrams that follow are representative and may not show all functions or exchanges of data, but instead they provide an understanding of commands and data exchanged under the system. Those skilled in the relevant art will recognize that some functions or exchange of commands and data may be repeated, varied, omitted, or supplemented, and other (less important) aspects not shown may be readily implemented. Those skilled in the art will appreciate that the blocks shown in FIG. 13 and in each of the flow diagrams discussed below may be altered in a variety of ways. For example, while processes or blocks are presented in a given order, alternative implementations may perform routines in a different order, and some processes or blocks may be rearranged, deleted, moved, added, subdivided, combined, and/or modified to provide alternative or sub-combinations. Each of these processes or blocks may be implemented in a variety of different ways. Also, although processes or blocks are at times shown as being performed in series, these processes or blocks may instead be performed or implemented in parallel, or may be performed at different times. Some of the blocks depicted in FIG. 13 and the other flow diagrams are of a type well known in the art, and can themselves include a sequence of operations that need not be described herein. Those of ordinary skill in the art can create source code and/or microcode, program logic arrays, or otherwise implement the embodiments disclosed herein based on the flow diagrams and the Detailed Description provided herein.

In various embodiments, all or a portion of the routine 1300 and the routines in the other flow diagrams herein can be implemented by means of a consumer or another user (such as a retail employee) operating one or more of the electronic devices and systems described above. For example, in some embodiments, the routine 1300 and other routines disclosed herein can be implemented by a mobile device, such as the evaluator device 110 described above with reference to FIG. 1. For example, in some instances the app can run on one or more evaluator devices 110 and/or on one or more target devices 120. Accordingly, the description of the routine 1300 and the other routines disclosed herein may refer interchangeably to the routine, the app, the evaluator device 110, the target device 120, and/or the kiosk 1200 performing an operation, with the understanding that any of the above devices, systems, and resources can perform all or part of the operation.

While various embodiments of the present technology are described herein using mobile phones and other handheld devices as examples of electronic devices, the present technology applies generally to all types of electronic devices. For example, in some embodiments, the app can be installed and/or run on a larger evaluator device 110 and/or target device 120, e.g., a laptop or tower computer, to perform all or a portion of the routine 1300. For example, the app can inventory a laptop or desktop computer and provide the user a confirmation code that the user can print out and bring to a kiosk or to an associated retailer location or point of sale (or send in with the computer via, e.g., courier, mail, or package delivery service) as a receipt. The code can identify the target device 120 and represent the agreed price determined according to the valuation performed by the app based on the information it obtained from the target device 120 and on any user-provided supplemental information. In some embodiments, the app and/or the receipt can indicate any elements that require independent verification (e.g., undamaged screen glass) for the user to receive the agreed price for the target device 120. The user can then take the target device 120 to the retail storefront or point of sale (or, e.g., to the kiosk 1200 for viewing by a remote kiosk operator) for its condition to be independently verified, after which the user can deposit the target device 120. The user can then receive the price upon verified receipt of the target device 120, such as a retailer or the kiosk 1200 issuing cash, a credit, or a card such as a gift card.

Figure 14:
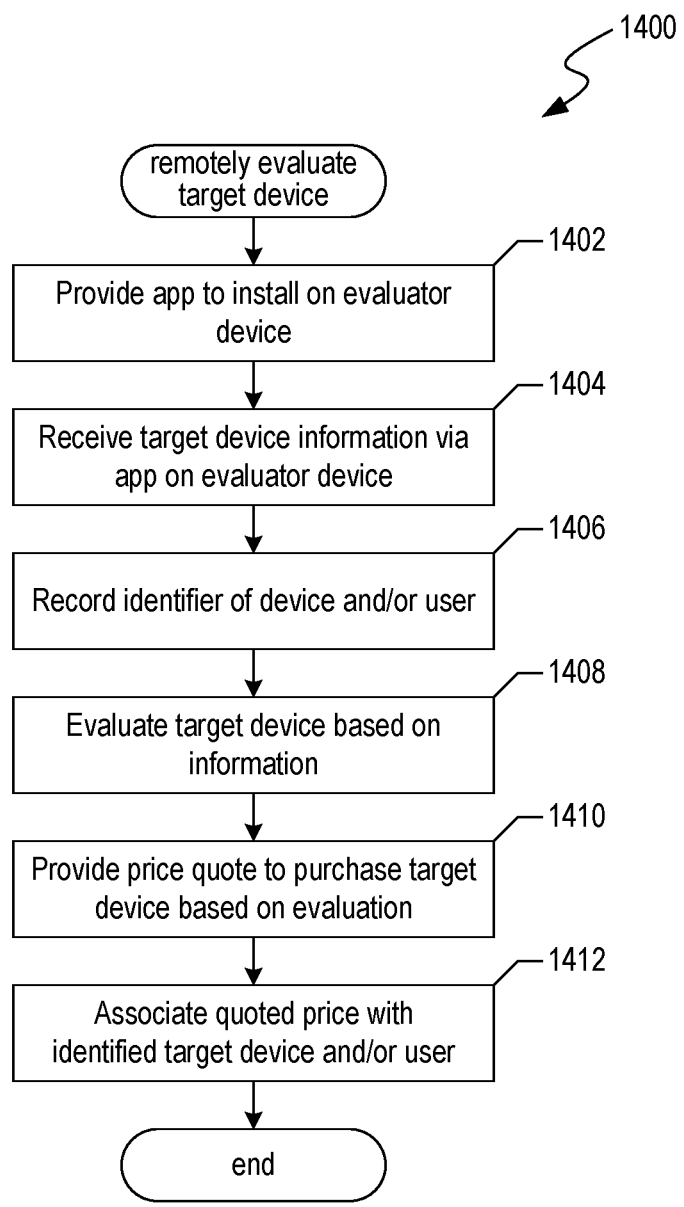
FIG. 14 is a flow diagram of a routine for remotely evaluating a target device for recycling in accordance with some embodiments of the present technology.

FIG. 14 is a flow diagram of a routine 1400 for remotely evaluating a target device 120 for recycling in accordance with some embodiments of the present technology. In various embodiments, the kiosk 1200 and/or another processing device operatively connectable to the kiosk 1200, such as a remote server, can perform some or all of the routine 1400. In some embodiments, the routine 1400 can be performed in conjunction with the routine 1300 of FIG. 13 performed by the evaluator device 110, which can be remote from the kiosk 1200. For example, the kiosk 1200 and/or a remote server can provide software (e.g., the app described above) to be installed on the evaluator device 110, and then the kiosk and/or server can remotely receive information about the target device 120 via the app installed on the evaluator device 110, use the information to provide an offer price for the target device 120, and record the offer price so that the user can recycle the target device 120 for the quoted offer price when the user brings the target device 120 to the kiosk 1200.

In block 1402, the routine 1400 provides the app described above to install on the evaluator device 110. The routine 1400 can provide the app to the evaluator device 110 by various avenues: for example, from the kiosk 1200 (e.g., sideloading the app over a wired or wireless data connection); through a website (e.g., a website associated with the kiosk operator); from a software repository run by the device manufacturer or a third party (e.g., the Apple® Appstore™, Google Play™ store, Amazon® Appstore™, etc.); via a removable memory device such as an SD flashcard or USB drive; by preinstallation on the evaluator device 110 by the device manufacturer, a wireless service carrier, or a device vendor; and so on.

In block 1404, the routine 1400 receives information about the target device 120 and/or the user via the app on the evaluator device 110. The information can include, for example, a device identifier such as a serial number, IMEI number, or hardware address; a device make and/or model name, number, or code; data describing the device configuration, characteristics, and/or capabilities; owner information, such as a name, driver's license number, and/or account identifier; etc. For example, the user may download and run the app on the evaluator device 110 to obtain such information about the target device 120, and the app can store information about the target device 120, and/or transmit the information, for example, to a remote server computer. In various embodiments, the routine 1400 can access the stored or transmitted information, such as by receiving the information at the server computer.

In block 1406, the routine 1400 records one or more identifiers of the target device 120 (and/or the evaluator device 110) and/or the user. In some embodiments, the routine 1400 utilizes an identifier associated with the target device 120 that was included in the information that the routine 1400 received in block 1404. Examples of such target device 120 identifiers include the IMEI of a mobile phone, the model and/or serial numbers of a laptop computer, a unique wireless identifier of the target device 120 such as a Wi-Fi interface MAC address, a product bar code, USB vendor ID and device ID (and release number) codes, etc. The identifier can also be a derived code such as a unique hash (based on, e.g., the information received in block 1404), and/or a serially or randomly assigned code such as by generating a globally unique identifier (GUID) for the target device 120 and/or user. In some embodiments, the routine 1400 can generate an identifier after pricing the target device 120, so that the identifier reflects the pricing. User-related identifiers can include, for example, a driver's license number, account credentials such as a username and password, etc. The routine 1400 can record the identifiers in a registry database that indexes identifiers against, for example, evaluator devices 110 to which the app has been installed, target devices that the system has priced (e.g., remotely via the app), and/or target devices that the kiosk 1200 has previously evaluated, for example. The database can be, for example, one or more of the databases associated with the server computer, can be stored in the cloud storage facility, can be distributed among the kiosks 1200, and so on.

In block 1408, the routine 1400 evaluates the target device 120 based on the information. For example, the routine 1400 can compare the received target device 120 information to a database of prices, such as a lookup table, pricing model, or other data structure containing prices for various target devices on a server that can be remotely located from the evaluator device 110 and/or the target device 120 (e.g., the server computer). The routine 1400 can, for example, use the identifier to determine the make and model of the target device 120, and use the make and model of the target device 120 (along with, e.g., information about the condition of the target device 120) to determine a price to offer for the device based on the data in the database or pricing model. In some embodiments, the routine 1400 can determine an offer price that enables the user to receive the price in exchange for recycling the target device 120 at the kiosk 1200. In some embodiments, the routine 1400 can determine an offer price for the target device 120 that is contingent on an assessment of the visual condition of the target device 120 by the evaluator device 110 or by the kiosk 1200. In some embodiments, the routine 1400 can determine an offer price that includes a range of prices based on the possible outcomes of such an assessment. In some instances, the target device 120 may have no market value. In various embodiments, the pricing data is updated on a continuous or periodic basis.

In block 1410, the routine 1400 sends an offer price quote for the target device 120 to the evaluator device 110. In some embodiments, the routine 1400 sends the offer price quote from the server to the app running on the evaluator device 110. In block 1412, the routine 1400 associates the quoted price with the identified target device 120 (and/or the evaluator device 110) and/or the user. For example, the routine 1400 can store information about the price quote, the target device 120, and/or the user in the database and/or in one or more data structures maintained by the app on the evaluator device 110, by the kiosk 1200, and/or by other aspects of the present technology. In some embodiments, the routine 1400 can associate the price with a unique identifier such as a hash value generated based on the user, the device identification, the app, and/or the time and amount of the price itself, etc. For example, the routine 1400 can associate a numeric or alphanumeric identifier code with the offer price for the target device 120 and give that code to the user, informing the user that the user can enter the code at the kiosk 1200 by a certain time to receive the offer price for the device. For example, the routine 1400 can display the code on the screen 115 of the evaluator device 110 and/or send the user an email or text message containing the code. The routine 1400 can store the price and the identifier in a data structure on the evaluator device 110 (e.g., in a table maintained by the app) and/or remotely from the evaluator device 110 (e.g., in a data structure maintained at one or more of the kiosk 1200, the server computer, the cloud storage facility, etc.), and it can transmit them between or among various computing and/or storage facilities. In some embodiments, the routine 1400 transmits the identifier to the server computer so that when the kiosk 1200 receives the identifier, the kiosk 1200 can look up the identifier and retrieve the associated price for the target device 120. After block 1412, the routine 1400 ends.

Embodiments of the kiosk 1200 and various features thereof can be at least generally similar in structure and function to the systems, methods and corresponding features described in the following patents and patent applications, which are incorporated herein by reference in their entireties: U.S. Pat. Nos. 10,860,990; 10,853,873; 10,572,946; 10,475,002; 10,445,708; 10,438,174; 10,417,615; 10,401,411; 10,269,110; 10,127,647; 10,055,798; 9,885,672; 9,881,284; 8,200,533; 8,195,511; and 7,881,965; U.S. patent application Ser. Nos. 17/445,178; 17/445,158; 17/445,083; 17/445,082; 17/125,994; 16/794,009; 16/788,169; 16/788,153; 16/719,699; 16/794,009; 16/534,741; 15/057,707; 14/967,183; 14/966,346; 14/964,963; 14/663,331; 14/660,768; 14/598,469; 14/568,051; 14/498,763; 13/794,816; 13/794,814; 13/753,539; 13/733,984; 13/705,252; 13/693,032; 13/658,828; 13/658,825; 13/492,835; 13/113,497; U.S. Provisional Application Nos. 63/220,890; 63/220,381; 63/127,148; 63/116,020; 63/116,007; 63/088,377; 63/070,207; 63/066,794; 62/950,075; 62/807,165; 62/807,153; 62/804,714; 62/782,947; 62/782,302; 62/332,736; 62/221,510; 62/202,330; 62/169,072; 62/091,426; 62/090,855; 62/076,437; 62/073,847; 62/073,840; 62/059,132; 62/059,129; 61/607,572; 61/607,548; 61/607,001; 61/606,997; 61/595,154; 61/593,358; 61/583,232; 61/570,309; 61/551,410; 61/472,611; 61/347,635; 61/183,510; and 61/102,304. All the patents and patent applications listed in the preceding sentence and any other patents or patent applications identified herein are incorporated herein by reference in their entireties.

The above Detailed Description of the embodiments disclosed herein is not intended to be exhaustive or to limit the embodiments disclosed to the precise form disclosed above. Although specific examples for the embodiments disclosed herein are described above for illustrative purposes, various equivalent modifications are possible within the scope of the embodiments, as those skilled in the relevant art will recognize.

References throughout the foregoing description to features, advantages, or similar language do not imply that all of the features and advantages that may be realized with the present technology should be or are in any single embodiment. Rather, language referring to the features and advantages is understood to mean that a specific feature, advantage, or characteristic described in connection with an embodiment is included in at least one embodiment of the present technology. Thus, discussions of the features and advantages, and similar language, throughout this specification may, but do not necessarily, refer to the same embodiment.

Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted above, including any that may be listed in accompanying filing papers, are incorporated herein by reference. Aspects of the embodiments disclosed herein can be modified, if necessary, to employ the systems, functions, and concepts of the various references described above to provide yet further implementations of the embodiments disclosed herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The teachings of the embodiments disclosed herein can be applied to other systems, not necessarily the system described above. The elements and acts of the various examples described above can be combined to provide further implementations of the embodiments disclosed herein. Some alternative implementations of the embodiments disclosed herein may include not only additional elements to those implementations noted above, but also may include fewer elements. Further any specific numbers noted herein are only examples: alternative implementations may employ differing values or ranges.

Although the above description describes various embodiments and the best mode contemplated, regardless of how detailed the above text, the embodiments disclosed herein can be practiced in many ways. Details of the system may vary considerably in its specific implementation, while still being encompassed by the present technology. As noted above, particular terminology used when describing certain features or aspects of the embodiments disclosed herein should not be taken to imply that the terminology is being redefined herein to be restricted to any specific characteristics, features, or aspects with which that terminology is associated. In general, the terms used in the following claims should not be construed to limit the embodiments disclosed herein to the specific examples disclosed in the specification, unless the above Detailed Description section explicitly defines such terms. Accordingly, the actual scope of the embodiments disclosed herein encompasses not only the disclosed examples, but also all equivalent ways of practicing or implementing the embodiments disclosed herein under the claims.

From the foregoing, it will be appreciated that specific embodiments have been described herein for purposes of illustration, but that various modifications may be made without deviating from the spirit and scope of the various embodiments disclosed. Further, while various advantages associated with certain embodiments have been described above in the context of those embodiments, other embodiments may also exhibit such advantages, and not all embodiments need necessarily exhibit such advantages to fall within the scope of the embodiments disclosed herein. Accordingly, the embodiments are not limited, except as by the appended claims.

Although certain aspects of the embodiments disclosed herein are presented below in certain claim forms, the applicant contemplates the various aspects of the embodiments disclosed herein in any number of claim forms. Accordingly, the applicant reserves the right to pursue additional claims after filing this application to pursue such additional claim forms, in either this application or in a continuing application.

What is claimed is:

1. A computer-implemented method to generate a price of a target device, the method comprising:
   obtaining, by a mobile handheld evaluator device, technical properties associated with the target device, the technical properties comprising a make and a model of the target device;
   obtaining, by the mobile handheld evaluator device, physical properties associated with the target device, the physical properties comprising information related to wear and tear of the target device, wherein obtaining the physical properties comprises:
   indicating, by a user interface of the handheld evaluator device, to a user that the user should position the target device in one or more predetermined positions relative to a camera of the mobile handheld evaluator device;
   indicating, by the user interface, to the user that the mobile handheld evaluator device records one or more images of the target device in each of the predetermined positions using a guide displayed on the mobile evaluator device to indicate how to position the target device within a camera view of the mobile evaluator device; and
   capturing, by the camera of the mobile handheld evaluator device, the one or more images of the target device while the target device is positioned in each of the predetermined positions;
   evaluating, using an application software and/or hardware of the mobile handheld device, the obtained physical properties to generate a condition metric value of the target device, to perform the evaluating remotely by the user;
   based on the generated condition metric value, determining the price of the target device; and
   indicating, by the user interface, the price of the target device to the user;
   wherein the condition metric value is obtained based on a trained artificial intelligence module to detect screen and/or device imperfections of the target device;
   the training of the trained artificial intelligence module includes training data, wherein the training data includes a positive training set of features that have been determined to have a desired property in question, and, in some embodiments, a negative training set of features that lack the property in question using a supervised and/or unsupervised machine learning.

2. The computer-implemented method of claim 1, further comprising: activating a flashlight of the handheld evaluator device to illuminate the target device, prior to or while the target device is positioned at the predetermined positions; and detecting highlights appearing on a surface of the target device by analyzing the one or more captured images, the highlights indicating at least one crack on the surface of the target device.

3. The computer-implemented method of claim 1, further comprising:
   detecting that a second device has replaced the target device by analyzing the one or more captured images; and
   determining that the obtained physical properties are inaccurate responsive to detecting that the second device has replaced the target device.

4. The computer-implemented method of claim 3, wherein detecting that the second device has replaced the target device is performed using a trained machine learning model.

5. The computer-implemented method of claim 1, further comprising:
   obtaining a unique identifier of the target device;
   determining whether the target device has been evaluated previously based on the unique identifier; and
   upon determining that the target device has been evaluated previously, retrieving data describing the target device from a database.

6. The computer-implemented method of claim 5, wherein obtaining the technical properties and the physical properties comprises:
   populating the technical properties and the physical properties from the data describing the target device.

7. The computer-implemented method of claim 1, further comprising:
   receiving, by the user interface, an acceptance of the price from the user; and
   upon receiving the acceptance, presenting, by the user interface, a map to the user indicating one or more locations at which the user can redeem the target device at an associated price.

8. An mobile evaluator device to evaluate a target device, the mobile evaluator device comprising:
   one or more processors; and
   at least one non-transitory computer-readable medium coupled to the one or more processors, wherein the at least one non-transitory computer-readable medium stores instructions, which, when executed by the one or more processors cause the one or more processors to:
   obtain technical properties associated with the target device, the technical properties comprising a make and a model of the target device;
   obtain physical properties associated with the target device, the physical properties comprising information related to wear and tear of the target device, wherein obtaining the physical properties comprises:
   indicate, by a user interface of the mobile evaluator device, to a user that the user should position the target device in one or more predetermined positions;
   indicate, by the user interface, to the user that the mobile evaluator device records one or more images of the target device in each of the predetermined positions using a guide displayed on the mobile evaluator device to indicate how to position the target device within a camera view of the mobile evaluator device; and
   record, by a camera of the mobile evaluator device, a video of the target device while the target device is positioned in the predetermined positions;
   evaluate, using an application software and/or hardware of the mobile device, the obtained physical properties to generate a condition metric value of the target device, to perform the evaluating remotely by the user;

based on the generated condition metric value, determine the price of the target device; and indicate, by the user interface, the price of the target device to the user;

wherein the condition metric value is obtained based on a trained artificial intelligence module to detect screen and/or device imperfections of the target device;

the training of the trained artificial intelligence module includes training data, wherein the training data includes a positive training set of features that have been determined to have a desired property in question, and, in some embodiments, a negative training set of features that lack the property in question using a supervised and/or unsupervised machine learning.

9. The mobile evaluator device of claim 8, wherein the instructions further cause the one or more processors to: activate a flashlight of the mobile evaluator device to illuminate the target device, prior to or while the target device is positioned into the predetermined positions; and detect highlights appearing on a surface of the target device by analyzing the video, the highlights indicating at least one crack on the surface of the target device.

10. The evaluator device of claim 8, wherein the instructions further cause the one or more processors to:
detect that a second device has replaced the target device by analyzing the video; and
determine that the obtained physical properties are inaccurate responsive to detecting that the second device has replaced the target device.

11. The evaluator device of claim 10, wherein the instructions cause the one or more processors to detect that the second device has replaced the target device using an artificial intelligence module.

12. The evaluator device of claim 8, wherein the instructions further cause the one or more processors to:
obtain a unique identifier of the target device;
determine whether the target device has been evaluated previously based on the unique identifier; and
upon determining that the target device has been evaluated previously, retrieve data describing the target device from a database.

13. The evaluator device of claim 12, wherein the instructions to obtain the technical properties and the physical properties cause the one or more processors to:
populate the technical properties and the physical properties from the data describing the target device.

14. The evaluator device of claim 8, wherein the instructions further cause the one or more processors to:
receive, by the user interface, an acceptance of the price from the user; and
upon receiving the acceptance, present, by the user interface, a map to the user indicating one or more locations at which the user can redeem the target device at an associated a price.

15. A non-transitory computer-readable medium storing instructions, which, when executed by at least one computing device of a mobile handheld evaluator device, cause the at least one computing device to:
obtain technical properties associated with a target device, the technical properties comprising a make and a model of the target device;

obtain physical properties associated with the target device, the physical properties comprising information related to wear and tear of the target device, wherein obtaining the physical properties comprises:
indicate, by a user interface of the mobile handheld evaluator device, to a user that the user should position the target device in one or more predetermined positions relative to a camera of the handheld evaluator device;
indicate, by the user interface, to the user that the mobile handheld evaluator device records one or more images of the target device in each of the predetermined positions using a guide displayed on the mobile evaluator device to indicate how to position the target device within a camera view of the mobile evaluator device; and
capture, by the camera of the mobile handheld evaluator device, the one or more images of the target device while the target device is positioned in each of the predetermined positions;
evaluate, using an application software and/or hardware of the mobile handheld device, the obtained physical properties to generate a condition metric value of the target device, to perform the evaluating remotely by the user;
based on the generated condition metric value, determine the price of the target device; and indicate, by the user interface, the price of the target device to the user;
wherein the condition metric value is obtained based on a trained artificial intelligence module to detect screen and/or device imperfections of the target device;
the training of the trained artificial intelligence module includes training data, wherein the training data includes a positive training set of features that have been determined to have a desired property in question, and, in some embodiments, a negative training set of features that lack the property in question using a supervised and/or unsupervised machine learning.

16. The non-transitory computer-readable medium of claim 15, wherein the instructions further cause the at least one computing device to: activate a flashlight of the mobile handheld evaluator device to illuminate the target device, prior to or while the target device is positioned at the predetermined positions; and detect highlights appearing on a surface of the target device by analyzing the one or more captured images, the highlights indicating at least one crack on the surface of the target device.

17. The non-transitory computer-readable medium of claim 15, wherein the instructions further cause the at least one computing device to:
detect that a second device has replaced the target device by analyzing the one or more captured images; and
determine that the obtained physical properties are inaccurate responsive to detecting that the second device has replaced the target device.

18. The non-transitory computer-readable medium of claim 17, wherein the instructions cause the at least one computing device to detect that the second device has replaced the target device using a machine learning model.

19. The non-transitory computer-readable medium of claim 15, wherein the instructions further cause the at least one computing device to:
obtain a unique identifier of the target device;
determine whether the target device has been evaluated previously based on the unique identifier; and upon determining that the target device has been evaluated previously, retrieve data describing the target device from a database.

20. The non-transitory computer-readable medium of claim 19, wherein the instructions to obtain the technical properties and the physical properties cause the at least one computing device to:
populate the technical properties and the physical properties from the data describing the target device.

* * * * *